United States Patent [19]
Puri et al.

[11] Patent Number: 5,227,878
[45] Date of Patent: Jul. 13, 1993

[54] ADAPTIVE CODING AND DECODING OF FRAMES AND FIELDS OF VIDEO

[75] Inventors: Atul Puri, New York, N.Y.; Rangarajan Aravind, Matawan, N.J.

[73] Assignee: AT&T Bell Laboratories, Murray Hill, N.J.

[21] Appl. No.: 793,063

[22] Filed: Nov. 15, 1991

[51] Int. Cl.$^5$ ............... H04N 3/133; H04N 3/137
[52] U.S. Cl. ................... 358/136; 358/105
[58] Field of Search .............. 358/133, 135, 136, 138, 358/105

[56] References Cited

U.S. PATENT DOCUMENTS

| | | | |
|---|---|---|---|
| 4,437,087 | 3/1984 | Petr | 375/27 |
| 4,475,213 | 10/1984 | Medaugh | 375/27 |
| 4,958,226 | 9/1990 | Haskell et al. | 358/136 |
| 4,969,040 | 11/1990 | Charavi | 358/136 |
| 4,999,705 | 3/1991 | Puri | 358/136 |
| 5,001,561 | 3/1991 | Haskell et al. | 358/133 |
| 5,091,782 | 2/1992 | Krause | 358/136 |

OTHER PUBLICATIONS

B. Astle, "A Proposal For MPEG Video Report, Rev. 1," Int'l Organization For Standardization, ISO-IEC/JTC1/SC2/WG11, Aug. 14, 1991, pp. 1–78.
"Coding Of Moving Pictures And Associated Audio—For Digital Storage Media At Up To About 1.5 Mbit/s—Part 2 Video," 1991, pp. 2–51.
A. N. Netraveli et al., "Digital Pictures Representation and Compression," (Plenum Press, New York 1988), pp. 301–504.

Primary Examiner—Howard W. Britton
Attorney, Agent, or Firm—E. S. Indyk

[57] ABSTRACT

Improved compression of digital signals relating to high resolution video images is accomplished by an adaptive and selective coding of digital signals relating to frames and fields of the video images. Digital video input signals are analyzed and a coding type signal is produced in response to this analysis. This coding type signal may be used to adaptively control the operation of one or more types of circuitry which are used to compress digital video signals so that less bits, and slower bit rates, may be used to transmit high resolution video images without undue loss of quality. For example, the coding type signal may be used to improve motion compensated estimation techniques, quantization of transform coefficients, scanning of video data, and variable word length encoding of the data. The improved compression of digital video signals is useful for video conferencing applications and high definition television, among other things.

33 Claims, 20 Drawing Sheets

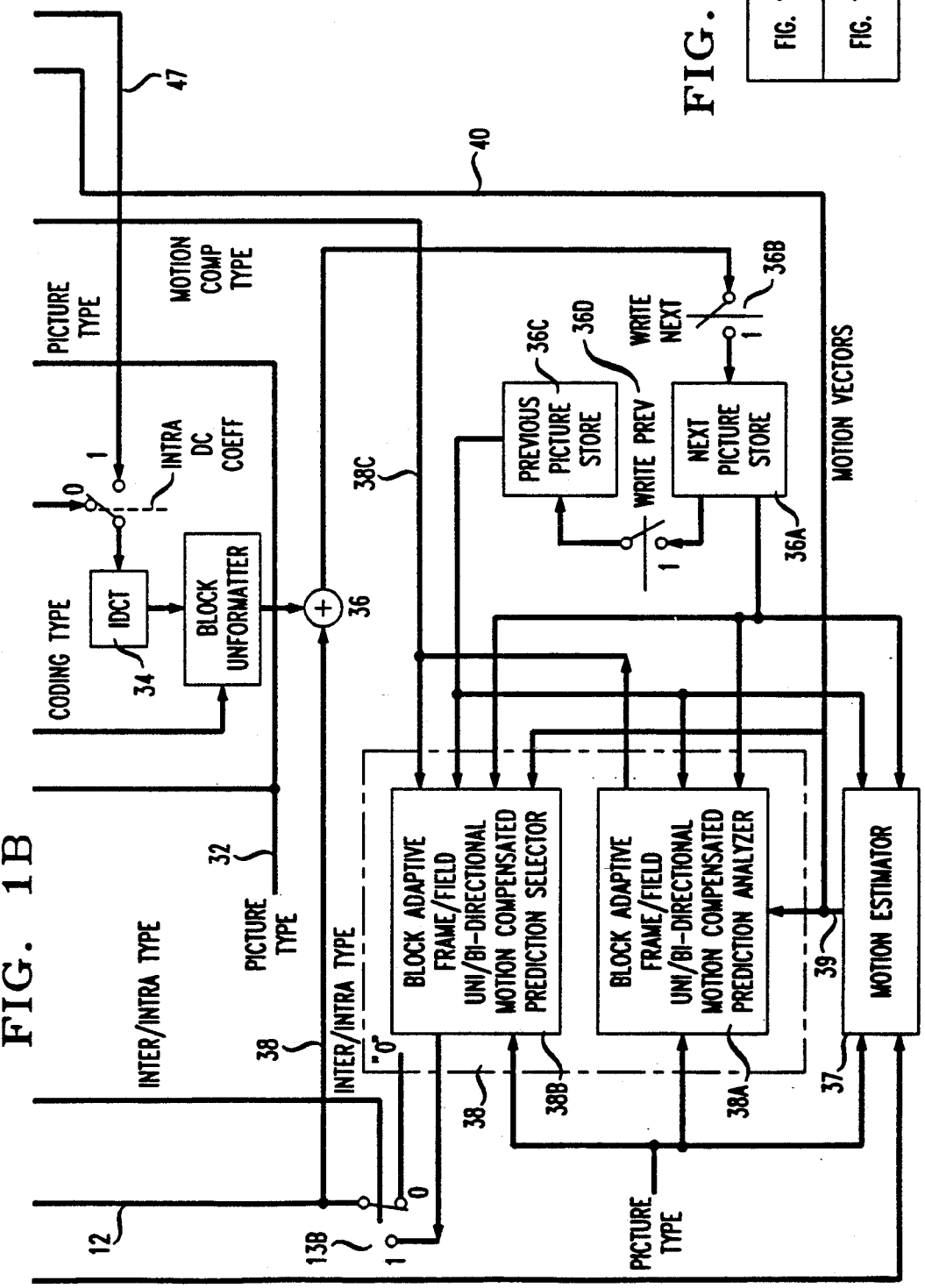
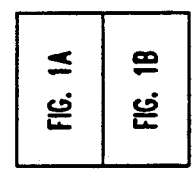
FIG. 1B
FIG. 1C

FRAME BLOCK SCAN

FRAME SCAN

FIELD BLOCK SCAN

FIELD SCANS

FIG. 1G

LENGTHS OF INTRA VLC #1 (EOB = 2 BITS)
LEVEL (ABSOLUTE VALUE)

|  | | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| | 0 | 3 | 4 | 5 | 6 | 6 | 7 | 8 | 8 | 9 | 9 | 9 | 11 | 11 | 11 |
| | 1 | 5 | 7 | 9 | 11 | | | | | | | | | | |
| | 2 | 6 | 9 | | | | | | | | | | | | |
| | 3 | 7 | 11 | | | | | | | | | | | | |
| R | 4 | 7 | | | | | | | | | | | | | |
| U | 5 | 8 | | | | | | | | | | | | | |
| N | 6 | 8 | | | | | | | | | | | | | |
| | 7 | 9 | | | | | | | | | | | | | |
| | 8 | 9 | | | | | | | | | | | | | |
| | 9 | 9 | | | | | | | | | | | | | |
| | 10 | 11 | | | | | | | | | | | | | |
| | 11 | 11 | | | | | | | | | | | | | |
| | 12 | 13 | | | | | | | | | | | | | |

FIG. 1H

LENGTHS OF INTRA VLC #2 (EOB = 2 BITS)
LEVEL (ABSOLUTE VALUE)

|  | | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| | 0 | 3 | 5 | 6 | 7 | 9 | 9 | 11 | 11 | | | | | | |
| | 1 | 4 | 6 | 9 | 11 | | | | | | | | | | |
| | 2 | 5 | 8 | 11 | | | | | | | | | | | |
| | 3 | 6 | 9 | | | | | | | | | | | | |
| | 4 | 7 | 11 | | | | | | | | | | | | |
| | 5 | 7 | 11 | | | | | | | | | | | | |
| | 6 | 7 | | | | | | | | | | | | | |
| R | 7 | 8 | | | | | | | | | | | | | |
| U | 8 | 8 | | | | | | | | | | | | | |
| N | 9 | 8 | | | | | | | | | | | | | |
| | 10 | 9 | | | | | | | | | | | | | |
| | 11 | 9 | | | | | | | | | | | | | |
| | 12 | 9 | | | | | | | | | | | | | |
| | 13 | 9 | | | | | | | | | | | | | |
| | 14 | 11 | | | | | | | | | | | | | |
| | 15 | 11 | | | | | | | | | | | | | |

FIG. 1I

LENGTHS OF INTRA VLC #3 (EOB = 3 BITS)

LEVEL (ABSOLUTE VALUE)

| RUN | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 0 | 3 | 4 | 4 | 6 | 6 | 7 | 8 | 8 | 9 | 9 | 9 | 11 | 11 | 11 |
| 1 | 4 | 7 | 9 | 11 | | | | | | | | | | |
| 2 | 6 | 9 | | | | | | | | | | | | |
| 3 | 7 | 11 | | | | | | | | | | | | |
| 4 | 7 | | | | | | | | | | | | | |
| 5 | 8 | | | | | | | | | | | | | |
| 6 | 8 | | | | | | | | | | | | | |
| 7 | 9 | | | | | | | | | | | | | |
| 8 | 9 | | | | | | | | | | | | | |
| 9 | 9 | | | | | | | | | | | | | |
| 10 | 11 | | | | | | | | | | | | | |
| 11 | 11 | | | | | | | | | | | | | |
| 12 | 13 | | | | | | | | | | | | | |

FIG. 1J

LENGTHS OF INTRA VLC #4 (EOB = 4 BITS)

LEVEL (ABSOLUTE VALUE)

| RUN | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 0 | 3 | 3 | 5 | 6 | 6 | 7 | 8 | 8 | 9 | 9 | 9 | 11 | 11 | 11 |
| 1 | 4 | 7 | 9 | 11 | | | | | | | | | | |
| 2 | 6 | 9 | | | | | | | | | | | | |
| 3 | 7 | 11 | | | | | | | | | | | | |
| 4 | 7 | | | | | | | | | | | | | |
| 5 | 8 | | | | | | | | | | | | | |
| 6 | 8 | | | | | | | | | | | | | |
| 7 | 9 | | | | | | | | | | | | | |
| 8 | 9 | | | | | | | | | | | | | |
| 9 | 9 | | | | | | | | | | | | | |
| 10 | 11 | | | | | | | | | | | | | |
| 11 | 11 | | | | | | | | | | | | | |
| 12 | 13 | | | | | | | | | | | | | |

FIG. 1K

LENGTHS OF PRED. VLC #1 (EOB = 2 BITS)

LEVEL (ABSOLUTE VALUE)

| RUN | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 0 | 3 | 5 | 6 | 7 | 9 | 9 | 11 | 11 | | | | | | |
| 1 | 4 | 6 | 9 | 11 | | | | | | | | | | |
| 2 | 5 | 8 | 11 | | | | | | | | | | | |
| 3 | 6 | 9 | | | | | | | | | | | | |
| 4 | 7 | 11 | | | | | | | | | | | | |
| 5 | 7 | 11 | | | | | | | | | | | | |
| 6 | 7 | | | | | | | | | | | | | |
| 7 | 8 | | | | | | | | | | | | | |
| 8 | 8 | | | | | | | | | | | | | |
| 9 | 8 | | | | | | | | | | | | | |
| 10 | 9 | | | | | | | | | | | | | |
| 11 | 9 | | | | | | | | | | | | | |
| 12 | 9 | | | | | | | | | | | | | |
| 13 | 9 | | | | | | | | | | | | | |
| 14 | 11 | | | | | | | | | | | | | |
| 15 | 11 | | | | | | | | | | | | | |

FIG. 1L

LENGTHS OF PRED. VLC #2 (EOB = 2 BITS)

LEVEL (ABSOLUTE VALUE)

| RUN | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 0 | 3 | 4 | 5 | 6 | 6 | 7 | 8 | 8 | 9 | 9 | 9 | 11 | 11 | 11 |
| 1 | 5 | 7 | 9 | 11 | | | | | | | | | | |
| 2 | 6 | 9 | | | | | | | | | | | | |
| 3 | 7 | 11 | | | | | | | | | | | | |
| 4 | 7 | | | | | | | | | | | | | |
| 5 | 8 | | | | | | | | | | | | | |
| 6 | 8 | | | | | | | | | | | | | |
| 7 | 9 | | | | | | | | | | | | | |
| 8 | 9 | | | | | | | | | | | | | |
| 9 | 9 | | | | | | | | | | | | | |
| 10 | 11 | | | | | | | | | | | | | |
| 11 | 11 | | | | | | | | | | | | | |
| 12 | 13 | | | | | | | | | | | | | |

FIG. 1M

LENGTHS OF PRED. VLC #3 (EOB = 3 BITS)

LEVEL (ABSOLUTE VALUE)

| RUN | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 0 | 3 | 4 | 6 | 7 | 9 | 9 | 11 | 11 | | | | | | |
| 1 | 4 | 6 | 9 | 11 | | | | | | | | | | |
| 2 | 4 | 8 | 11 | | | | | | | | | | | |
| 3 | 6 | 9 | | | | | | | | | | | | |
| 4 | 7 | 11 | | | | | | | | | | | | |
| 5 | 7 | 11 | | | | | | | | | | | | |
| 6 | 7 | | | | | | | | | | | | | |
| 7 | 8 | | | | | | | | | | | | | |
| 8 | 8 | | | | | | | | | | | | | |
| 9 | 8 | | | | | | | | | | | | | |
| 10 | 9 | | | | | | | | | | | | | |
| 11 | 9 | | | | | | | | | | | | | |
| 12 | 9 | | | | | | | | | | | | | |
| 13 | 9 | | | | | | | | | | | | | |
| 14 | 11 | | | | | | | | | | | | | |
| 15 | 11 | | | | | | | | | | | | | |

FIG. 1N

LENGTHS OF PRED. VLC #4 (EOB = 4 BITS)

LEVEL (ABSOLUTE VALUE)

| RUN | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 0 | 3 | 4 | 6 | 7 | 9 | 9 | 11 | 11 | | | | | | |
| 1 | 3 | 6 | 9 | 11 | | | | | | | | | | |
| 2 | 5 | 8 | 11 | | | | | | | | | | | |
| 3 | 6 | 9 | | | | | | | | | | | | |
| 4 | 7 | 11 | | | | | | | | | | | | |
| 5 | 7 | 11 | | | | | | | | | | | | |
| 6 | 7 | | | | | | | | | | | | | |
| 7 | 8 | | | | | | | | | | | | | |
| 8 | 8 | | | | | | | | | | | | | |
| 9 | 8 | | | | | | | | | | | | | |
| 10 | 9 | | | | | | | | | | | | | |
| 11 | 9 | | | | | | | | | | | | | |
| 12 | 9 | | | | | | | | | | | | | |
| 13 | 9 | | | | | | | | | | | | | |
| 14 | 11 | | | | | | | | | | | | | |
| 15 | 11 | | | | | | | | | | | | | |

ADAPTIVE MOTION COMPENSATED UNI/BI-DIRECTIONAL PREDICTIVE DECODER

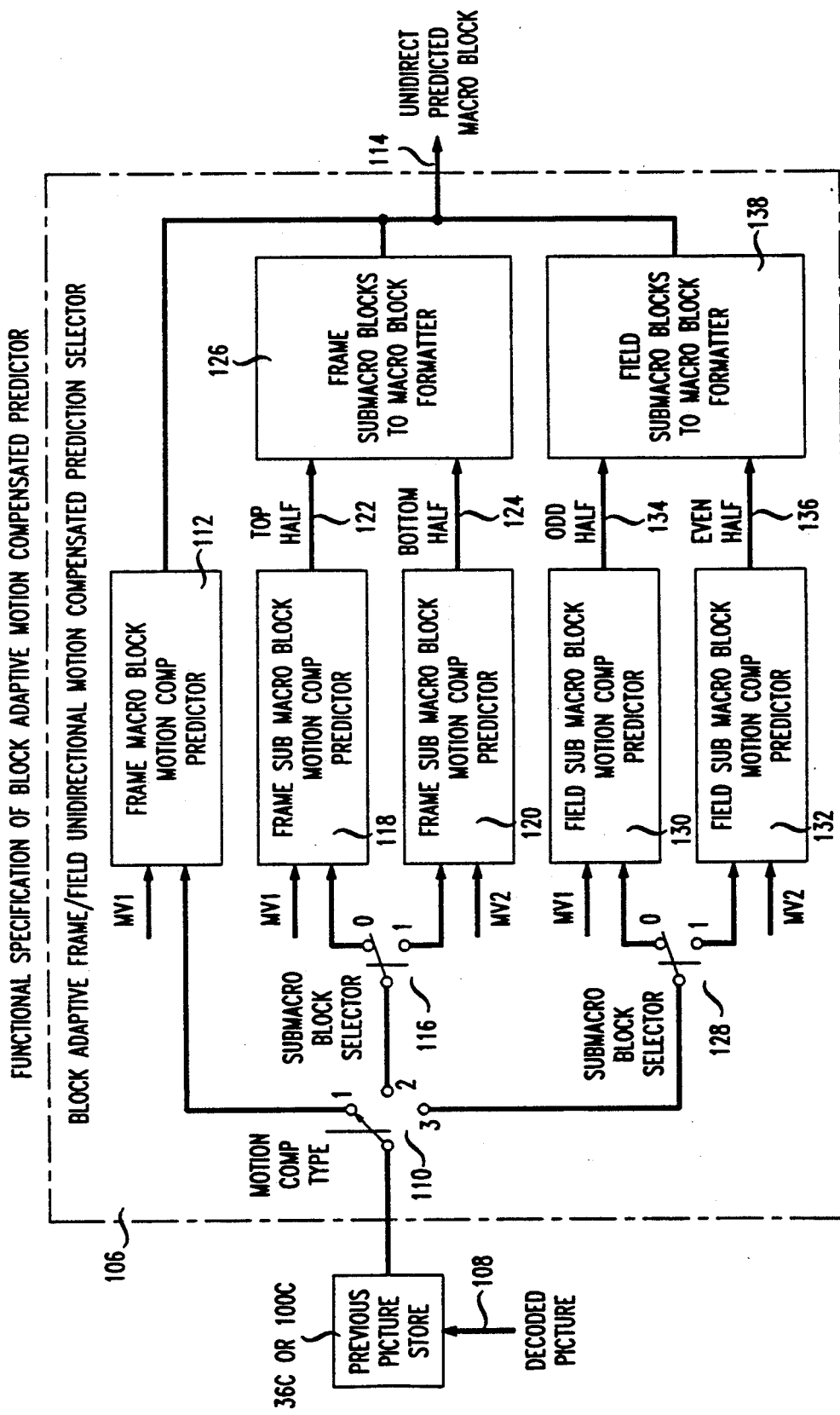

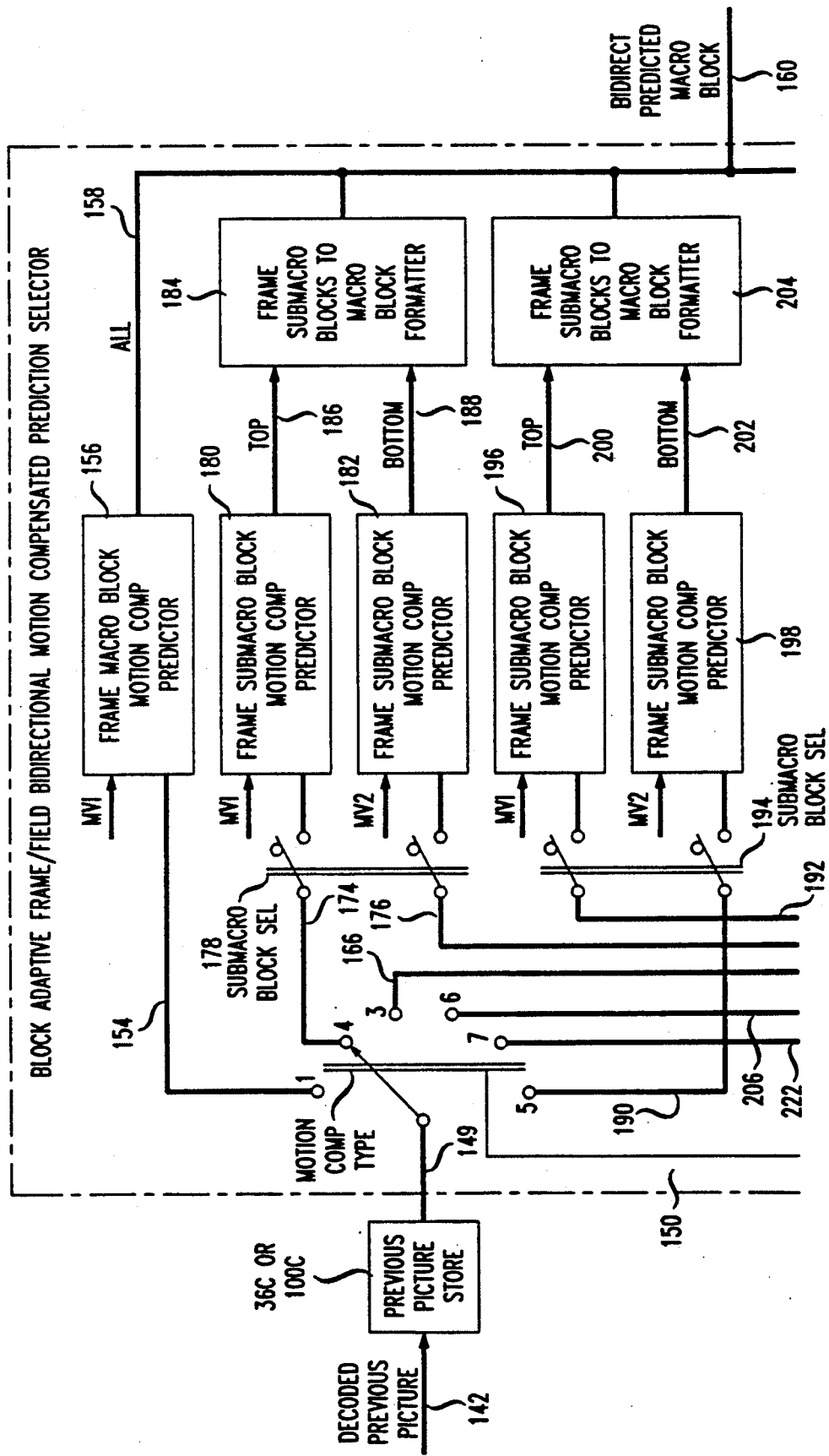
FIG. 4A FUNCTIONAL SPECIFICATION OF BLOCK ADAPTIVE MOTION COMPENSATED BIDIRECTIONAL PREDICTOR

FLOWCHART FOR INTRA DC PREDICTION

EXAMPLE: MACRO BLOCK ADAPTIVE FRAME/FIELD DC PREDICTION

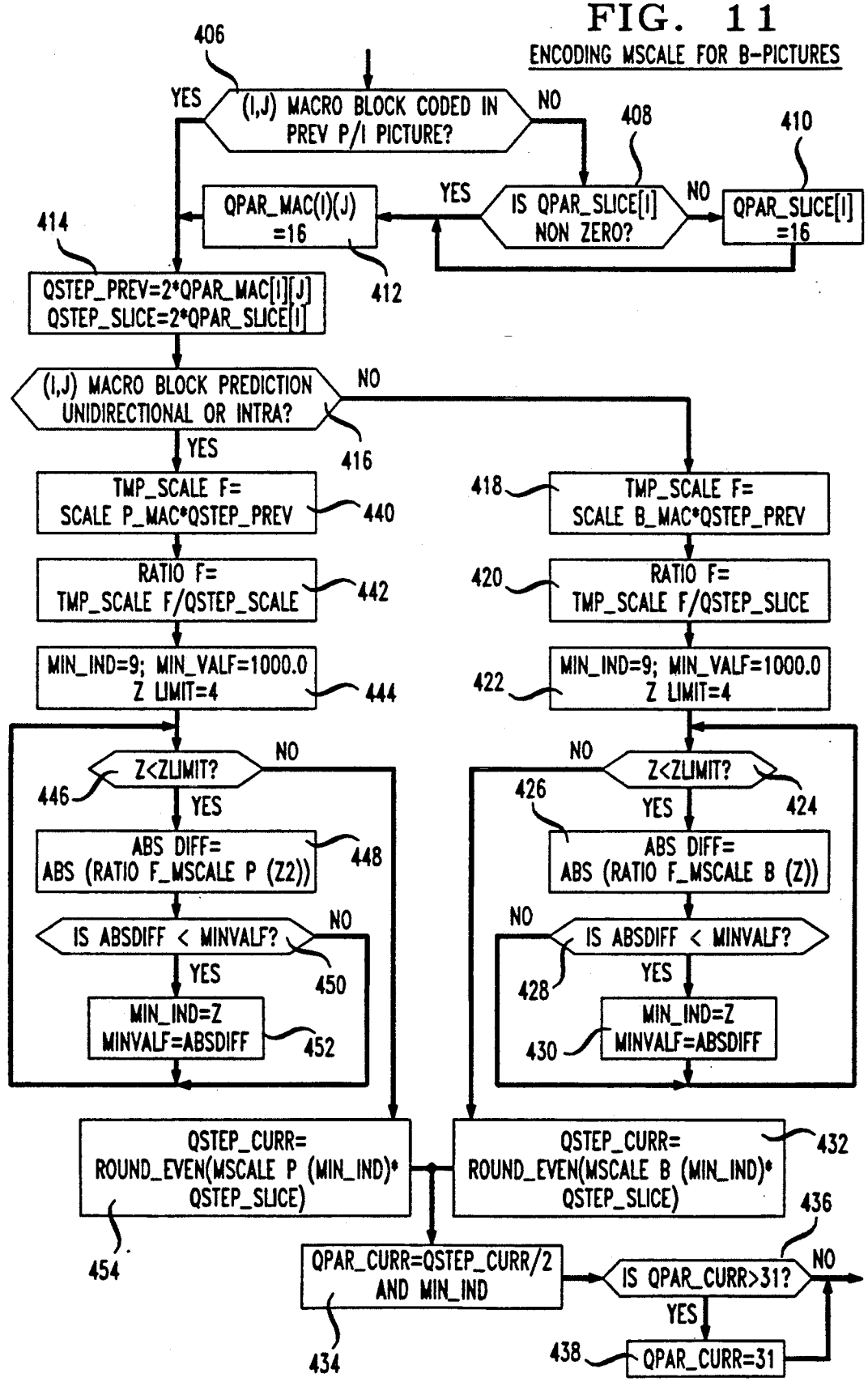

MOTION VECTOR PREDICTION FOR B-PICTURES

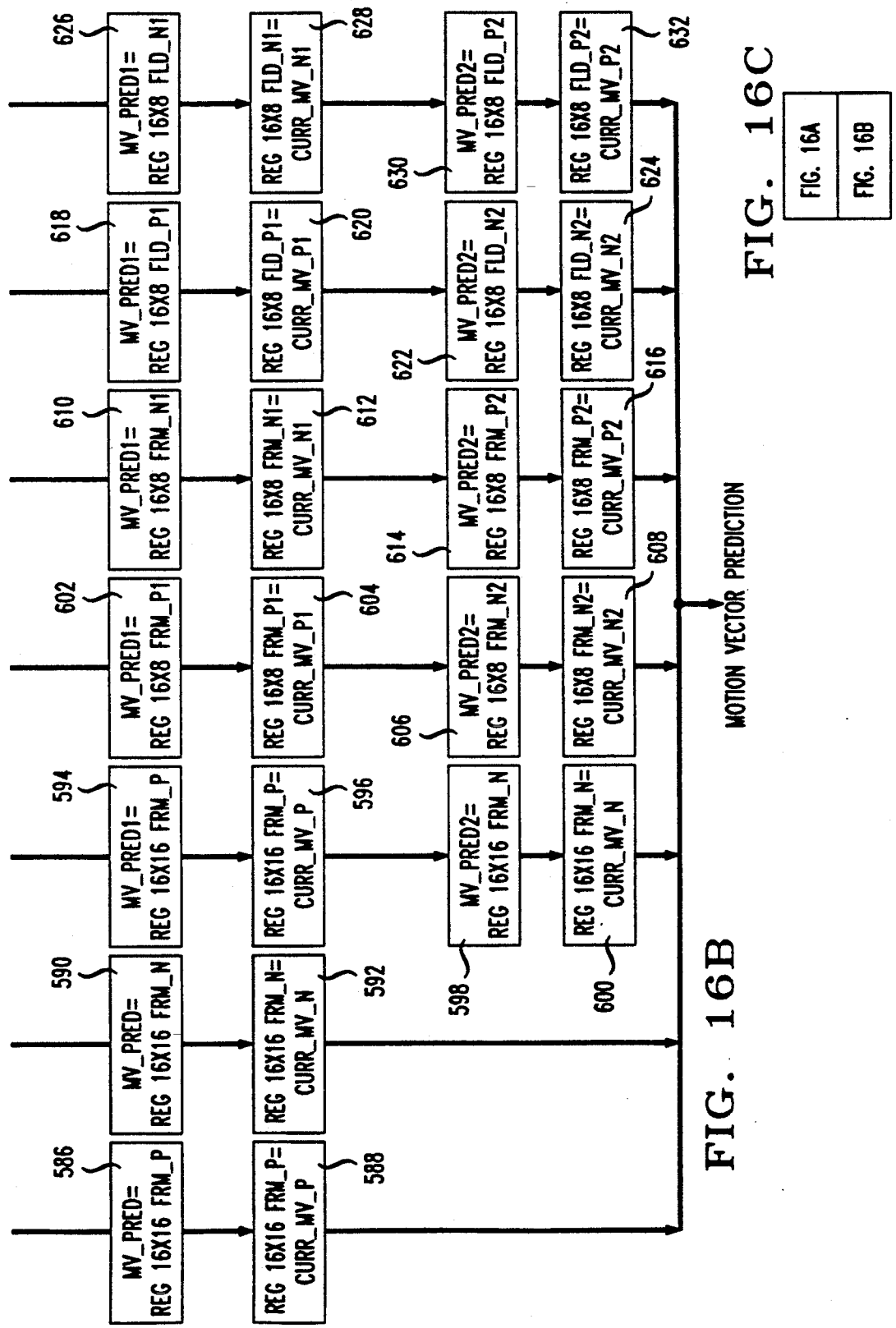

ADAPTIVE CODING AND DECODING OF FRAMES AND FIELDS OF VIDEO

TECHNICAL FIELD

This invention relates to coding and decoding of video signals. More particularly, this invention relates to adaptive encoders and decoders involved in the transmission and reception of digital video signals.

BACKGROUND OF THE INVENTION

Worldwide efforts are underway to improve the quality of video signal production, transmission, and reproduction because a great deal of commercial importance is being predicted for improved quality video systems. These efforts involve, at least in part, increasing the resolution with which are converted into representative electrical signals by increasing the spatial and temporal sampling rates that are used to convert video images into electrical signals. This increase in resolution consequently means that more data about images must be produced, processed, and transmitted in a given period of time.

Video images such as those images in the field of view of a television camera are scanned at a predetermined rate and converted into a series of electrical signals, each electrical signal representing a characteristic of a predetermined region of the image generally referred to as a picture element, pel, or pixel. A plurality of the picture elements taken together at a predetermined instant of time form what amounts to a still picture representing the nature of the image at the predetermined instant of time. Increasing the quality of video signals produced in this manner involves, at least in part, the use of larger number of smaller-size picture elements to represent a given image frame and the production of a large number of image frames per unit time. For example, the CCIR-601 recommendation specifies the number of picture elements in a frame to be 720 horizontal picture elements×486 vertical picture elements (U.S. and Japan) or 576 vertical picture elements (Europe). Thirty or 25 interlaced pictures are produced each second. In high definition television (HDTV) projects, it has been proposed to have about 700-1000 horizontal lines each having 1200-2000 picture elements. These HDTV efforts contemplate production of 25 or 30 interlaced pictures per second or 60 or 50 non-interlaced pictures per second.

As the number of picture elements for each video frame and the rate at which frames are produced increases, these is an increasing amount of video data which must be produced, transmitted, and received in a given period of time. It would be advantageous if video signals produced by these systems could be compressed so that a smaller amount of data could be generated which would still contain enough information so that higher quality video images could be reproduced.

A number of data compression schemes have been proposed which attempt to transmit higher quality video images using the same numbers of bits and the same bit rates used for lower quality images. One such scheme involves an encoder which receives digital video signals representing the characteristics of a sequence of picture elements. The encoder transforms blocks of such video signals into blocks of transform coefficients relating to the spatial frequency components in the areas of the image represented by the blocks of picture elements. The blocks of frequency coefficients are then quantized and scanned according to some predetermined sequence. The quantized frequency coefficients are then sent in the order defined by the scanning sequence to a variable word length coder then encodes the quantized frequency coefficients and then transmits the encoded quantized frequency coefficients. It has been found that less bits need to be sent when these encoded quantized frequency coefficients are sent instead of pixel data bits.

Another data compression scheme which has been proposed involves estimating the characteristics of a segment of video signal and subtracting the estimate from the actual segment of video signal to produce an estimate error signal which is then coded and transmitted instead of the actual segment of video signal. Again, it has been found that a lesser number of bits need to be transmitted when estimation error signals are transmitted in place of pixel data signals.

Yet another technique of compressing video data involves the production and transmission of data representing motion vectors calculated in light of a current segment of video signal and a prior segment of video signal instead of transmission of pixel data. These motion vectors may be used to provide motion compensation for producing more accurate estimates of a video signal and smaller estimate error signals, which thereby reduces the number of bits which must be used to transmit video signals.

Each of these techniques seeks to send data derived from an actual video signal which can be used by a decoder in a receiver of the video signals to reconstruct the actual video signal from a limited subset of the data defined the actual video signal. The actual number of bits which must be transmitted in these situations is less than the number of bits needed to define each picture element in the video signal and, thus, higher resolution video signals may be transmitted at the same bit rate. Although each of these techniques is to a certain degree successful in achieving suitable compression of video data without undue loss of information, there are significant areas whereby the encoding of video data may be improved so that the number of bits which must be transmitted is reduced and an accurate reconstruction may be made by a video decoder.

SUMMARY OF THE INVENTION

Improved compression of video data is achieved by an adaptive video frame/field encoder and decoder. In one example of the invention, different size blocks of video data are processed to achieve different modes of coding and different modes of motion estimation. The behavior of an encoder in accordance with one example of the invention and the behavior of a corresponding decoder adapt to certain characteristics of the video image. This adaptive behavior involves changing between a process of coding and decoding information from a frame of video or coding and decoding information from a field of video. In a more specific example, this invention involves an adaptation between coding and decoding information from a frame of video data or coding and decoding information from each of a plurality of interlaced fields of video data. Depending upon the coding mode used, certain steps may be taken, either individually or in any combination, to improve the compression and decompression of video data. In specific examples, appropriate quantization is chosen, different scanning techniques are adopted, different techniques of predicting certain components of the video signals are used, or different motion compensation modes are employed. The benefits of this invention are useful for all video systems involving digital video signals, including high definition television and video telecommunication systems.

BRIEF DESCRIPTION OF THE DRAWINGS

FIG. 1 is a block diagram representing a video signal encoder in accordance with this invention.

FIGS. 1b and 1c illustrate examples of block scans useful in one example of the invention.

FIGS. 1d to 1k illustrate examples of tables identifying the lengths of variable length codes used in one example of the invention.

FIG. 3 is a block diagram representing the functional specification of a block adaptive motion compensated unidirectional predictor in accordance with this invention.

FIG. 11 is a flow chart illustrating the encoding of an mscale parameter for B-pictures in one example of the invention.

DETAILED DESCRIPTION

Figure 1A:
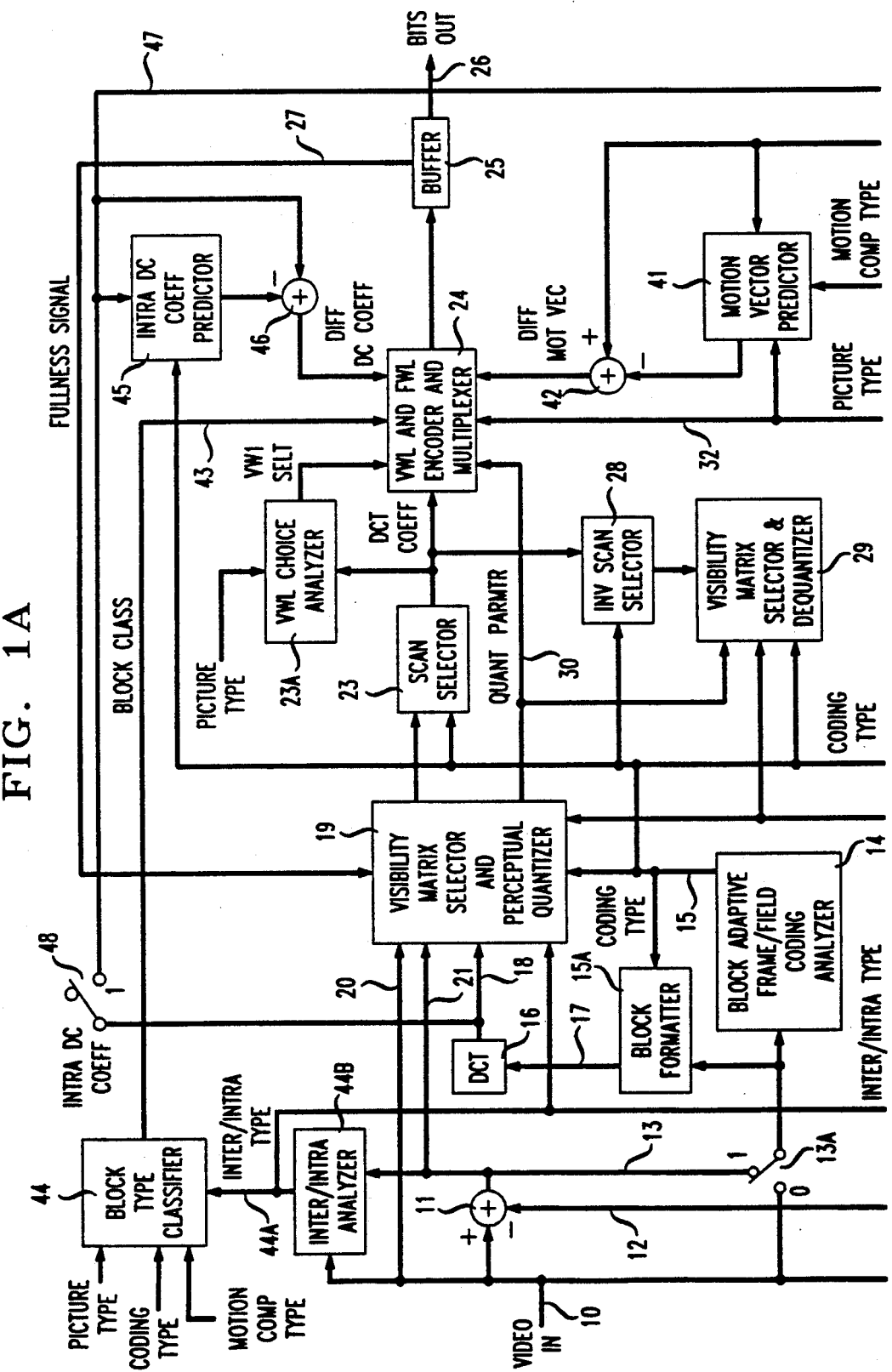
FIG. 1a is an illustration of a group of pictures structure useful in one example of the invention.
Figure 1D:
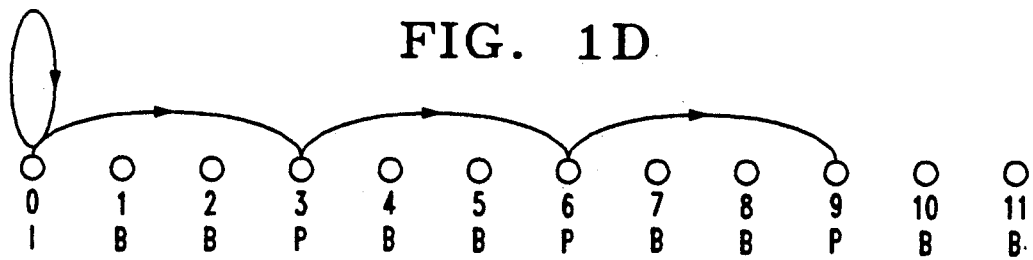
Figure 1E:
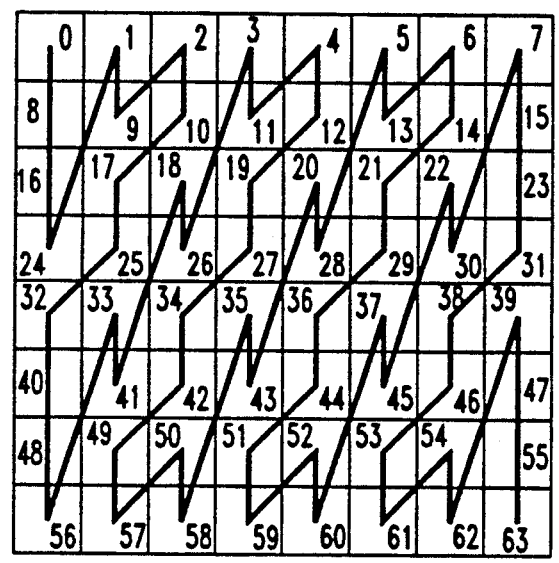
Figure 1F:
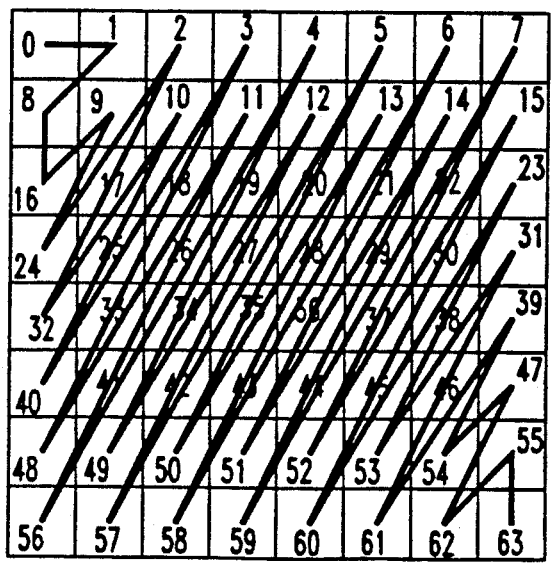

FIG. 1 shows an adaptive motion compensated predictive/interpolative encoder in accordance with one example of this invention. The encoder of FIG. 1 receives digital video input signals on an input line 10 and compresses those video input signals for transmission to a receiver which decompresses those signals to produce video images. The digital video input signals are spatial and temporal samples of a video image and may be produced by scanning an image field and producing an electrical signal relating to the characteristics of the image field at predetermined points. The characteristics determined in the scanning operation are converted into electrical signals and digitized. The video input signals comprise a succession of digital words, each representing some information at a particular instant of time about a small region of the image field generally referred to as a picture element. A complete set of digital representations for the image at a particular instant of time is called a frame or a picture. Each frame may be considered to be composed of a number of smaller regions generally known as fields; for example, each frame may be composed of two interlaced fields representing odd- and even-numbered horizontal lines or rows of picture elements in the image. The frame may also be considered to represent a number of macroblocks, submacroblocks, and blocks of picture elements which are groups of contiguous picture elements, for example, 16×16 macroblocks of picture elements, 16×8 sublocks of picture elements, and 8×8 blocks of picture elements.

The digital input video signal may be a monochrome video signal or a color video signal. In the case of a monochrome video signal, each frame may comprise a set of digital representations of the brightness or intensity of a two-dimensional array of picture elements which make up a video image. In the case of a color video signal, each picture comprises not only a brightness component but also a color component. For example, in the CCIR 601 recommendation, a color video signal picture (i.e., a temporal sample of the image) may be composed of a luminance frame of 720 horizontal picture elements×480 vertical picture elements and two chrominance frames Cb and Cr at ½ resolution of 360 horizontal picture elements×240 vertical picture elements each. A sequence of such pictures may be transmitted at a rate of 29.97 pictures per second. The luminance frame is formed as the interlaced union of the two constituent CCIR-601 luminance fields, while the chrominance frames are derived by filtering and sub-sampling the respective 4:2:2 CCIR-601 chrominance frames.

For the purpose of illustrating a specific example of the invention, the description below will assume that the video signal on input line 10 is a video signal in accordance with the CCIR 601 recommendation. Those skilled in the art will appreciate that the principles of the invention are applicable to other types of video signals, such as HDTV video signals. To assist in the description of the example of the invention shown in FIG. 1, some terminology should be defined. A block is an 8-horizontal-row by 8-vertical-column array of contiguous picture elements. Blocks may be groups of luminance data or groups of chrominance data. A macroblock is composed of four contiguous 8×8 luminance data blocks and the two 8×8 chrominance data blocks corresponding to the area of the image represented by the four luminance data blocks. A slice is one horizontal row of macroblocks starting at the left edge of the picture and ending at the right end of the picture. A luminance frame is formed as an interlaced union of two CCIR 601 luminance fields. One field comprises even-numbered horizontal rows of picture elements and the other field comprises odd-numbered horizontal rows of picture elements.

Figure 2:
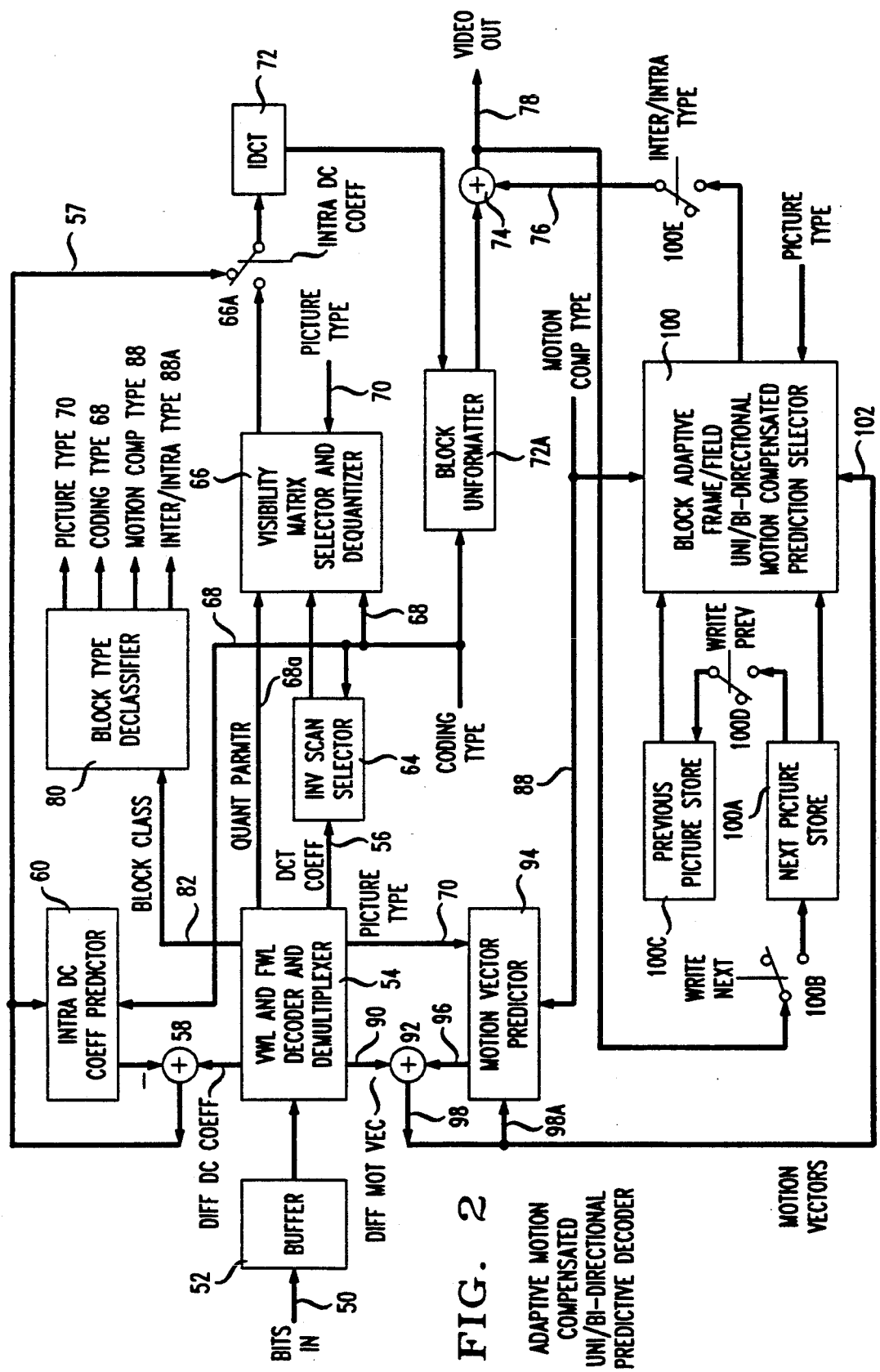
FIG. 2 is a block diagram representing a video signal decoder in accordance with this invention.

In the examples of the invention shown in FIGS. 1 and 2, a plurality of picture types are encoded and decoded. Specifically, I-pictures, P-pictures, and B-pictures are encoded and decoded. I-pictures or intracoded pictures are pictures which are coded and decoded without reference to any other pictures. P-pictures, or predicted pictures are pictures which are coded in light of a previous picture. Motion compensation may be used to produce P-pictures. B-pictures, or bidirectionally predicted pictures are pictures which are coded in light of characteristics of a previous I- or P-picture and future I- or P-picture. As in the case of P-pictures, B-pictures may also be coded by using motion compensation. In appropriate circumstances, P-pictures and I-pictures may have some of their blocks coded in the same fashion that the blocks of the I-pictures are coded, i.e., without reference to other pictures ("intra coding"). A Group-of-Picture (GOP) structure is used in this example with N=12 and M=3 in Motion Picture Experts Group (MPEG) parlance. This GOP consists of one intra-coded I-picture, 3 predictively coded P-pictures, and 8 bidirectionally predictive code B-pictures. This GOP ensures that a complete I-picture occurs every 12/29.97 (approximately 0.4) seconds, which is hence the maximum delay for acquiring a picture from a bit stream. See FIG. 1a.

A picture is divided into macroblocks where a macroblock is a 16×16 luminance block plus the co-sited 8×8 Cb- and Cr-blocks (one of each). This definition, however, is easily extended to full CCIR-601 vertical chrominance resolution, where a 16×16 luminance block is associated with two 8×8 Cb and two 8×8 Cr blocks. The macroblock is the unit for which motion-compensation and quantization modes are defined. A slice is defined to be one row of macroblocks, starting at the left edge of the picture and ending at the right edge.

The digital video input signal on input line 10 is encoded into a compressed bit stream by the encoder shown in FIG. 1 which may be transmitted on output line 26 to another location having a receiver which may decode the bit stream and produce a video image. One important feature of the encoder of FIG. 1 is that a variety of coding techniques may be employed in appropriate circumstances to efficiently compress the video input signal on line 10 and to permit accurate reconstruction of the video image in the decoder without significant loss of information. Specifically, the encoder of FIG. 1 adaptively selects its coding operation so that either coding of frames in the video signal or coding of the interlaced fields in the frames of the video input signal takes place. Once the type of coding to be used for the video input signal has been selected, a variety of techniques used to compress video data may be improved in an adaptive fashion in light of the coding technique adopted to the encoder of FIG. 1. For example, techniques of estimating future video signals may be made more accurate. Techniques of using motion compensation with these estimation techniques are also improved. In addition, items such as quantization procedures, scanning techniques, DC coefficient prediction, and variable word length coding may also be improved.

Two basic quantization and coding modes are allowed for a macroblock: frame coding and field coding. These quantization and coding modes are completely independent of the motion-compensation modes. In frame coding, four 8×8 luminance subblocks are formed from a macroblock. In field coding, four 8×8 luminance subblocks are derived from a macroblock by separating the lines of the two fields, such that each subblock contains only lines of one field. Frame coding is superior to field coding where there is not much motion between the two fields, and field coding is superior when there are detailed moving areas. The mode decision is made in the pixel domain once for the entire macroblock. An 8×8 DCT is then applied to each frame subblock or field subblock, depending on the mode selected.

The digital video input signal on input line 10 in FIG. 1 is directed to the noninverting input of a summing element 11. An inverting input of the scanning element 11 receives a signal on line 12 related to an estimate of the video input signal on line 10. The estimate for P-pictures is based upon a prediction made in light of past I- and P-pictures. The estimate for B-pictures is based upon a prediction made in light of past and future I- and P-pictures. No estimate is made for I-pictures and intra-coded portions of P- and B-pictures, so that the estimate signal on line 12 in these situations are zero, as indicated symbolically in FIG. 1 by the opening of an inter/intra type switching element 13b in series with line 12. The summing element 11 produces an output signal on line 13 which is related to the error between the digital video input signal on line 10 and the estimate signal on line 12. The estimate error signal on line 13 is directed to the input of a block adaptive frame/field coding analyzer 14. The coding analyzer 14 examines predetermined characteristics of the video input signals on line 10 or of the estimate error signal on line 13, depending on the state of a switching element 13a and makes a decision as to the type of coding to be used by the encoder of FIG. 1. The analyzer 14 decides, when the switching element 13a connects line 13 to the input of the analyzer 14, whether or not it would be advantageous to either code the frames of the estimate error signal on line 13 or to code the interlaced field of that estimate error signal. When the switching element 13a connects the input signal on line 10 to the input of the analyzer 14, the analyzer decides whether or not it would be advantageous to either code the frames of the input signal on line 10 or to code the interlaced fields of that input signal on line 13. The nature of analyzer 14's decision is indicated by the production of a coding type signal on line 15. In a specific example of the invention using a video input signal produced by an interlace scanning technique, the selector 14 checks to see whether or not there are similarities in adjacent or alternating horizontal scan lines in the input signal or the estimate error signal. If the selector finds that the differences between adjacent scan lines are less than the differences between alternate scan lines, then the selector 14 produces a coding type signal on line 15 which indicates that frames of video information in the estimate error signal or the input signal are to be coded by the encoder of FIG. 1. If the selector 14 finds that the differences between adjacent scan lines are greater than the differences between alternate odd and even scan lines, then the selector 14 produces a coding type signal on line 15 which indicates that each field of oddly numbered scan lines and each field of evenly numbered scan lines are to be coded separately.

The input signal on line 10 or the estimate error signal on line 13 is selectively directed to the input of a block formatting circuit 15a, depending on the state of the switching element 13a. The formatting circuit 15a is also responsive to the coding type signal on line 15 to direct the signals on either line 10 or line 13 in proper order on a line 17 to the input of a discrete cosine transform circuit 16. When field coding has been selected by selector 14, the order in which the data comprising the input signal on line 10 or the estimate error signal on line 13 is changed so that first oddly numbered scan lines are consecutively directed to the input of a discrete cosine transform circuit 16 on the input line 17 followed by consecutive evenly numbered scan lines, or vice versa. The discrete cosine transform circuit 16 then converts each submacroblock of either evenly numbered or oddly numbered scan lines to a matrix of transform coefficients representing, in this example of the invention, spatial frequency components in the portion of the image represented by each submacroblock.

When frame coding has been chosen by the selector 14, each macroblock is sent to the discrete cosine transform circuit 16 on line 17 in the order they were received at the input of selector 14 on line 13. The discrete cosine transform circuit 16 then converts each block in the macroblock into a similarly sized matrix of transform coefficients representing, in this example of the invention, spatial frequency components in the portion of the image represented by each macroblock.

In addition to frame coding of entire macroblocks and field coding of submacroblocks representing oddly numbered and evenly numbered scan lines, the selector 14 may also be configured so that it may direct the encoder of FIG. 1 to code other kinds of submacroblocks such as groups of contiguous blocks which are smaller than the size of a macroblock.

The transform coefficients produced by the discrete cosine transform circuit 16 are directed on output line 18 to the input of a visibility matrix selector and perceptual quantizer 19. The quantizer 19 divides each of the transformed coefficients from discrete transform circuit 16 by predetermined scaling factors in one of a plurality of visibility matrices and a quantization parameter determined in light of the characteristics of the digital input signal communicated to the quantizer 19 on line 20 and in light of the characteristics of the estimate error signal communicated on the quantizer 19 on line 21. The amount by which the transform coefficients are quantized is also determined by the coding type signal produced by the selector 14 on line 15. The coding type signal is used by the quantizer 19 to adjust the quantization levels applied to the transform coefficients from discrete cosine transform circuit to improve the compression of video signals produced by the operation of the quantizer 19.

For AC-coefficient quantization, a 5-bit quantization parameter and a set of quantizer matrices are employed. Quantization is performed with a dead-zone for nonintra coding and without one for intra coding. This example of the invention allows four different quantizer matrices: one for each of the combinations of intra-/nonintra- and frame/field-coded macroblocks. There are no default matrices specified; the ones used are loaded and transmitted at the sequence layer. The Cb- and Cr-subblocks use the same matrices as the luminance subblocks.

In I-pictures, all macroblocks are coded, and the 5-bit quantization parameter is transmitted for every macroblock. In P- and B-pictures, some macroblocks may contain no coded coefficient data. A one-bit flag is sent for each macroblock to signal whether the macroblock is coded or not. In P-pictures, the quantization parameter is then transmitted for every coded macroblock.

In B-pictures, a 5-bit quantization parameter is transmitted at the start of every slice. A two-bit index (denoted mscale addr) is transmitted for every coded macroblock in the slice that identifies one of four multipliers (all of which are transmitted at the sequence layer). The slice quantization parameter is multiplied by the selected multiplier (denoted mscale) and the product rounded to the nearest integer and limited to 5 bits. The resulting number becomes the quantization parameter for that macroblock.

A coded block pattern framework (for signalling which of the subblocks inside a macroblock contain coded data) is used only with B-pictures.

Once the AC coefficients are quantized, they are coded for transmission. A scanning matrix ("scan") defines the order in which they are processed for encoding. Two fixed scans are defined: one for use in the frame-coding mode and the other for use in the field-coding mode. These scans do not change with the picture type in this example of the invention. See FIG. 1b and 1c.

Run-length and level combination are VL-coded for non-zero quantized AC coefficients. For each macroblock in I- and P-pictures, the encoder is allowed to choose one codebook out of a small number of codebooks. In this example of the invention, four codebooks for I-pictures and four for P-pictures are used. These eight codebooks are derived basically by permuting a set of codewords. Among other things, they differ in the length of the end of block (EOB) codeword (2, 3 or 4 bits). The lengths of the codewords in the top left corner of each codebook are shown in FIGS. 1d–1k.

For a particular macroblock in an I- or P-picture, the codebook yielding the smallest bit-count is selected, and signalled to the decoder with a 2-bit identifier. In B-pictures, this overhead for codebook selection was found to be excessive; therefore, one fixed codebook is used for all macroblocks in B-pictures. This codebook is one of the four used with P-pictures, and is the one shown in FIG. 1b.

In FIG. 1, the quantized transform coefficients are scanned by a scan selector circuit 23 in a predetermined order and sent to an encoder and multiplexer 24 which may select between a fixed word length codings of the transform coefficients or one or more variable word length coding of the transform coefficients. The scan analyzer 23 is responsive to the coding type signal produced by the selector 14 on line 15. The scan selector 23 determines one of a plurality of possible scanning orders which may be used to direct the transform coefficients to the encoder and multiplier 24. The order which the scanning selector 23 choses is based on what order may most conveniently be used by the encoder and multiplexer 24 to most efficiently code the transform coefficients with the fewest number of bits. For example, when frame coding has been used, the scan selector 23 may be configured to perform a zig zag scanning of the transform coefficients in the quantizer 19. When field coding has been used, the scan selector 23 may perform vertical scanning of the quantized transform coefficient in the quantizer 19. One of the strategies which may be employed in scanning the quantized transform coefficients in a strategy which will group like valued coefficients together for sequential transmission to the encoder and multiplexer 24. Examples of scanning sequences for frame block scans and field block scans are illustrated in FIGS. 1a and 1b, respectively. When like-valued coefficients are grouped together, a more efficient coding, such as a variable word length coding may be employed by the encoder 24. Longer word lengths may be used to represent higher valued coefficients while shorter word lengths may be used to represent coefficients having a value of zero or close to zero. An end of block (EOB)

code may be used to transmit pluralities of like valued coefficients.

As described in more detail below, the circuit of FIG. 1 includes a variable word length choice analyzer 23a which is responsive to the DCT coefficients output by the scan selector 23 and the picture type signal from line 32. The analyzer 23a produces a variable word length table select signal which is input to the encoder and multiplexer 24 and which is used by the encoder and multiplexer 24 to select one of a plurality of code tables which may be used to perform different kinds of fixed word length and variable word length coding of the DCT coefficients.

In addition to transmitting encoded transform coefficients, the encoder and multiplexer 24 receives and transmits along with the encoded coefficients a number of control signals which are used by a decoder in a video signal receiver to create a video image from the coded signals produced by the encoder in FIG. 1. These control signals include a signal related to the quantization parameter produced on line 30 between the quantizer 19 and the encoder and multiplexer 24. These control signals also include a picture type signal on line 32, which may be produced by an independently running sequencer not shown in FIG. 1. FIG. 1a shows an example of a sequence of I-, P-, and B-pictures which may be used. The picture type signal on line 32 represents what kind of picture is being produced by the encoder of FIG. 1, namely, either an I-, P-, or B-picture in this example of the invention.

The words produced by the encoder 24 are sent to a buffer 25 which then directs those words in an output bit stream on an encoder output line 26 at appropriate times. A fullness signal is produced on line 27 which is directed to an input of the quantizer 19 which thereby controls its operation to prevent the buffer 25 from overflowing or underflowing.

The production of an estimate of the digital video input signal is now described. The transform coefficients on the output of the scan selector 23 are connected to the input of an inverse scan selector 28 which rearranges the transform coefficients into the order they had in the quantizer 19 prior to being scanned by the scan selector 23. As shown in FIG. 1, the inverse scan selector 28 is also responsive to the coding type signal on line 15 which notifies the inverse scan selector 28 of the predetermined order into which the quantized transform coefficients were ordered by the scan selector 23 and thereby is the mechanism by which the inverse scan selector 28 is able to use the correct inverse scanning sequence. The transform coefficients as reordered by the inverse scan selector 28 are directed to a visibility matrix selector and dequantizer 29 which performs an inverse quantization procedure on the transform coefficients which basically reverses the operation of the quantizer 19. As shown in FIG. 1 the dequantizer 29 is responsive to the coding type signal on line 15 and the quantization parameter produced by the quantizer 19 to determine the correct dequantization procedure.

The output of the dequantizer 29 is directed to the input of an inverse discrete cosine transform circuit 34 which produces an output signal corresponding to the estimate error signal produced on line 13. The output signal from the inverse discrete cosine transform circuit 34 is directed on the noninverting input of a summing element 36 which receives at its inverting input a signal on line 38 which is related to an estimate of the video input signal on line 10. The output of the summing element 36 is directed to a next previous picture store 36a via a write next switching element 36b between the output of the summing element 36 and the input of the next picture store 36a. The output of the summing element 36 represents a frame of video data which has been coded by the encoder of FIG. 1. Writing a picture into the next picture store 36a causes a picture previously stored in the next picture store 36a to be written into a previous picture store 36c via closure of a write previous switching element 36d.

A motion estimation circuit 37 receives the digital video input signal from line 10, signals relating to the contents of the stores 36a and 36c, and the picture type signal from line 32. The motion estimation circuit 37 produces signals related to motion vectors which are used by an estimation circuit 38 which produces an estimate or prediction of the video input signal on line 10. An estimation circuit 38 is responsive to the contents of the stores 36a and 36c and the motion vectors produced by the motion estimation circuit 37 to produce a motion compensated estimate of the video input signal on line 10.

The motion compensated estimate produced by the estimation circuit 38 in this example of the invention, involving the previously described macroblock structure of video signals, takes into account the fact that a macroblock contains two interlaced fields of luminance pixels. Accordingly, two main categories of motion compensation are used by the estimation circuit 38, namely, a frame motion compensation mode and a field motion compensation mode. In the frame motion compensation mode, picture elements of an entire frame are predicted on a macroblock by macroblock basis from picture elements in reference frames. In the field compensation mode, the picture elements of one field are predicted only from pixels of reference fields corresponding to that one field. For example, pixels in a field of oddly numbered scan lines are predicted only from pixels in a reference field of oddly numbered scan lines.

In addition to having different motion compensation modes based on prediction of frames or fields of picture elements, there can be other modes of compensation based on the type of pictures being handled. In this example of the invention, the modes of compensation can also be based on whether P-pictures or B-pictures are being predicted. (No prediction is made for I-pictures). Examples of motion compensation types are summarized below.

A. Motion Compensation Modes for P-pictures 1. 16×16 frame motion compensation mode (type 1)

In this mode, the 16×16 luminance block is compensated by another 16×16 block from a reference frame which is fetched using one forward motion vector. No distinction is made between the picture element scan lines of the interlaced fields. The prediction block contains picture elements of both fields of the reference frame.

2. 16×8 frame motion compensation mode (type 2)

In this mode, the 16×16 luminance block is divided by a horizontal line of demarcation into a top 16×8 subblock and a bottom 16×8 subblock. Each subblock is independently compensated using a forward motion vector. Again, no distinction is made between the scan lines of the two interlaced fields making up the luminance subblocks. Two motion vectors are created and transmitted for each macroblock in this mode.

3. 16×8 field motion compensation mode (type 3)

In this mode, the 16×16 luminance block is separated by field polarity, namely, by oddly numbered and evenly numbered scan lines, into two 16×8 subblocks. Each of the 16×8 subblocks contains only picture elements lines of one of the interlaced fields in the original 16×16 luminance block. Each field subblock is compensated independently using a separate forward motion vector with a 16×8 subblock that is derived from picture element scan lines of a field of the same polarity in the reference frame. Two motion vectors are created and transmitted for each macroblock in this mode.

B. Motion Compensation Modes For B-pictures 1. 16×16 bidirectional (P and N) frame motion compensation mode (type 3)

A forward (from a previous [P] frame) motion vector fetches a 16×16 block from a past reference frame and a backward (from a new [N] frame) motion vector fetches a 16×16 block from a future reference frame. The 16×16 blocks are averaged to yield a final prediction block.

2. 16×16 forward (P) unidirectional frame motion compensation mode (type 1)

This is a forward unidirectional predictional mode in which only one forward motion vector is used for each macroblock.

3. 16×16 backward (N) unidirectional frame motion compensation mode (type 2)

This is a backward unidirectional predictional mode in which only one backward motion vector is used for each macroblock.

4. 16×8 frame motion compensation mode (type 4); top-forward (P1) with bottom-backward (N2)

In this mode the 16×16 luminance block is divided by a horizontal line of demarcation into a 16×8 top subblock and a 16×8 bottom subblock. The top subblock is compensated using a forward motion vector which fetches a 16×8 block from a past reference frame. The bottom subblock is compensated using a backward motion vector which fetches a 16×8 block from a future reference frame. Two motion vectors are produced and transmitted for each macroblock in this mode.

5. 16×8 frame motion compensation mode (type 5); top-backward (N1) with bottom-forward (N2)

This mode is similar to the mode B.4. described above. The top subblock is compensated using a backward motion vector and the bottom subblock is compensated using a forward motion vector.

6. 16×8 field motion compensation mode (type 6); odd-forward (P1) with even-backward (N2)

In this mode the 16×16 luminance block is separated by field polarity into two 16×8 field subblocks. One of the field subblocks contains the oddly numbered picture element scan lines and the other field subblock contains the evenly numbered picture element scan lines. The 16×8 field subblock containing the oddly numbered field lines is compensated using a forward motion vector and another 16×8 subblock derived from only the oddly numbered scan lines of a past reference frame. Similarly, the 16×8 field subblock containing the evenly numbered field scan lines is compensated using a backward motion vector and a 16×8 subblock derived from only the evenly numbered field lines of a future reference frame. Two motion vectors are produced and transmitted per macroblock in this mode.

7. 16×8 field motion compensated mode (type 7); odd-backward (N1) with even-forward (P2)

This mode is similar to mode B.6. described above with the 16×8 subblock containing the oddly numbered field lines being compensated by using a backward motion vector and a subblock from a future reference frame and the 16×8 block containing the evenly numbered field lines compensated using a forward motion vector and a subblock from a past reference frame. Two motion vectors are produced and transmitted per macroblock in this mode.

The motion estimation circuit 37 thus may produce motion vectors needed to effectuate a variety of motion compensation modes. These motion vectors are transmitted to the estimation circuit 38 via a line 39 and are used by the estimation circuit to perform in an adaptive motion compensated prediction of the video input signal on line 10.

The estimation circuit is composed of two main parts, a block adaptive frame/field uni/bidirectional motion compensated prediction analyzer 38a and a block adaptive frame/field uni/bidirectional motion compensated prediction selector 38b. The prediction analyzer 38a is responsive to the motion vectors produced by the motion estimation circuit 37, the picture type signal from line 32, and the contents of the next picture store 36a and the previous picture store 36c. The prediction analyzer 38a produces a motion compensation type signal on line 38c which identifies which one of the motion compensation odes, such as the compensation modes described here, is used to produce an estimation of the video input signal on line 10. The prediction selector 38b takes appropriate ones of the motion vectors computed by the motion estimation circuit 37 and the motion compensation type signal on line 38c and computes an estimation of the video input signal on line 10. The estimate is produced in light of appropriate ones of the frames stored in stores 36a and 36c.

Each motion vector component in encoded differently, with respect to a previously transmitted component. The motion vectors produced by the motion estimation circuit 37 are also transmitted on a line 40 to a motion vector prediction circuit 41 and to summing element 42. The motion vector prediction circuit 41 also receives the picture type signal on line 32 and the motion compensation type signal on line 38c, which identifies the motion compensation mode being used by the estimation circuit 38. The circuit 41 produces an output signal to the inverting input of the summing element 42 which is related to a predicted value of the motion vector produced by the motion estimation circuit 37. The summing element 42 subtracts the motion vector estimate from the motion vector signal on line 40 and produces a differential motion vector signal which is directed to the input of the encoder and multiplexer 24. The encoder and multiplexer 24 sends the differential motion vector signal to the buffer 25 for insertion into the output bit stream on line 26. The differential motion vector signal will be used by a decoder to reconstruct a video image in accordance with the video input signal on line 10.

The decoder and multiplexer 24 also receives a block classification signal on line 43 which is produce by a block type classification circuit 44 in response to the previously described picture type signal, coding type signal, and motion compensation type signal.

The block type classification circuit 44 also receives an inter/intra type signal on line 44a which identifies whether intercoding or intracoding is being used for the block of video being classified. The inter/intra type signal is produced by an inter/intra analyzer circuit 44b which receives the video input signal on line 10 and the estimate error signal on line 13. The analyzer circuit 44a determines and compares the energies present in the input signal and the estimation signal and makes a decision as to whether inter or intra coding is to be used. Inter coding, namely, coding of the estimate error signal on line 13, is used for P- and B-pictures when the energy of the estimate error signal is less than the energy of input signal. Sometimes in P- and B-pictures, such as in the situation where there is a scene change, it would be advantageous to code in an intra fashion, namely, to code the input video signal on line 10 instead of the estimate error on line 17. This is the case when the energy in the video input signal on line 10 is less than the energy in the estimate error signal on line 13. When this condition is sensed by the analyzer circuit 44b, the inter/intra type signal indicates that intra coding is to be used. As shown in FIG. 1, the inter/intra type coding signal from analyzer 44b controls the states of switching element 13a and the inter/intra type switching element 13b. The inter/intra coding type signal from the analyzer 44b also is directed to the input of the quantizer 19 to control the quantizing operation in accordance with how the video data is being coded. The inter/intra coding type signal is also a part of the block classification signal sent to the encoder and multiplexer 24.

The block classification signal on line 43 is transmitted to the buffer 25 by the encoder and multiplexer for insertion into the output bit stream on line 26. The block classification signal is used by a decoder to create an image in accordance with the video input signal on line 10.

All macroblocks in I-pictures are intra coded; intra coding of macroblocks is also allowed in P- and B-pictures. In intra coded macroblocks (field or frame mode), the DC coefficient of each subblock is uniformly quantized to 255 levels. DC-prediction is then employed to reduce the number of bits needed to encode the DC coefficients. Two predictors are maintained for luminance DC-prediction to increase its efficiency in switching between the frame- and field-coding modes. For chroma DC-prediction, one predictor suffices for each color component. All DC predictors are reset to zero at the start of a slice and at a nonintra coded macroblocks.

A signal on line 47 related to the magnitudes of intra coded DC coefficients produced by the discrete cosine transform circuit 16 is directed to the input of an intra DC coefficient prediction circuit 45 and the non-inverting input of a summing element 46. The switch 48 in line 47 symbolically represents the direction of only the intra DC coefficients produced by the discrete cosine transform circuit 16 to the input of the intra DC coefficient prediction circuit 45 and the summing element 46. The prediction circuit 45 also receives the coding type signal produced by the coding analyzer 14. The prediction circuit 45 produces an output relating to a predicted value of the intra code DC coefficient and directs that output signal to the inverting input of the summing element 46. The noninverting input of the summing element 46 receives the actual intra DC coefficient. The summing element 46 subtracts the prediction from the DC coefficient to produce a differential DC coefficient prediction which is directed to the input of the encoder and multiplexer 24. The differential DC coefficient is directed by the encoder and multiplexer 24 to the buffer 25 for insertion into the bit stream on output line 26. A decoder uses the differential DC coefficient to construct an image in accordance with the video input signal 10.

FIG. 2 shows an adaptive motion compensated uni-/bi-directional predictive/interpolative decoder which may be used to decode the output bit stream produced by an encoder such as the one shown in FIG. 1. An input bit stream is received by the decoder of FIG. 2 on an input line 50. The input bit stream on line 50 is placed in a buffer 52 and then sent to a variable word length decoder and demultiplexer 54 which performs a decoding and demultiplexing operation which is the inverse of the encoding and multiplexing produced by the encoder and multiplexer 24 shown in FIG. 1. The decoder and demultiplexer 54 produces on an output line 56 the quantized discrete cosine transform coefficients of FIG. 1. An inverse scan selector 64 rearranges the order of the coefficients appearing on input line 56 into the same order that those coefficients had in the quantizer 19 of FIG. 1. The inverse scan selector 64 directs the coefficients it receives in inverse order to a visibility matrix selector and dequantizer 66. The dequantizer circuit 66 is responsive to a coding type signal on line 68, a picture type signal on line 70, and the quantization parameter on line 68a retrieved from the bit stream input to the decoder of FIG. 2 by the decoder and demultiplexer circuit 54 to perform a dequantization which is the inverse of the quantization performed by the quantizer 19 in FIG. 1.

The intra DC transform coefficients for I-pictures and intracoded portions of P- and B-pictures are produced at the output of a summing element 58 which receives the differential DC coefficient as decoded and demultiplexed by the decoder and demultiplexer 54. The summing element 58 also receives an intra DC coefficient prediction signal from a prediction circuit 60 which is also responsive to intra DC coefficient signals on line 57 and a coding type signal on line 68. The state of a switching element 66a is controlled to switch an input line of an inverse discrete cosine transform circuit 72 between the DCT coefficient signal on the output of the dequantizer 66 and the intra DC coefficient signal on line 57. The dequantized transform coefficients and the intra DC coefficients are directed through a switching element 66a to an inverse discrete cosine transfer circuit 72 which performs a transform operation which is the inverse of the transform operation produced by the discrete cosine transform circuit 16 in FIG. 1. The output of the inverse discrete cosine transform circuit 72 in FIG. 2 is a decoded version of either the video signal on input line 10 in the case of I-pictures and intra coded portions of P- and B-pictures or it is a decoded version of the estimate error signal on line 13 in FIG. 1. The output signal from the transform circuit 72 is directed to the input of a block formatting circuit 72a which performs an unformatting operation which is the inverse of the formatting operation performed by block 15a in FIG. 1. The output of the unformatting circuit 72a is directed to one input of a summing element 74. Another input of the summing element 74 receives an estimate signal on line 76. The output of the summing element 74 is related to the difference between the estimate error signal from the unformatter 72a and the estimate signal on line 76 and comprises a video output on line 78 which is analogous to the video input signal on line 10 in FIG. 1.

The decoder and demultiplexer 54 in FIG. 2 directs the block classification signal received from the encoder of FIG. 1 to a block type declassification circuit 80 via an input line 82. The block type declassification circuit 80 produces a coding type signal on line 68, a picture type signal on line 70, a motion compensation type signal on line 88, and an inter/intra type signal on line 88a which correspond to the coding type, picture type, motion compensation type, and the inter/intra type signals produced by the encoder of FIG. 1.

The decoder and demultiplexer 54 also retrieves the differential motion vector signal from the bit stream sent by the encoder of FIG. 1 and directs the differential motion vector signal on a line 90 to the input of a summing element 92. Another input to summing element 92 is received from a motion vector prediction circuit 94 along line 96. The motion vector prediction circuit 94 is responsive to a motion compensation type signal on line 88, a picture type signal on line 70, and selected motion vectors on line 98a to produce a prediction of the motion vectors which is directed to one of the inputs to the summing element 92.

The output of the summing element 92 is a motion vector signal on line 98 which corresponds to the motion vector signals produced by the motion estimator 37 and used in the encoding performed by the circuit of FIG. 1. The motion vector signals are directed to an estimation circuit 100 on an input line 102. A next picture store 100a in responsive to the video output signals on line 78 through selective opening and closing of a switching element 100b shown in FIG. 2 to store selected frames of the video output signal. Writing a new frame of information into store 100a causes a previous frame in store 100a to be written into previous picture store 100c via closure of a switching element 100d. The estimation circuit 100 is responsive to the contents of the stores 100a and 100c, the motion vectors on line 102, the motion compensation type signal on line 88, and a picture type signal on line 70 to produce an estimate on line 76 of the video output signal on line 78 in a manner analogous to the estimate produced by the estimation circuit 38 in FIG. 1. As in FIG. 1, switching element 100e in series with line 76 acts to disconnect the estimate signal from the input of summing element 74 when I-pictures are being decoded or when intra coded portions of P- and B-pictures are involved.

FIG. 3 shows a block diagram of a block adaptive motion compensated predictor 106 in accordance with this invention. A decoded picture is received on line 108. The circuit of FIG. 3 produces predictions of P-pictures in accordance with the motion compensation modes identified above for P-pictures. The decoded picture may be either received from the output of the summing element 36 in FIG. 1 or the output of the summing element 74 in FIG. 2. The decoded picture on line 108 is received in the previous picture store 36c or 100c. The decoded picture from the previous picture store is sent to the input of a switching element 110 which selectively directs the decoded picture to one of three output lines in accordance with the motion compensation type signal. If the motion compensation type is type A.1., the decoded picture is sent to a frame macroblock motion compensation predictor 112 which produces a motion compensated prediction signal on the output line 114 of the predictor 106. If the motion compensation type is type A.2., the decoded picture is sent to the input of a submacroblock switching element 116. The switching element 116 selectively directs appropriate portions of the decoded picture to one of a pair of frame submacroblock motion compensated prediction circuits 118 and 120. The top half frame submacroblock is directed to the prediction circuits 118 and the bottom half frame submacroblock is directed to the prediction circuit 120. The predictions produced by circuits 118 and 120 are sent to two inputs 122 and 124 of a frame submacroblock to macroblock formatter 126 which then directs the resulting formatted prediction to the output line 114 of the prediction circuit 106.

If the motion compensation type is type A.3., the decoded picture is sent by the switching element 110 to the input of a submacroblock switching element 128 which selectively directs the top field submacroblock portion of the decoded picture to one of two field submacroblock motion compensated prediction circuits 130 and 132 and the bottom field submacroblock portion of the decoded picture to the other of the prediction circuits 130 and 132. The prediction signals produced by the prediction circuits 130 and 132 are directed on lines 134 and 136 to the inputs of a field submacroblocks to macroblock formatting circuit 138 which then outputs the formatted predictions on the output line 114 of the prediction circuit 106. The predictor circuits are responsive to either one or two motion vector signals (MV1 or MV1 and MV2) as described above and shown in FIG. 3.

Figures 4B, 4C:
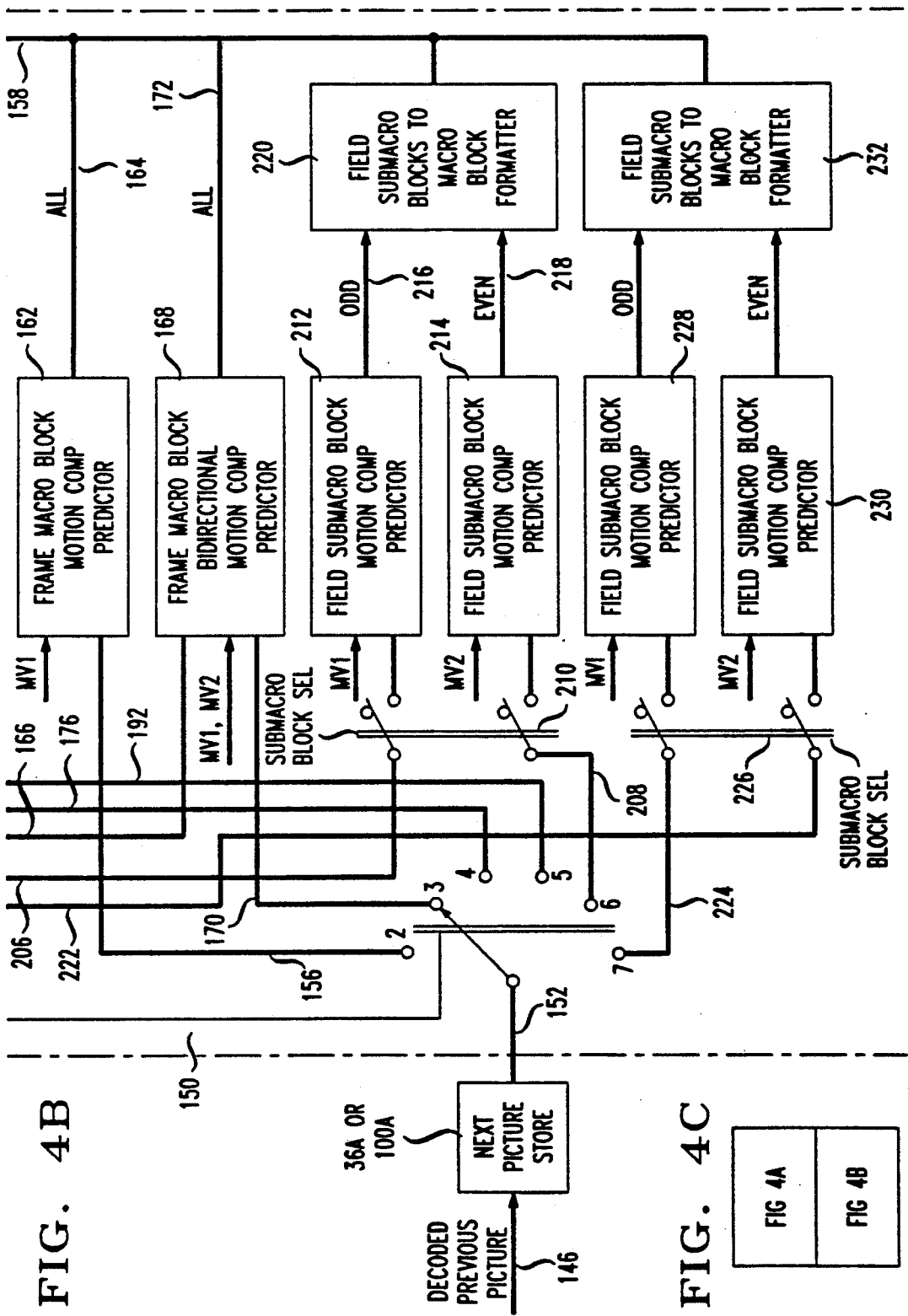
FIG. 4 is a block diagram representing the functional specification of a block adaptive motion compensated bidirectional predictor in accordance with this invention.

FIG. 4 is a block diagram of a block adaptive motion compensated bidirectional predictor 140 in accordance with this invention. The circuit of FIG. 4 produces predictions of B-pictures in accordance with the motion compensation modes identified above for B-pictures. A decoded previous picture is received on line 142 from either one of the outputs of summing element 36 in FIG. 1 or summing element 74 in FIG. 2. The decoded previous picture is sent to the previous picture store 36c or 100c of FIGS. 1 and 2, respectively. A decoded next picture is received on an input line 146 from the output of either summing element 36 in FIG. 1 or summing element 74 in FIG. 2. The decoded next picture is directed to the next picture store 36a or 100a of FIGS. 1 and 2, respectively. The decoded previous picture in the previous picture store is selectively directed by a switching element 150 on input line 149 to one of six output lines depending upon the motion compensation type signal in FIGS. 1 and 2. The decoded next picture in the next picture store is selectively directed by the switching element 150 on input line 152 to one of a second set of six output lines, depending again on the value of the motion compensation type signal in FIGS. 1 and 2.

If the motion compensation type is type B.1., the decoded previous picture in the previous picture store is directed on an output line 154 to the input of a frame macroblock motion compensation prediction circuit 156 which then outputs a frame macroblock motion compensated prediction on a line 158 and on an output line 160 of the prediction circuit 140. Type B.1. motion compensation is undefined for the decoded next pictures in the next picture store 146 so that the decoded next pictures are not involved in the prediction operation and do not influence the prediction signal produced on output line 160 in type B.1. situations.

If the motion compensation type is type B.2., the decoded next picture in the next picture store is directed to an output line 156 of the switching element 150 toward the input of a frame macroblock motion compensated prediction circuit 162 which produces a frame macroblock motion compensated prediction on an output line 164 and an output line 160 of the prediction circuit 140. Type B.2. motion compensation is undefined for the decoded previous pictures in the previous picture store so that the decoded previous pictures are not involved in the prediction operation and do not influence the prediction signal produced on output line 160 in type B.2. situations.

When the motion compensation type is type B.3., the decoded previous picture in the previous picture store is directed on output line 166 of the switching element 150 to one input of a frame macroblock bidirectional motion compensated prediction circuit 168. The decoded next picture in the next picture store is directed to an output line 170 of the switching element 150 to a second input of the prediction circuit 168. The prediction circuit 168 produces a prediction signal on line 172 which is directed to the output line 160 of the prediction circuit 140.

When the compensation type is type B.4., the decoded previous picture in the previous picture store is directed to an output line 174 of the switching element 150 and the decoded next picture in the next picture store 148 is directed to an output line 176 of the switching element 150. The pictures on line 174 and 176 are directed to the inputs of a switching element 178 which selectively directs the pictures to the inputs of a pair of frame submacroblock motion compensated prediction circuits 180 and 182. The outputs of the prediction circuits 180 and 182 are directed to the inputs of a frame submacroblocks to macroblock formatting circuit 184 on lines 186 and 188. The output of the formatting circuit 184 is directed to the output line 160 of the prediction circuit 140.

When the motion compensation type is type B.5., the decoded previous picture in the previous picture store is directed to an output line 190 of the switching element 150 and the decoded next picture in the next picture store is directed to an output line 192 of the switching element 150. The pictures on lines 190 and 192 are directed to the inputs of a switching element 194 which selectively directs the pictures to a pair of frame submacroblock motion compensated prediction circuits 196 and 198. Prediction signals on lines 200 and 202 from the prediction circuits 196 and 198 are input to a frame submacroblocks to macroblocks formatting circuit 204 which sends formatted prediction signals to the output line 160 of the prediction circuit 140.

When the motion compensation type is type B.6., the decoded previous picture in the previous picture store is directed to an output line 206 of the switching element 150 and the decoded next picture in the next picture store is sent to an output line 208 of the switching element 150. The pictures on lines 206 and 208 are sent to the inputs of a switching element 210 which selectively directs those pictures to the inputs of a pair of field submacroblock motion compensated prediction circuits 212 and 214. The prediction circuits 212 and 214 send prediction signals on lines 216 and 218 to the inputs of a field submacroblocks to macroblock formatting circuit 220. The formatting circuit 220 directs formatted prediction signals to the output line 160 of the prediction circuit 140.

When the motion compensation type is type B.7., the decoded previous picture in the previous picture store is sent to an output line 222 of the switching element 150 and the decoded next picture in the next picture store is sent to an output line 224 of the switching element 150.

The pictures on lines 222 and 224 are sent to inputs of a switching element 226 which selectively directs the picture signals to a pair of field submacroblock motion compensated prediction circuits 228 and 230. The prediction circuits send prediction signals to a field submacroblocks to macroblocks formatting circuit 232 which directs the prediction signals to the output line 160 of the prediction circuit 140. As shown in FIG. 3, the predictor circuits are responsive to one or two motion vector signals (MV1 or MV1 and MV2).

Figure 5:
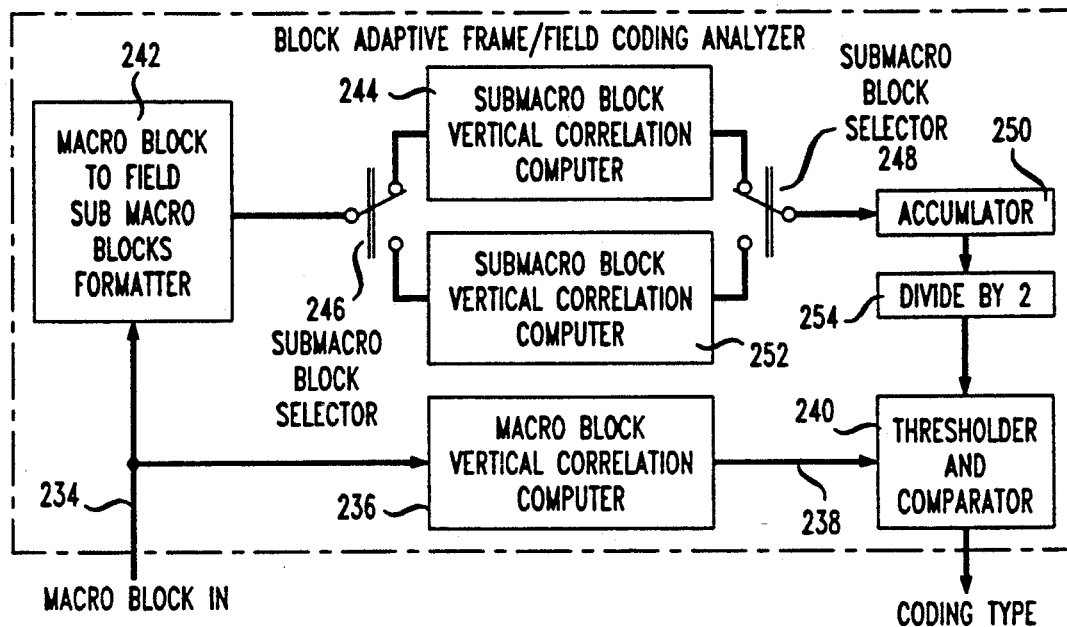
FIG. 5 is a detailed block diagram of the block adaptive frame/field coding analyzer shown in FIG. 1.

FIG. 5 shows a detailed block diagram of the block adaptive frame/field coding analyzer 14 shown in FIG. 1. Macroblocks are received by the coding analyzer on an input line 234. The macroblocks received on the input line 234 are directed to a macroblock vertical correlation computer 236 which determines the amount of correlation between successive horizontal lines of each macroblock and produces a frame correlation signal on line 238 which is sent to a thresholder and comparator circuit 240. The macroblocks received on the input line 234 are also sent to a macroblock to field submacroblocks formatting circuit 242. The formatter 242 separates each macroblock into two separate fields, one of which comprises the evenly numbered horizontal lines of picture elements in each macroblock and the other or which comprises the oddly numbered horizontal lines of picture elements in each macroblock. The evenly numbered horizontal lines are sent to a submacroblock vertical correlation computer 244 when a selector switch 246 connects the output of the formatting circuit 242 to the input of the correlation computer 244. The correlation computer 244 determines the level of correlation between the evenly numbered horizontal lines sent to the computer 244 and produces a signal to a submacroblock selector switch 248 relating to the level of correlation. When the switch 248 is in an appropriate position, the signal from the correlation computer 244 relating to correlation level is sent to the input of an accumulator 250. The oddly numbered horizontal lines are sent to a submacroblock vertical correlation computer 252 when the selector switch 246 connects the output of the formatting circuit 242 to the input of the correlation computer 252. The correlation computer 252 determines the level of correlation between the oddly numbered horizontal lines sent to the computer 252 and produces a signal sent to the submacroblock selector switch 248 relating to the level of correlation. When the switch 248 is connected appropriately, the signal from the correlation computer 252 relating to the correlation level of the oddly numbered lines is sent to the accumulator 250. The accumulator 250 sums the correlation levels of the oddly numbered and evenly number fields in the macroblocks and produces a total correlation signal indicating the level of correlation in the fields. The total correlation signal is divided by two in a divider circuit 254 and sent to the threshold in comparator circuit 240. The comparator circuit 240 compares the correlation levels of the frame correlation signal from computer 236 and the field correlation signal from divider 254 and produces the coding type signal shown in FIGS. 1 and 2. The coding type signal indicates whether frames of video information are to be encoded and decoded or fields of video information are to be encoded and decoded. Specifically, frames are to be encoded and decoded when the frame correlation level is greater than the field correlation level. Fields are to be encoded and decoded when the field correlation level is greater than the frame correlation level.

Figure 6:
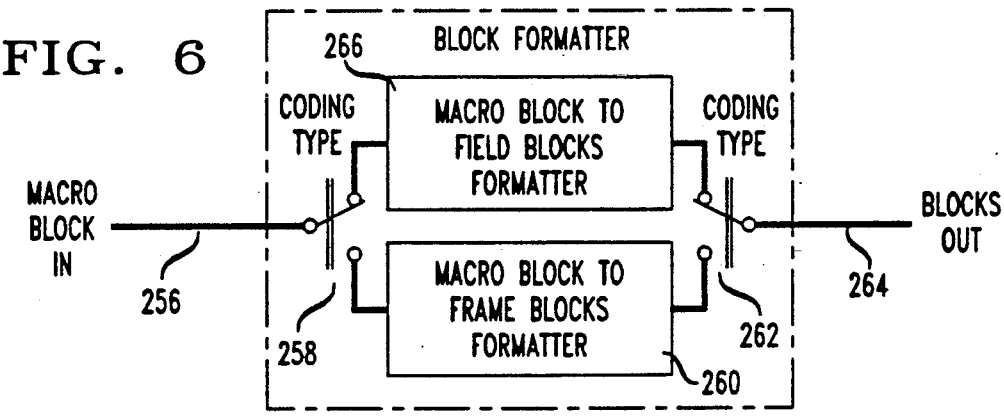
FIG. 6 is a block diagram of the block formatter of FIG. 1.

FIG. 6 shows the block formatter 15a of FIG. 1. Macroblocks are received on an input line 256 and directed to the input of a switching element 258. The state of the switching element is determined by the characteristics of the coding type signal produced by the circuit of FIG. 5. When the coding type signal indicates that frame coding is to take place, the switching element 258 connects the line 256 to the input to a macroblock to frame blocks formatter 260, the output of which is directed to a switching element 262 which connects the output of the formatter 260 to a block output line 264 of the formatter of FIG. 6. When the coding type signal indicates that field coding is to take place, the switching element 258 connects the line 256 to the input of a macroblock to field blocks formatter 266, the output of which is directed to the switching element 262 which connects the output of the formatter 266 to the block output line 264 of the formatter of FIG. 6.

Figure 7:
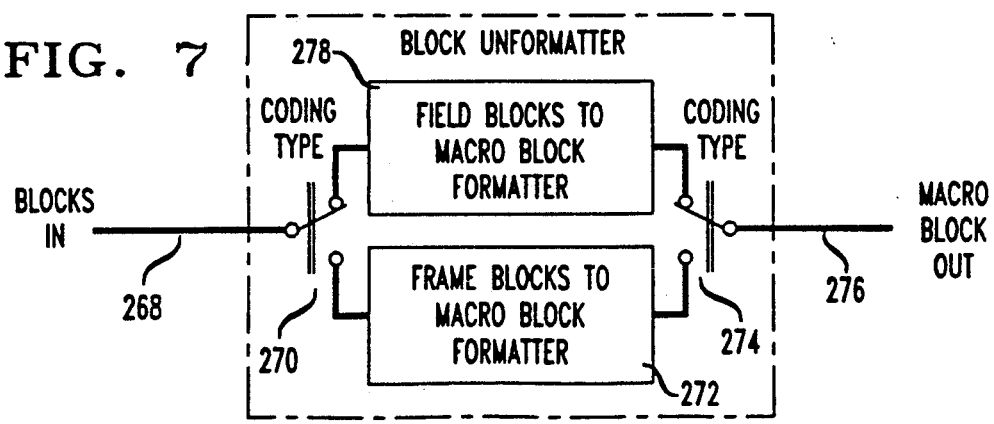
FIG. 7 is a block diagram of the block unformatter of FIGS. 1 and 2.

FIG. 7 is a diagram of a block unformatter shown both in FIGS. 1 and 2. Blocks are received by the unformatter of FIG. 7 on an input line 268 which directs those blocks to the input of a switching element 270. When the coding type signal indicates that frame coding is to take place, the switching element 270 connects the blocks received on the output line 268 to the input of a frame blocks to macroblock formatter 272 which directs frame macroblocks to the input of a switching element 274 which is configured by the coding type signal in this situation to direct frame blocks from the formatter 272 to a macroblock output line 276. When the coding type signal indicates that field coding is to take place, the switching element 270 connects the blocks received on the input line 268 to the input of a field blocks to macroblock formatter 278 which directs the field blocks to the input of a switching element 274 which is configured by the coding type signal to direct macroblocks from the formatter 278 to the macroblock output line 276.

Figure 8:
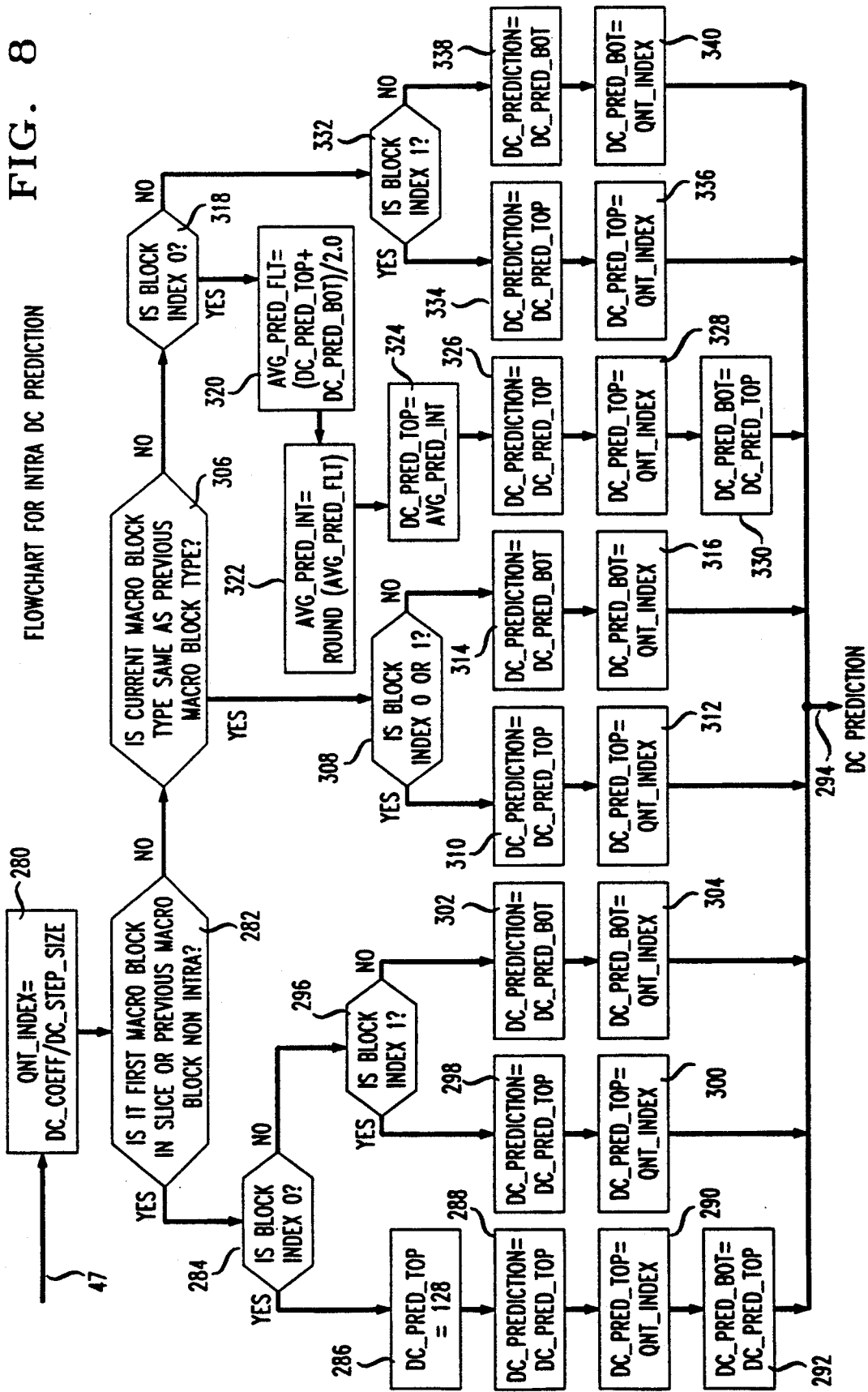
FIG. 8 is a flow chart illustrating intra DC coefficient prediction of FIGS. 1 and 2.

FIG. 8 is a flow chart representing an intra DC coefficient prediction circuit as shown as in FIGS. 1 and 2. Actually computed intra DC coefficients are directed to the input of the circuit of FIG. 8 on line 47. A quantization index is computer in block 280 by dividing the DC coefficient present on line 47 by a DC step-size parameter which may be eight. A decision then is made at block 282 to determine whether or not this DC coefficient is the DC coefficient for the first macroblock in a slice or whether the previous macroblock was a nonintra macroblock. For purposes of this discussion, the block index identifies the location of a block in a macroblock as shown for a frame macroblock and a field macroblock in FIG. 9. If the decision of block 282 is yes, a decision then is made at block 284 as to whether the block index is zero. If the block index is zero, a DC top block predictor parameter is set equal to some arbitrary value in block 286, for example, the predictor is set to 128. The DC prediction which is made by the prediction circuit of FIG. 8 is set equal to this top block DC predictor in block 288. In block 290, the top block predictor is overwritten with the value of the quantization index computed in block 280. In block 292 a bottom block DC predictor parameter is set equal to the value of the top block DC predictor set in block 290. The DC prediction is output from the circuit of FIG. 8 on output line 294 which corresponds to the output of the intra DC coefficient predictor blocks in FIGS. 1 and 2.

If the block index is 1, 2, or 3, as determined in block 284 in FIG. 8, a check is made in block 296 to see if the block index is one. If the block index is one, the DC prediction is set equal to the top block DC predictor in block 298. The top block DC predictor then is overwritten with the quantization index in block 300 and the DC prediction is output by the circuit of FIG. 8 on line 294. If the block index, as determined in block 296, is 2 or 3, the DC prediction is set to the bottom block DC predictor in block 302 and the bottom block DC predictor then is overwritten with the value of the quantization index in block 304. The DC prediction signal is output from the circuit of FIG. 8 on line 294.

If the macroblock is not the first macroblock in a slice or the previous macroblock is not a nonintra type macroblock as determined in block 282 in FIG. 8, a decision is made in block 306 as to whether or not the current macroblock type is the same as the previous macroblock type. If the current macroblock is a frame type macroblock, block 306 in FIG. 8 determines if the previous macroblock was also a frame type macroblock. If the current macroblock is a field type macroblock, block 306 in FIG. 8 determines if the previous macroblock was also a field-type macroblock. If either of the determinations is in the affirmative, a check is made at block 308 to see if the block index is zero or one. If the block index is zero or one, the DC prediction is set equal to the top block DC predictor in block 310 and then in block 312 the top block DC predictor is set equal to the quantization index computed in block 280. The DC prediction then is output by the circuit of FIG. 8 on line 294. If the block index is 2 or 3, as determined in block 308, then the DC prediction is set equal to the bottom block predictor in block 314. The bottom block DC predictor then is overwritten with the quantization index in block 316 and the DC prediction is sent from the circuit of FIG. 8 on line 294.

If the current macroblock type is not the same as the previous macroblock type, as determined in block 306, then a check is made in block 318 to see if the block index is zero. If the block index is zero, an average of the current values of the top block DC predictor and the bottom block DC predictor is made in block 320. The average computed in block 320 is rounded in block 322. The top block DC predictor is set equal to the rounded average in block 324. The DC prediction then is set equal to the top block DC predictor in block 326. The top block DC predictor then is overwritten with the value of the quantization index in block 328. The bottom block DC predictor is set equal to the top block DC predictor in block 330. The DC prediction is sent to the output line 294 of the circuit of FIG. 8.

If the block index is 1, 2, or 3, as determined in block 318, a determination is made in block 332 to see if the block index is 1. If the block index is 1, the DC prediction is set to be equal to the top block DC predictor in block 334. The top block DC predictor then is overwritten in block 336 with the quantization index and the DC prediction is directed to the output line 294 of the circuit of FIG. 8. If the block index is not 1, as determined in block 332, then the DC prediction is set equal to the value of the bottom block DC predictor in block 338 and the bottom block DC predictor then is overwritten in block 340 with the value of the quantization index computed in block 280. As in the other cases, the DC prediction is directed to the output line 294.

Figure 9:
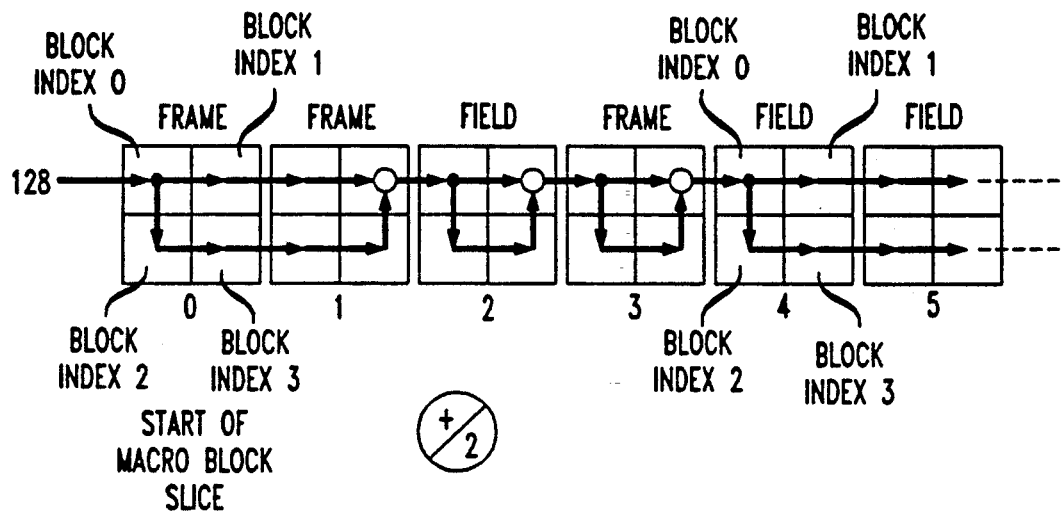
FIG. 9 is an example of adaptive frame/field DC coefficient prediction.

FIG. 9 illustrates a sequence of six macroblocks in a slice of video data. The arrows in FIG. 9 illustrate schematically the relationship between the predicted DC coefficients for each of the blocks of video data and the actual values of DC coefficients computer for adjacent blocks. The origin of each of the arrows is placed in the block for which an actual DC coefficient has been determined. The head of the arrow indicates the location of the block for which the actual value of the DC coefficient is used as a prediction of the DC coefficient for the block containing the head of the arrow. The circles in some of the blocks indicate the situation where an average of actual values of DC coefficients is used to predict the DC coefficients for the block in which the circles reside. FIG. 9 shows a frame type macroblock numbered 0 at the start of the macroblock slice, followed by a frame type macroblock numbered 1, a field type macroblock numbered 2, a frame type macroblock numbered 3, a field type macroblock numbered 4, and a field type macroblock numbered 5. Each of the macroblocks contains four blocks, the upper left hand block of each macroblock being given a block index of 0. The upper right hand block of each macroblock is given a block index of 1, the lower left hand block of each macroblock is given a block index of 2, and the lower right hand block of each macroblock is given a block index of 3. By way of example, a frame macroblock 0 and a field macroblock 4 are labeled with the block indices in FIG. 9. The block in frame macroblock 0 with an index of 0 is predicted to have a value of DC coefficient equal to an arbitrary value such as 128. The predicted value of the DC coefficient for the block in the frame macroblock 0 having an index of 1 is predicted to be the DC coefficient computed for the block having an index of 0 as illustrated by the arrow from the block having an index of 0 to the block having an index of 1. The predicted value of the DC coefficient for the block with an index of 2 in frame macroblock 0 is predicted to be the same as the actual value of the DC coefficient computed for the block having an index of 0 in the frame macroblock 0 as illustrated by the vertically downwardly directed arrow from the block of index 0 to the block of index 2. The predicted value of the DC coefficient for the block with an index of 3 in macroblock 0 is the same as the actual value of the DC coefficient computed for the block with an index of 2 in macroblock 0. The value of the DC coefficient predicted for the blocks of index 0 in the field macroblock 2, the frame macroblock 3, and the field macroblock 4 are each predicted to be the average of the computed coefficients for blocks of index 1 and 3 in the prior macroblocks in each instance. The rest of the predictions are apparent in light of the content of FIGS. 8 and 9 and are not further discussed.

Figure 10:
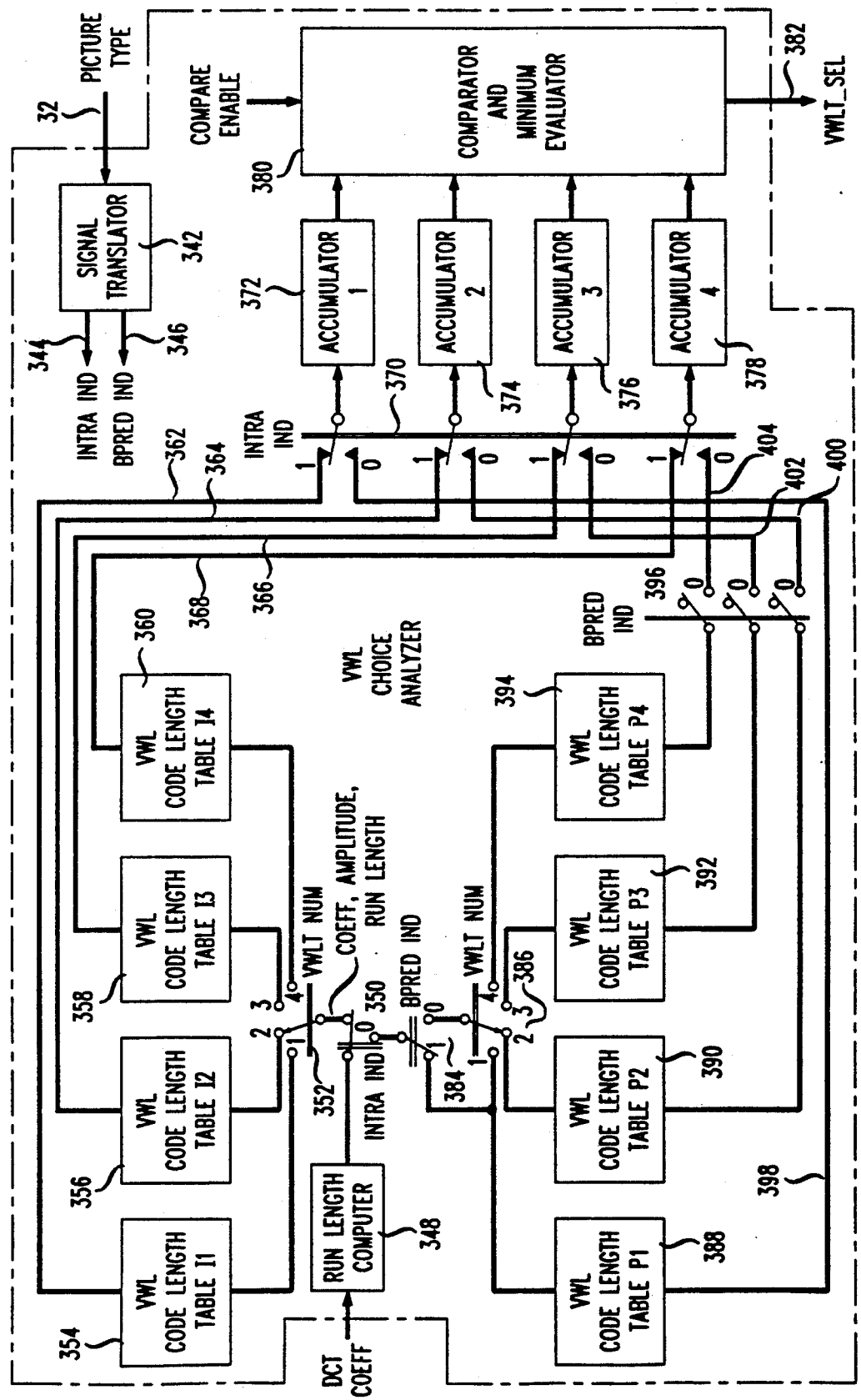
FIG. 10 is a block diagram of the variable word length choice analyzer of FIG. 1.

FIG. 10 is a block diagram of the variable word length choice analyzer shown in FIG. 1. The analyzer receives the picture type signal on line 32 as an input to a signal translator 342 which produces two signals, an intracoding indication 344 which identifies whether or not there is intra-type coding and a B-type predictive indicator 346 which indicates whether or not predictive coding of B-pictures is being undertaken.

The variable word length choice analyzer also receives the DCT coefficients from the scan selector 23 in a run length computer 348 which determines, for all nonzero coefficients received, the number of zeros immediately prior to the receipt of that nonzero DCT coefficient. In other words, the computer 348 determines the run length for each DCT coefficient and sends signals relating to the amplitude and run length of each received DCT coefficient to the input of an intra indication switching element 350. The switching element 350 directs the signals from the run length computer 348, when it is in the number 1 state shown in FIG. 10, to the input of sequencing switching element 352, which may be a counting circuit. The switching element 350 is in the number 1 state when the choice analyzer of FIG. 10 is analyzing DCT coefficient for I-pictures. The switching element 352 sequentially directs the amplitude and run length of each coefficient to the inputs of each of a series of four variable word length code length tables 354, 356, 358, and 356. The tables 354, 356, 358, and 360 contain data which represents the expected code length which will be produced if the DCT coefficient having an amplitude and run length as represented by the signals from the run length computer 348 are coded in accordance with four different coding schemes, one for each of the tables 354, 356, 358, and 360. When the switching element 352 connects the output of the run length computer 348 to the input of one of the tables 354, 356, 358, and 360, that table produces a signal on a respective output line 362, 364, 366, and 368 relating to the expected code length which will result from coding the DCT coefficient in accordance with the coding scheme for which the data in the table has been produced. The expected code lengths on lines 362, 364, 366, and 368 are directed to the number 1 inputs of a switching element 370. When the DCT coefficients are for I-pictures, the state of the switching element 370 is such that the signals on lines 362, 364, 366, and 368 are directed to the inputs of accumulators 372, 374, 376, and 378, respectively. The contents of the accumulators 372, 374, 376, and 378 are directed to four inputs of a comparator and minimum evaluation circuit 380 which is responsive to a compare enable signal to determine which of the expected run lengths stored in the accumulators 372, 374, 376, and 378 is the smallest. The evaluation circuit 380 produces a variable word length table select signal on line 382 which is then sent to the encoder and multiplexer 24 in FIG. 1 which then uses the signal produced on line 382 to select an efficient fixed or variable word length coding scheme identified by the nature of the variable word length table select signal on line 382. The select signal on line 382 causes the encoder 24 to select one of a plurality of coding tables stored in the encoder 24 which each control the encoding of quantized DCT coefficients in accordance with a separate and distinct fixed word length or variable word length coding scheme.

When P- and B-pictures are being coded, the switching element 350 is placed in state 0 such that the DCT coefficient amplitudes and run lengths are directed to the input of a bidirectional prediction indication switching element 384. When P-pictures are being coded, the switching element 384 is in the state 0 which causes the coefficient amplitudes and run lengths to be connected to the input of a sequencing switching element 386, which may be a counting circuit. The switching element 386 sequentially connects the P-picture coefficient amplitude and run lengths to each of four variable word length code length tables 388, 390, 392, and 394. The tables 388, 390, 392, and 394 each contain information about expected code lengths which will be produced by coding the DCT coefficient having the computed amplitude and run lengths in accordance with separate and distinct codes represented by each table 388, 390, 392 and 394. The expected code lengths from the tables 388, 390, 392, and 394 are sent to the 0 inputs of the switching element 370. For P-pictures, the state of the switching elements 370 and 396 is such that the outputs of the tables 388, 390, 392, and 394 are directed on output lines 398, 400, 402, and 404 and to the inputs of the accumulators 372, 374, 376, and 378. As in the case of I-pictures described above, the accumulators 372, 374, 376, and 378 direct the expected code lengths to the evaluation circuit 380 which then produces a variable word length select signal on line 382 which is used by the encoder and multiplexer 24 to code the quantized DCT coefficients using a code which is most efficient in terms of the smallest number of bits which must be used to transmit the DCT coefficients.

When B-pictures are being analyzed by the circuit of FIG. 10, the DCT coefficient amplitudes and run lengths from the computer 348 are directed to the input of a switching element 384 which is in a state which will connect those amplitudes and run lengths only to the variable word length code length table 388 which produces an expected run length signal and sends it to the input of the accumulator 372 and is used to produce a variable word length table select signal on line 382. Note that in the case of B-pictures, the state of switching element 396 is such that the output of the tables 390, 392, and 394 are not connected the inputs of the accumulators 374, 376, and 378.

In the example of the invention described here, a parameter Mscale is produced. The M scale parameter is a multiplexer to be used in computing the quantization parameter for bidirectionally coded frames. One M scale parameter is produced for each macroblock by selection from predetermined tables which have been determined experimentally for a particular picture resolution and bit rate.

FIG. 11 is a flow chart illustrating the encoding of the M scale parameter for bidirectionally coded pictures. In block 406, a decision is made as to whether or not the current macroblock was coded in the previous P-picture or I-picture. If not, whether decision is made in Block 408 as to whether or not the average quantization parameter was nonzero for a corresponding slice in the previous P-picture or I-picture. If it was zero, the average quantization parameter is set equal to 16 in block 410. If the average quantization parameter was nonzero, as determined in block 408, or after the average quantization parameter has been set to 16 in block 410, the quantization parameter for the corresponding macroblock in the previous P-picture or I-picture is set equal to 16 in block 412, since there was no quantization parameter for that macroblock. If the macroblock was coded in the previous P-picture or I-picture, as determined in block 406, or after the operation of block 412, the quantization step size is set equal to 2 times the quantization parameter in block 414. The quantization step size for the slice is set equal to 2 times the average quantization parameter for the corresponding slice in the previous P-picture or I-picture in block 414. A decision then is made in block 416 as to whether or not the prediction for the macroblock is to be unidirectional or intra. If the prediction is to be bidirectional, in other words, if the no route is followed at the output of block 416, then a temporary scale factor is set equal to a scale factor tuned to the resolution and bit rate times the quantizer step size for the macroblock in the previous P-picture or I-picture in block 418. In block 420 a ratio parameter is computed by dividing the temporary scale factor by the quantization step size for the slice. In block 422 a variable min_ind is set equal to 9, a variable min_valf is set equal to 1,000, and a variable zlimit is set equal to 4. A decision then is made at block 424 to see whether an index z is less than zlimit. If z is less than zlimit, a variable absdiff is set equal to the absolute value of the difference between the ratio computed in block 420 and a mscale parameter in block 426. Then in block 428 a decision is made as to whether or not the value of absdiff is less than min_valf. If the yes route is followed from block 428, a variable min_ind is set equal to z and the variable min_valf is set equal to the variable absdiff in block 430. The routine of FIG. 11 then returns to the input of block 424. If the no route is followed on the output of block 428, the routine of FIG. 11 returns directly to the input of block 424. The loop just described is repeated until z is no longer less than zlimit and the no route is followed on the output of block 424, after which in block 432 the current quantization step size is set equal to a rounded product of an mscale variable shown in block 432 and the quantization stepsize for the slice. The current quantization parameter is set equal to one-half of the current quantization step size in block 434 and the value of min_ind is sent for insertion into the encoder output bit stream for use by the decoder to recreate images from the compressed bit stream. The current quantization parameter is clipped to a valve of 31 by the operation of blocks 436 and 438.

If it is determined in block 416 that there is unidirectional prediction, then a temporary scale factor is computed in block 440, a ratio of the temporary scale factor to the quantization step size for the slice is computed in block 442 and in block 444, the min_ind, min_valf, and the zlimit variables are set to the same values they were set to in block 422. A decision then is made in block 446 to see if an index z is less than zlimit. If that is the case, a variable absdiff is computed in block 448 as the absolute value of the difference between the ratio computed in block 442 and an mscale parameter identified in block 448. A check then is made in block 450 to see if absdiff is less than min_valf. If that is the case, min_ind is set equal to z and min_valf is set equal to absdiff in block 452. The routine of FIG. 11 then returns to the input of block 446. The loop continues until z is no longer less than zlimit and then the routine follows the no route as the output of block 446. When the no route is followed in block 454, the current quantization step parameter is set equal to a product similar to the product already described for block 432 and the routine of FIG. 11 performs the previously described steps identified in blocks 434, 436 and 438.

Figure 12:
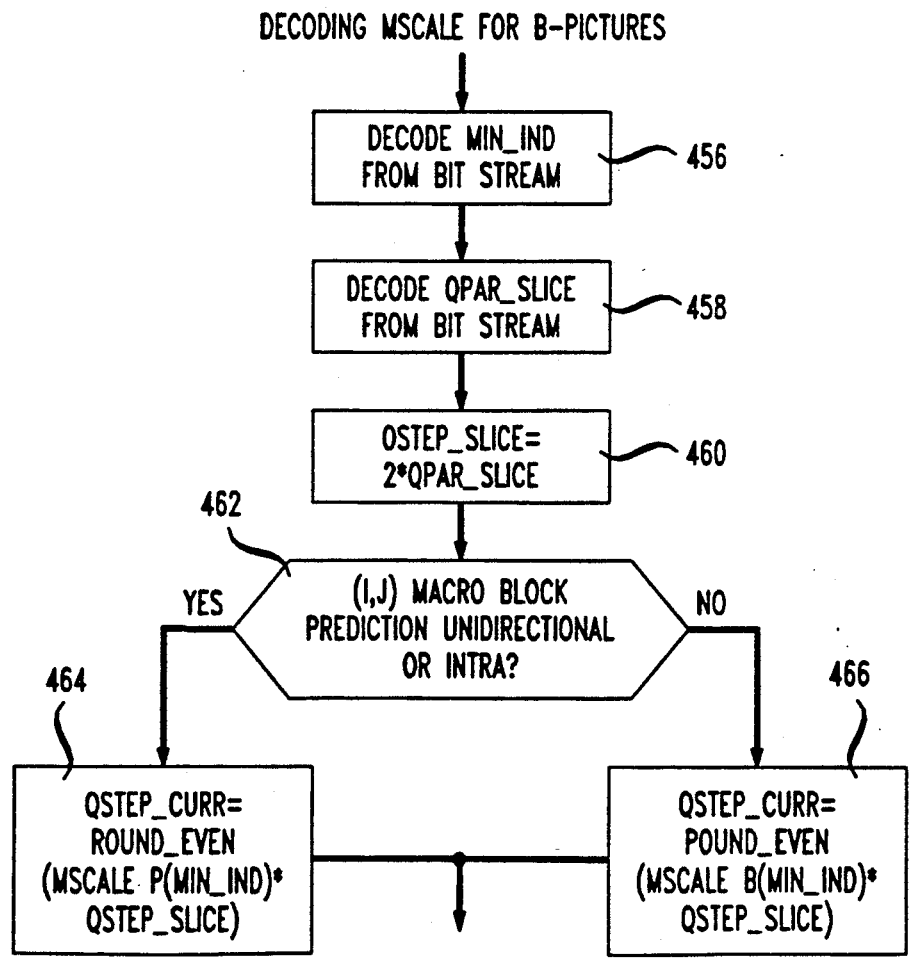
FIG. 12 is a flow chart illustrating the decoding of an mscale parameter for B-pictures in one example of the invention.

FIG. 12 illustrates the operation of a decoder in accordance with this invention with respect to the mscale parameter produced for B-pictures. The min_ind parameter is extracted from the bit stream sent to the decoder in block 456. The quantization parameter for the slice is extracted from that bit stream in block 458. Block 460 computes the quantization step size from the quantization parameter for the slice in block 460. A decision then is made in block 462 as to whether the prediction for the macroblock is unidirectional or intra. If the prediction is unidirectional or intra, the current quantization step is computed as specified in block 464. If the prediction is bidirectional, the current quantization step size is computed as specified in block 456.

Figure 13:
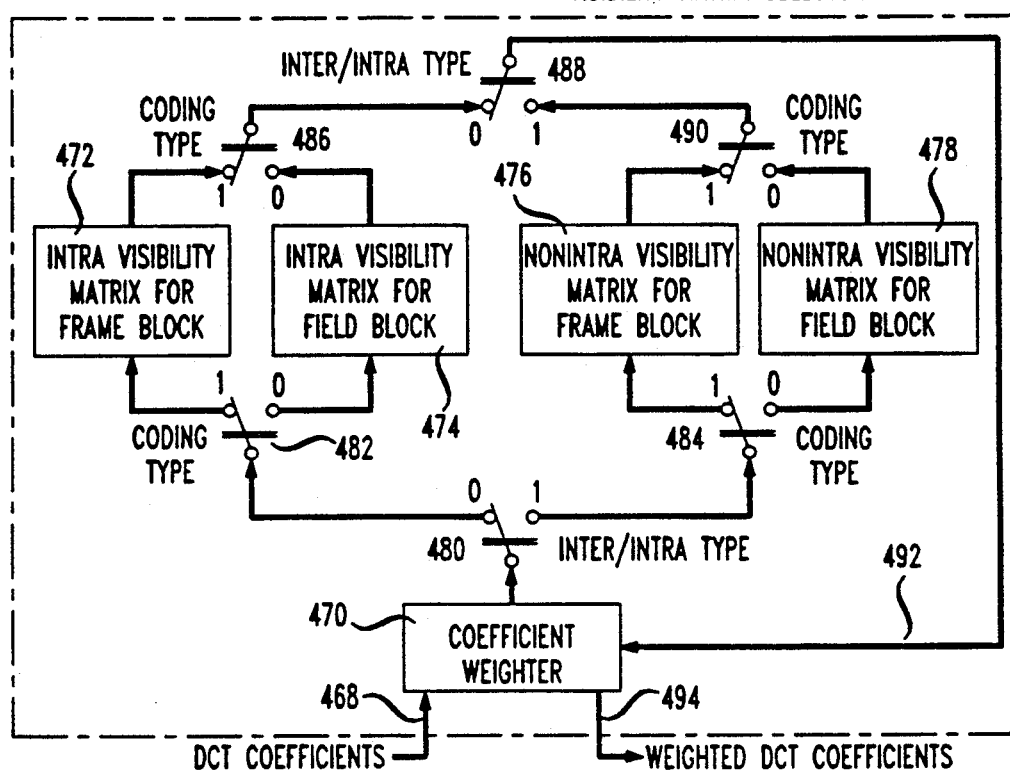
FIG. 13 is a block diagram of an example of a visibility matrix selector useful in one example of the invention.

FIG. 13 shows a detailed block diagram of a visibility matrix selector. DCT coefficients are input to the selector on line 468 which is directed to the input of a coefficient weighting circuit 470. As those skilled in the art will appreciate, weighting factors are retrieved from a selected one of four visibility matrices 472, 474, 476 and 478, depending on the states of switching elements 480, 482, 484, 486, 488, and 490, which states are determined by the condition of signals identified in FIG. 13 and discussed elsewhere. Depending on which visibility matrix is selected, predetermined weighting factors are directed on line 492 to an input of the coefficient waiting circuit 470 which then produces weighted DCT coefficients on an output line 494 in light of the DCT coefficients introduced on line 468 and the weighting factors introduced on line 492.

Figure 14:
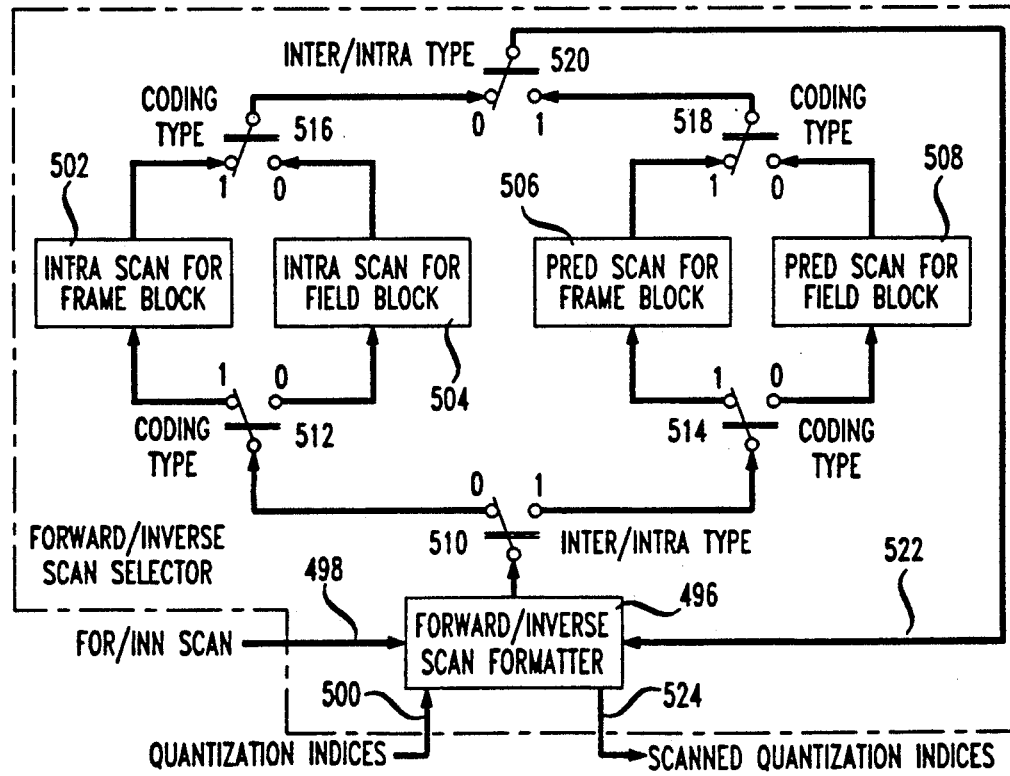
FIG. 14 is a block diagram of a forward/inverse scan selector useful in one example of the invention.

FIG. 14 is a block diagram of a forward/inverse scan selector in accordance with this invention. The scan selector of FIG. 14 comprises a forward/inverse scan formatting circuit 496 which receives a forward inverse/scan designation signal on line 498 and quantization indices on line 500. One of four predetermined scanning orders may be produced in accordance with information stored in four scanning blocks 502, 504, 506, and 508. Depending on the states of switching elements 510, 512, 514, 516, 518, and 520, which are determined by the nature of control signals identified in FIG. 14 and discussed elsewhere, the operation of the scan formatter 496 is controlled by signals on an input line 522 produced by a selected one of the scanning blocks 502, 504, 506, and 508. The scan formatter 496 produces scan quantization indices on line 524 in light of the inputs received on lines 498, 500 and 522.

Figure 15:
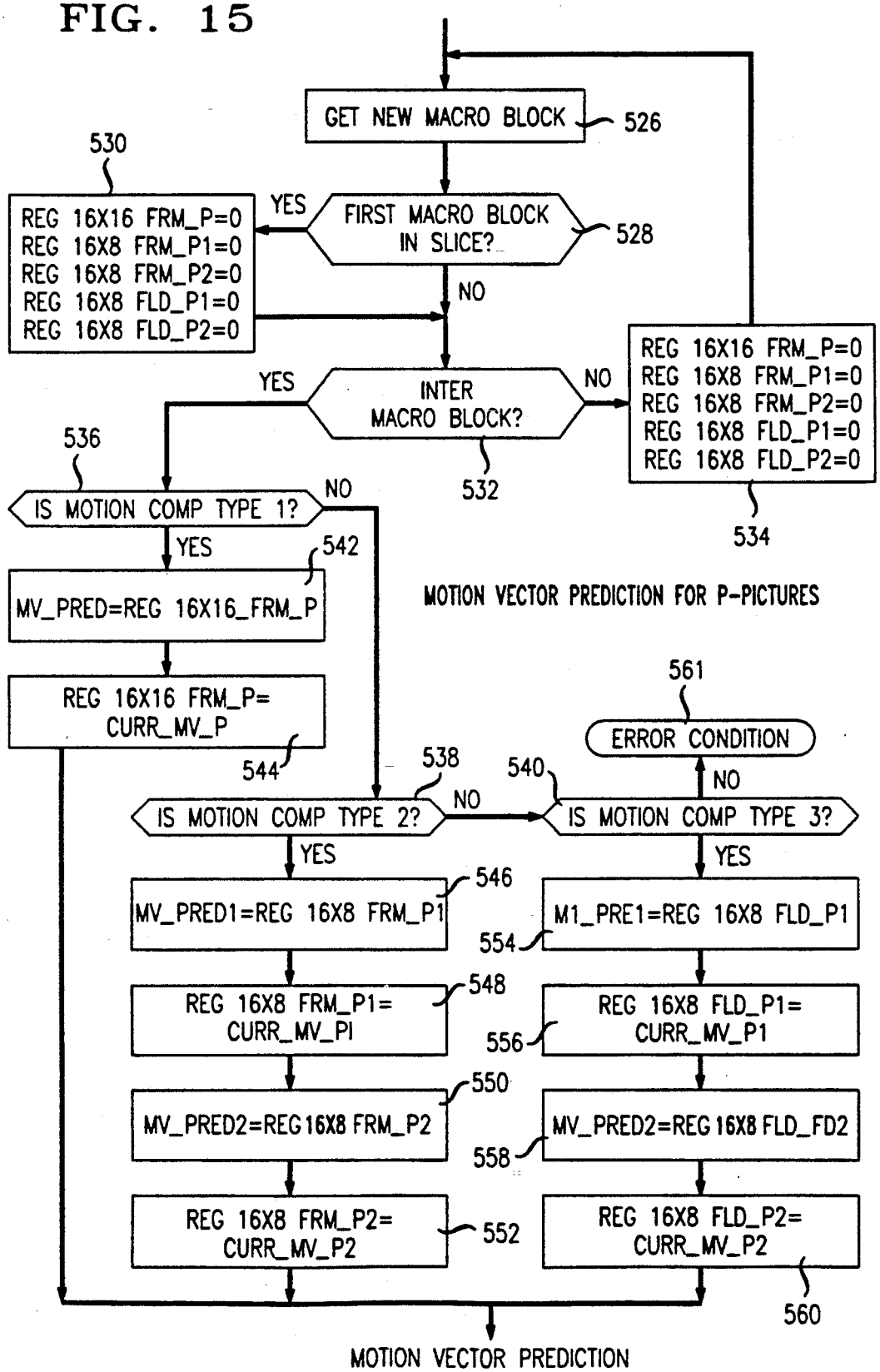
FIG. 15 is a flow chart illustrating motion vector prediction for P-pictures in accordance with one example of the invention.

FIG. 15 is a flow chart illustrating motion vector prediction for P-pictures. A new macroblock is obtained in block 526. Block 528 determines if this macroblock is the first macroblock of a slice. If it is the first macroblock, the variables stored in five registers identified in block 530 are initialized to zero and the routine of FIG. 15 proceeds to the input of a decision block 532. If it is determined in block 528 that this macroblock is not the first macroblock in a slice, the routine of FIG. 15 proceeds directly from the block 528 to the input of block 532. Block 532 determines whether or not this is an inter macroblock. If it is not a inter macroblock, the variables stored in five registers identified in block 534 are initialized to zero and the routine of FIG. 15 returns to the input of block 526.

If block 532 determines that the macroblock is an inter macroblock, then decisions are made as to which motion compensation type is involved. These decisions are made in blocks 536, 538, and 540. If the motion compensation type is type 1, then in block 542 a motion vector prediction variable is set equal to the value of the REG 16×16 FRM_P variable. In block 544 the REG 16×16 FRM_P variable is set equal to the value of a current motion vector variable and the motion prediction is output by the routine of FIG. 15.

If the motion compensation type is type 2, in block 546 a first motion vector prediction variable is set equal to the REG 16×16 FRM_P1 variable. The REG 16×16 FRM_P1 variable is changed to the value of a current motion vector variable (P1) in block 548. In block 550, a second motion vector prediction variable is set equal to the REG 16×16 FRM_P2 variable. In block 532, the REG 16×8 FRM_P2 variable is set equal to the value of a current motion vector variable (P2) and the motion prediction is output by the routine of FIG. 15.

If the motion compensation type is type 3, then as first motion vector prediction variable is set equal to the REG 16×8 FLD_P1 variable in block 554. In block 556, the REG 16×8 FLD_P1 variable then is set equal to a current motion vector (P1) variable. In block 558 a second motion vector prediction variable is set equal to the REG 16×8 FLD_P2 variable. The REG 16×8 FLD_P2 variable then is set equal to the value of a current motion vector (P2) variable in block 560 and the motion vector prediction is output by the routine of FIG. 15. An error condition is identified in block 561 in a situation where it is determined that the motion compensation type is not one of the three permitted types in FIG. 15.

Figure 16A:
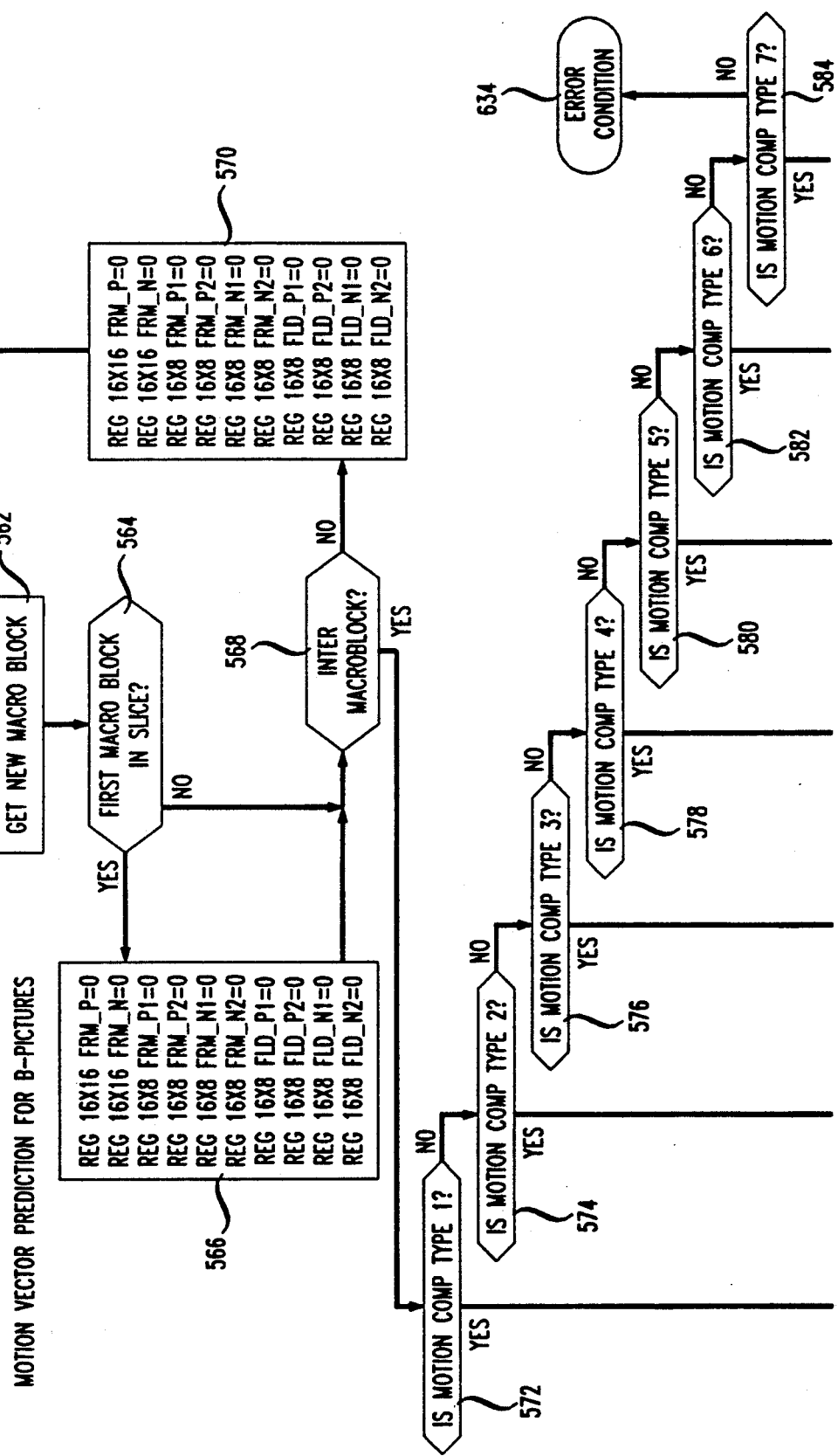
FIG. 16 is a flow chart illustrating motion vector prediction for B-pictures in accordance with one example of the invention.

FIG. 16 is a flow chart illustrating motion vector prediction for B-pictures. A new macroblock is obtained in block 562. A determination is made in block 564 as to whether this is the first macroblock in a slice. If it is the first macroblock in a slice, a list of variables stored in register identified in block 566 is initialized to zero. After the operation of block 566, the routine of FIG. 16 proceeds to the input of block 568. If the macroblock is not the first macroblock in a slice, as determined in block 564, then the output of block 564 is directly connected to the input of block 568.

Block 568 determines if this is an inter macroblock. If it is no an inter macroblock, block 570 initializes a list of variables stored in registers identified in block 570 to zero and the routine of FIG. 16 returns to the input of block 562. If block 568 determines that this is an inter macroblock, then blocks 572, 574, 576, 578, 580, 582, and 584 determine whether the motion compensation type is one of seven possible types.

If the motion compensation type is type 1 for B-pictures, block 586 sets a motion vector prediction variable equal to the variable REG 16×16 FRM_P. Block 588 then sets the REG 16×16 FRM_P variable to be equal to a current motion vector variable (P) and the motion vector prediction is output by the routine of FIG. 16.

If the motion compensation type is type 2 for B-pictures, block 590 sets a motion vector prediction variable equal to the REG 16×16 FRM_N variable. Block 592 sets the REG 16×16 FRM_N variable to the value of a current motion vector variable (N) and the motion vector prediction is output by the routine of FIG. 16.

If the motion compensation type is type 3 for B-pictures, block 594 sets a first motion vector prediction variable to the value of the REG 16×16 FRM_P variable. Block 596 then sets a current motion vector (P) variable to the value of the REG 16×16 FRM_P variable.

Block 598 sets a second motion vector prediction variable equal to the REG 16×16 FRM_N variable. Block 600 then sets the value of the REG 16×16 FRM_N to the value of a current motion vector variable (N) and the motion vector predictions are output by the routine of FIG. 16.

If the motion compensation type is type 4 for B-pictures, block 602 sets a first motion vector prediction variable equal to the REG 16×8 FRM_P1 variable. Block 604 changes the value of the REG 16×8 FRM_P1 variable to the value of a current motion vector (P1) variable. Block 606 sets a second motion vector prediction variable to the value of the REG 16×8 FRM_N2 variable. Block 608 changes the value of the REG 16×8 FRM_N2 variable to the value of a current motion vector (N2) variable and the motion vector predictions are output by the routine of FIG. 16.

If the motion compensation type is type 5 for B-pictures, block 610 sets a first motion vector prediction variable to be equal to the REG 16×8 FRM_N1 variable. Block 612 changes the value of the REG 16×8 FRM_N1 variable to the value of a current motion vector (N1) variable. Block 614 sets the value of a second motion vector prediction variable to be equal to the value of the REG 16×8 FRM_P2 variable. Block 616 then changes the value of the REG 16×8 FRM_P2 variable to the value of a current motion vector (P2) variable and the motion vector prediction are output by the routine of FIG. 16.

If the motion compensation type is type 6 for B-pictures, block 618 sets the value of a first motion vector prediction variable to the value of the REG 16×8 FLD_P1 variable. Block 620 changes the value of the RE 16×8 FLD_P1 variable to the value of a current motion vector (P1) variable. Block 622 sets the value of a second motion vector prediction variable to be equal to the value of the REG 16×8 FLD_N2 variable. Block 624 changes the value of the REG 16×8 FLD_N2 variable to the value of a current motion vector (N2) variable and the motion vector predictions are output by the routine of FIG. 16.

If the motion compensation type is type 7 for B-pictures, block 626 sets the value of a first motion vector prediction variable to the value of the REG 16×8 FLD_N1 variable. Block 628 changes the value of the REG 16×8 FLD-N1 variable to be equal to the value of a current motion vector (N1) variable. Block 630 sets the value of a second motion vector prediction variable to be equal to the value of the REG 16×8 FLD_P2 variable. Block 632 changes the value of the REG 16×8 FLD_P2 variable to be the same as the value of a current motion vector (P2) variable and the motion vector predictions are output by the routine of FIG. 16.

If the routine of FIG. 16 determines that the motion compensation type is not one of the seven permitted types, the routine of FIG. 16 identifies an error condition in block 634.

A summary of the syntactical details of this example of the invention are shown below:

Sequence Header sequence_header_code
horizontal_size
vertical_size
pel_aspect_ratio
picture_rate
bit_rate
intra_frame_quantizer_matrix [64]
intra_field_quantizer_matrix [64]
nonintra_frame_quantizer_matrix [64]
nonintra_field_quantizer_matrix [64]
mscale [64]

Group-of-Pictures Layer group_start-code
time_code
closed_gap
broken_link

Picture Layer picture_start_code
temporal_reference
picture_coding_type
full_pel_forward_vector (for P- and B-pictures)
forward_f (for P- and B-picture)
full_pel_backward_vector (for B-pictures)
backward_f (for B-pictures)

Slice Layer slice_start_code
quantization_parameter

Macroblock Layer in Intra Coded MBs macroblock_type
quantization_parameter (5 bits)
vlc_select (2 bits)

Macroblock Layer in Predictive-Coded MBs macroblock_type
motion_horizontal_forward
motion_vertical_forward
macroblock_code_nocode (1 bit)
quantization_parameter (5 bits, sent when macroblock_code_nocode is "1")
vlc_select (2 bits, sent when macroblock_code_nocode is "1")

Macroblock Layer in Bidirectionally Predictive-Coded MBs macroblock_type
motion_horizontal_forward
motion_vertical_forward
motion_horizontal_backward
motion_vertical_backward
macroblock_code_nocode (1 bit)
mscale_addr (2 bits, sent when macroblock_code_nocode is "1")
coded_block_pattern (sent when macroblock_code_nocode is "1")

Block Layer in Intra-Coded MBs dct_dc_size
dct_dc_differential
dct_coeff_next
end_of_block (codeword depends on the codebook used)

Block Layer in Non Intra Coded MBs dct_coeff_first
dct_coeff_next
end_of_block (in P-pictures, codeword depends on the codebook used)

The entire set of macroblock modes for all three picture types is listed in Table 1 below.

TABLE I
VLC TABLES FOR MACROBLOCK TYPES macroblock_type in I-pictures:

| | | | |
|---|---|---|---|
| 1 | 1 | Intra | , frame-code |
| 2 | 01 | Intra | , field-code | macroblock_type in P-pictures:

| | | | |
|---|---|---|---|
| 1 | 10 | 16×8 | frame-MC, frame-code |
| 2 | 11 | 16×8 | field-MC, frame-code |
| 3 | 01 | 16×16 | frame-MC, frame-code |
| 4 | 0010 | 16×8 | frame-MC, field-code |
| 5 | 0011 | 16×8 | field-MC, field-code |
| 6 | 0001 | 16×16 | frame-MC, field-code |
| 7 | 00001 | Intra | , field-code |
| 8 | 000001 | Intra | , frame-code | macroblock_type in P-pictures:

| | | | |
|---|---|---|---|
| 1 | 10 | 16×16 | frame-MCbdr, field-code |
| 2 | 11 | 16×16 | frame-MCbdr, frame-code |
| 3 | 010 | 16×16 | frame-MCb, frame-code |
| 4 | 011 | 16×16 | frame-MCb, field-code |
| 5 | 0010 | 16×16 | frame-MCf, field-code |
| 6 | 0011 | 16×16 | frame-MCf, frame-code |
| 7 | 00010 | 16×8 | frame-MCbf, frame-code |
| 8 | 00011 | 16×8 | field-MCfb, frame-code |
| 9 | 000010 | 16×8 | frame-MCfb, frame-code |
| 10 | 000011 | 16×8 | field-MCbf, frame-code |
| 11 | 0000010 | 16×8 | field-MCfb, field-code |
| 12 | 0000011 | 16×8 | frame-MCbf, field-code |

TABLE I-continued

| | VLC TABLES FOR MACROBLOCK TYPES | | |
|---|---|---|---|
| 13 | 00000010 | 16×8 | field-MCbf, field-code |
| 14 | 00000011 | 16×8 | frame-MCfb, field-code |
| 15 | 000000010 | Intra | , frame-code |
| 16 | 000000011 | Intra | , field-code |

In a fully automated one-pass encoder, the delay incurred by the encoding process is 2 to 3 picture periods. The delay at the decoder is 1 to 2 picture periods (not counting any postprocessing delays). However, the encoder and decoder buffers introduce a significantly greater delay of 0.5 seconds. The total code delay is thus 0.65 to 0.7 seconds.

I-pictures provide access points roughly every 0.4 seconds. Beginning with the I-picture, the other pictures in the GOP can be decoded as necessary to obtain the desired picture from the bit stream.

Fast forward and reverse enabled by having regularly spaced I-pictures.

The basic feature of our proposal have been presented, with all its syntactical details.

APPENDIX

The following appendix is an example of computer code written in the C programming language which may be used to create a working example of this invention on a programmed digital computer.

```
/*------------------------------------------------*/
/*
   Atul Puri
   Copyright AT&T Bell Labs
   Sept 1991 mscale.c

Example of a code segment used for MSCALE quantization of B-frames

*/
/*------------------------------------------------*/ if (mean_hdr->step_msc[y_index][x_index] != 0)
{
    if ((*ptr_type_pnb == 4) || (*ptr_type_pnb == 5))
    {
        tempscalef = qntpar->scaleb_msc*mean_hdr->step_msc[y_index][x_index];
        ratiof = tempscalef/((float) dis_step);  /* dis_step is default */
        min_ind = 9;
        min_valf = 1000.0;
        for (z=0; z < 4; z++)
        {
            diff = ratiof - qntpar->mscaleb[z];
            absdiff = fabs(diff);
            if (absdiff < min_valf)
            {
                min_ind = z;
                min_valf = absdiff;
            }
        }
        if (min_ind == 9)
        {
            fprintf(stderr, "In quant3..INTERP frame, error in MSCALE computation...quitting\n");
            exit(0);
        }
        round_even(qntpar->mscaleb[min_ind]*dis_step, &qntpar->step_size);
    }
    else
    {
        tempscalef = qntpar->scalep_msc*mean_hdr->step_msc[y_index][x_index];
        ratiof = tempscalef/((float) dis_step);  /* dis_step is default */
        min_ind = 9;
        min_valf = 1000.0;
        for (z=0; z < 4; z++)
        {
            diff = ratiof - qntpar->mscalep[z];
            absdiff = fabs(diff);
            if (absdiff < min_valf)
            {
                min_ind = z;
                min_valf = absdiff;
            }
        }
        if (min_ind == 9)
        {
            fprintf(stderr, "In quant3..INTERP frame, error in MSCALE computation...quitting\n");
            exit(0);
        }
```

```
                    }
                    round_even(qntpar->mscalep[min_ind]*dis_step, &qntpar->step_size);
            }
            *mscale_ind = min_ind;
        }
        else
        {   /* no coding, stay with default */
        }
        if (qntpar->step_size > 62)
        {
            qntpar->step_size = 62;
        }
    }
```

```
/*------------------------------------------------------------*/
/*
        Atul Puri
        Copyright AT&T Bell Labs
        Sept 1991 vlc_coeff_adap.c

Adaptive VLC coding of coefficients and Intra DC prediction

*/
/*------------------------------------------------------------*/
#include <stdio.h>
#include <math.h>
#include "zzz.h"

/* VLTBLI0 and VLTBLI1: EOB 2-bits */ static int vltbli0[32][40] = {
{ 3, 4, 5, 6, 7, 8, 9, 9,11,11,13,13,13,14,14,14,15,15,15,16,16,16,16,16,17,17,17},
{ 5, 7, 9,11,11,13,14,14,16,16,17,17,20,20,20,20,20,20,20,20,20,20,20,20,20,20,20},
{ 6, 9,13,14,14,16,17,20,20,20,20,20,20,20,20,20,20,20,20,20,20,20,20,20,20,20,20},
{ 7,11,13,14,20,20,20,20,20,20,20,20,20,20,20,20,20,20,20,20,20,20,20,20,20,20,20},
{ 7,13,13,14,20,20,20,20,20,20,20,20,20,20,20,20,20,20,20,20,20,20,20,20,20,20,20},
{ 8,13,14,20,20,20,20,20,20,20,20,20,20,20,20,20,20,20,20,20,20,20,20,20,20,20,20},
{ 8,13,16,20,20,20,20,20,20,20,20,20,20,20,20,20,20,20,20,20,20,20,20,20,20,20,20},
{ 9,14,17,20,20,20,20,20,20,20,20,20,20,20,20,20,20,20,20,20,20,20,20,20,20,20,20},
{ 9,14,20,20,20,20,20,20,20,20,20,20,20,20,20,20,20,20,20,20,20,20,20,20,20,20,20},
{ 9,17,20,20,20,20,20,20,20,20,20,20,20,20,20,20,20,20,20,20,20,20,20,20,20,20,20},
{11,17,20,20,20,20,20,20,20,20,20,20,20,20,20,20,20,20,20,20,20,20,20,20,20,20,20},
{11,17,20,20,20,20,20,20,20,20,20,20,20,20,20,20,20,20,20,20,20,20,20,20,20,20,20},
{13,17,20,20,20,20,20,20,20,20,20,20,20,20,20,20,20,20,20,20,20,20,20,20,20,20,20},
{13,20,20,20,20,20,20,20,20,20,20,20,20,20,20,20,20,20,20,20,20,20,20,20,20,20,20},
{14,20,20,20,20,20,20,20,20,20,20,20,20,20,20,20,20,20,20,20,20,20,20,20,20,20,20},
{14,20,20,20,20,20,20,20,20,20,20,20,20,20,20,20,20,20,20,20,20,20,20,20,20,20,20},
{14,20,20,20,20,20,20,20,20,20,20,20,20,20,20,20,20,20,20,20,20,20,20,20,20,20,20},
```

```
{15,20,20,20,20,20,20,20,20,20,20,20,20,20,20,20,20,20,20,20,20,20,20,20,20,20,20,20,20,20,20,20,20,20,20,20,20,20,20,20},
{15,20,20,20,20,20,20,20,20,20,20,20,20,20,20,20,20,20,20,20,20,20,20,20,20,20,20,20,20,20,20,20,20,20,20,20,20,20,20,20},
{15,20,20,20,20,20,20,20,20,20,20,20,20,20,20,20,20,20,20,20,20,20,20,20,20,20,20,20,20,20,20,20,20,20,20,20,20,20,20,20},
{15,20,20,20,20,20,20,20,20,20,20,20,20,20,20,20,20,20,20,20,20,20,20,20,20,20,20,20,20,20,20,20,20,20,20,20,20,20,20,20},
{15,20,20,20,20,20,20,20,20,20,20,20,20,20,20,20,20,20,20,20,20,20,20,20,20,20,20,20,20,20,20,20,20,20,20,20,20,20,20,20},
{15,20,20,20,20,20,20,20,20,20,20,20,20,20,20,20,20,20,20,20,20,20,20,20,20,20,20,20,20,20,20,20,20,20,20,20,20,20,20,20},
{15,20,20,20,20,20,20,20,20,20,20,20,20,20,20,20,20,20,20,20,20,20,20,20,20,20,20,20,20,20,20,20,20,20,20,20,20,20,20,20},
{15,20,20,20,20,20,20,20,20,20,20,20,20,20,20,20,20,20,20,20,20,20,20,20,20,20,20,20,20,20,20,20,20,20,20,20,20,20,20,20},
{16,20,20,20,20,20,20,20,20,20,20,20,20,20,20,20,20,20,20,20,20,20,20,20,20,20,20,20,20,20,20,20,20,20,20,20,20,20,20,20},
{17,20,20,20,20,20,20,20,20,20,20,20,20,20,20,20,20,20,20,20,20,20,20,20,20,20,20,20,20,20,20,20,20,20,20,20,20,20,20,20},
{17,20,20,20,20,20,20,20,20,20,20,20,20,20,20,20,20,20,20,20,20,20,20,20,20,20,20,20,20,20,20,20,20,20,20,20,20,20,20,20},
{17,20,20,20,20,20,20,20,20,20,20,20,20,20,20,20,20,20,20,20,20,20,20,20,20,20,20,20,20,20,20,20,20,20,20,20,20,20,20,20},
};

/*vltbl1=vltblp0 */ static int vltbl1[32][40]={
{ 3, 5, 6, 7, 9,11,13,13,13,14,14,14,15,15,15,15,15,15,15,15,15,16,16,16,16,17,17,17,17,17,17,17,17,17,17,17,17,17,17,17},
{ 4, 6, 9,11,11,13,13,14,14,16,16,16,17,17,20,20,20,20,20,20,20,20,20,20,20,20,20,20,20,20,20,20,20,20,20,20,20,20,20,20},
{ 5, 8,11,14,14,14,16,16,16,17,20,20,20,20,20,20,20,20,20,20,20,20,20,20,20,20,20,20,20,20,20,20,20,20,20,20,20,20,20,20},
{ 6, 9,13,14,14,16,17,20,20,20,20,20,20,20,20,20,20,20,20,20,20,20,20,20,20,20,20,20,20,20,20,20,20,20,20,20,20,20,20,20},
{ 7,11,13,14,14,20,20,20,20,20,20,20,20,20,20,20,20,20,20,20,20,20,20,20,20,20,20,20,20,20,20,20,20,20,20,20,20,20,20,20},
{ 7,11,14,16,20,20,20,20,20,20,20,20,20,20,20,20,20,20,20,20,20,20,20,20,20,20,20,20,20,20,20,20,20,20,20,20,20,20,20,20},
{ 8,14,16,20,20,20,20,20,20,20,20,20,20,20,20,20,20,20,20,20,20,20,20,20,20,20,20,20,20,20,20,20,20,20,20,20,20,20,20,20},
{ 8,14,17,20,20,20,20,20,20,20,20,20,20,20,20,20,20,20,20,20,20,20,20,20,20,20,20,20,20,20,20,20,20,20,20,20,20,20,20,20},
{ 8,17,20,20,20,20,20,20,20,20,20,20,20,20,20,20,20,20,20,20,20,20,20,20,20,20,20,20,20,20,20,20,20,20,20,20,20,20,20,20},
{ 9,17,20,20,20,20,20,20,20,20,20,20,20,20,20,20,20,20,20,20,20,20,20,20,20,20,20,20,20,20,20,20,20,20,20,20,20,20,20,20},
{ 9,17,20,20,20,20,20,20,20,20,20,20,20,20,20,20,20,20,20,20,20,20,20,20,20,20,20,20,20,20,20,20,20,20,20,20,20,20,20,20},
{ 9,17,20,20,20,20,20,20,20,20,20,20,20,20,20,20,20,20,20,20,20,20,20,20,20,20,20,20,20,20,20,20,20,20,20,20,20,20,20,20},
{11,20,20,20,20,20,20,20,20,20,20,20,20,20,20,20,20,20,20,20,20,20,20,20,20,20,20,20,20,20,20,20,20,20,20,20,20,20,20,20},
{13,20,20,20,20,20,20,20,20,20,20,20,20,20,20,20,20,20,20,20,20,20,20,20,20,20,20,20,20,20,20,20,20,20,20,20,20,20,20,20},
{13,20,20,20,20,20,20,20,20,20,20,20,20,20,20,20,20,20,20,20,20,20,20,20,20,20,20,20,20,20,20,20,20,20,20,20,20,20,20,20},
{13,20,20,20,20,20,20,20,20,20,20,20,20,20,20,20,20,20,20,20,20,20,20,20,20,20,20,20,20,20,20,20,20,20,20,20,20,20,20,20},
{13,20,20,20,20,20,20,20,20,20,20,20,20,20,20,20,20,20,20,20,20,20,20,20,20,20,20,20,20,20,20,20,20,20,20,20,20,20,20,20},
{13,20,20,20,20,20,20,20,20,20,20,20,20,20,20,20,20,20,20,20,20,20,20,20,20,20,20,20,20,20,20,20,20,20,20,20,20,20,20,20},
{15,20,20,20,20,20,20,20,20,20,20,20,20,20,20,20,20,20,20,20,20,20,20,20,20,20,20,20,20,20,20,20,20,20,20,20,20,20,20,20},
{15,20,20,20,20,20,20,20,20,20,20,20,20,20,20,20,20,20,20,20,20,20,20,20,20,20,20,20,20,20,20,20,20,20,20,20,20,20,20,20},
{16,20,20,20,20,20,20,20,20,20,20,20,20,20,20,20,20,20,20,20,20,20,20,20,20,20,20,20,20,20,20,20,20,20,20,20,20,20,20,20},
{17,20,20,20,20,20,20,20,20,20,20,20,20,20,20,20,20,20,20,20,20,20,20,20,20,20,20,20,20,20,20,20,20,20,20,20,20,20,20,20},
{17,20,20,20,20,20,20,20,20,20,20,20,20,20,20,20,20,20,20,20,20,20,20,20,20,20,20,20,20,20,20,20,20,20,20,20,20,20,20,20},
{17,20,20,20,20,20,20,20,20,20,20,20,20,20,20,20,20,20,20,20,20,20,20,20,20,20,20,20,20,20,20,20,20,20,20,20,20,20,20,20},
};

/* VLTBLI2: EOB 3-bits */ static int vltbl2[32][40]={
{ 3, 4, 4, 6, 6, 7, 8, 8, 9, 9, 9,11,11,11,13,13,13,13,14,14,14,14,14,15,15,15,15,15,15,16,16,16,16,16,16,17,17,17,17,17},
```

```
{  4,  7,  9, 11, 11, 13, 14, 14, 16, 16, 16, 16, 16, 17, 17, 17, 20, 20, 20, 20, 20, 20, 20, 20, 20, 20, 20, 20, 20, 20, 20, 20, 20, 20, 20, 20, 20, 20, 20, 20},
{  6,  9, 11, 13, 13, 14, 16, 16, 17, 17, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{  7, 11, 13, 13, 14, 16, 16, 17, 17, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{  7, 13, 13, 14, 16, 17, 17, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{  8, 13, 14, 16, 17, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{  8, 13, 16, 17, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{  9, 14, 16, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{  9, 14, 17, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{  9, 17, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{ 11, 17, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{ 11, 17, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{ 13, 17, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{ 13, 17, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{ 14, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{ 14, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{ 14, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{ 15, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{ 15, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{ 15, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{ 15, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{ 15, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{ 16, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{ 17, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{ 17, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
};

/* VLTBLI3: EOB 4-bits */
static int vltbli3[32][40] = {
{  3,  5,  6,  7,  8,  9,  9, 11, 11, 13, 13, 14, 14, 15, 15, 15, 15, 16, 16, 16, 16, 17, 17, 20, 20, 20, 20, 20, 20, 20, 20, 20, 20, 20, 20, 20, 20, 20, 20, 20},
{  4,  7, 11, 13, 13, 14, 14, 16, 16, 16, 17, 17, 20, 20, 20, 20, 20, 20, 20, 20, 20, 20, 20, 20, 20, 20, 20, 20, 20, 20, 20, 20, 20, 20, 20, 20, 20, 20, 20, 20},
{  6,  9, 11, 13, 14, 16, 17, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{  7, 11, 13, 14, 16, 17, 17, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{  7, 13, 13, 14, 17, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{  8, 13, 14, 16, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{  8, 13, 16, 17, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{  9, 14, 16, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{  9, 14, 17, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{  9, 17, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{ 11, 17, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{ 13, 17, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{ 13, 17, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{ 13, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{ 14, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{ 14, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{ 15, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
{ 15, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20, 20},
```

```
                                                                    [15,20,20,20,20,20,20,20,20,20,20,20,20,20,20,20,20,20,20,20,20,20,20,20,20,20,20,20,20,20,20,20,20,20,20,20,20,20,20,20],
                                                                    [15,20,20,20,20,20,20,20,20,20,20,20,20,20,20,20,20,20,20,20,20,20,20,20,20,20,20,20,20,20,20,20,20,20,20,20,20,20,20,20],
                                                                    [15,20,20,20,20,20,20,20,20,20,20,20,20,20,20,20,20,20,20,20,20,20,20,20,20,20,20,20,20,20,20,20,20,20,20,20,20,20,20,20],
                                                                    [15,20,20,20,20,20,20,20,20,20,20,20,20,20,20,20,20,20,20,20,20,20,20,20,20,20,20,20,20,20,20,20,20,20,20,20,20,20,20,20],
                                                                    [15,20,20,20,20,20,20,20,20,20,20,20,20,20,20,20,20,20,20,20,20,20,20,20,20,20,20,20,20,20,20,20,20,20,20,20,20,20,20,20],
                                                                    [15,20,20,20,20,20,20,20,20,20,20,20,20,20,20,20,20,20,20,20,20,20,20,20,20,20,20,20,20,20,20,20,20,20,20,20,20,20,20,20],
                                                                    [16,20,20,20,20,20,20,20,20,20,20,20,20,20,20,20,20,20,20,20,20,20,20,20,20,20,20,20,20,20,20,20,20,20,20,20,20,20,20,20],
                                                                    [16,20,20,20,20,20,20,20,20,20,20,20,20,20,20,20,20,20,20,20,20,20,20,20,20,20,20,20,20,20,20,20,20,20,20,20,20,20,20,20],
                                                                    [17,20,20,20,20,20,20,20,20,20,20,20,20,20,20,20,20,20,20,20,20,20,20,20,20,20,20,20,20,20,20,20,20,20,20,20,20,20,20,20],
                                                                    [17,20,20,20,20,20,20,20,20,20,20,20,20,20,20,20,20,20,20,20,20,20,20,20,20,20,20,20,20,20,20,20,20,20,20,20,20,20,20,20],
                                                                    [17,20,20,20,20,20,20,20,20,20,20,20,20,20,20,20,20,20,20,20,20,20,20,20,20,20,20,20,20,20,20,20,20,20,20,20,20,20,20,20],
                                                                    [17,20,20,20,20,20,20,20,20,20,20,20,20,20,20,20,20,20,20,20,20,20,20,20,20,20,20,20,20,20,20,20,20,20,20,20,20,20,20,20],
};

/* VLTBLP0 and VLTBLP1: EOB 2-bits */ static int vltblp0[32][40] = {
 { 3, 5, 6, 7, 9,11,11,13,13,13,14,14,14,15,15,15,15,16,16,16,16,16,17,17,17,17,17,17,17,17,17,17,17,17,17,17,17,17,17,17},
 { 4, 6, 9,11,13,14,14,16,16,17,20,20,20,20,20,20,20,20,20,20,20,20,20,20,20,20,20,20,20,20,20,20,20,20,20,20,20,20,20,20},
 { 5, 8,11,13,14,16,17,20,20,20,20,20,20,20,20,20,20,20,20,20,20,20,20,20,20,20,20,20,20,20,20,20,20,20,20,20,20,20,20,20},
 { 6, 9,13,14,16,20,20,20,20,20,20,20,20,20,20,20,20,20,20,20,20,20,20,20,20,20,20,20,20,20,20,20,20,20,20,20,20,20,20,20},
 { 7,11,13,14,17,20,20,20,20,20,20,20,20,20,20,20,20,20,20,20,20,20,20,20,20,20,20,20,20,20,20,20,20,20,20,20,20,20,20,20},
 { 7,11,14,16,20,20,20,20,20,20,20,20,20,20,20,20,20,20,20,20,20,20,20,20,20,20,20,20,20,20,20,20,20,20,20,20,20,20,20,20},
 { 7,14,16,20,20,20,20,20,20,20,20,20,20,20,20,20,20,20,20,20,20,20,20,20,20,20,20,20,20,20,20,20,20,20,20,20,20,20,20,20},
 { 8,14,17,20,20,20,20,20,20,20,20,20,20,20,20,20,20,20,20,20,20,20,20,20,20,20,20,20,20,20,20,20,20,20,20,20,20,20,20,20},
 { 8,14,20,20,20,20,20,20,20,20,20,20,20,20,20,20,20,20,20,20,20,20,20,20,20,20,20,20,20,20,20,20,20,20,20,20,20,20,20,20},
 { 9,17,20,20,20,20,20,20,20,20,20,20,20,20,20,20,20,20,20,20,20,20,20,20,20,20,20,20,20,20,20,20,20,20,20,20,20,20,20,20},
 { 9,17,20,20,20,20,20,20,20,20,20,20,20,20,20,20,20,20,20,20,20,20,20,20,20,20,20,20,20,20,20,20,20,20,20,20,20,20,20,20},
 {11,20,20,20,20,20,20,20,20,20,20,20,20,20,20,20,20,20,20,20,20,20,20,20,20,20,20,20,20,20,20,20,20,20,20,20,20,20,20,20},
 {11,20,20,20,20,20,20,20,20,20,20,20,20,20,20,20,20,20,20,20,20,20,20,20,20,20,20,20,20,20,20,20,20,20,20,20,20,20,20,20},
 {13,20,20,20,20,20,20,20,20,20,20,20,20,20,20,20,20,20,20,20,20,20,20,20,20,20,20,20,20,20,20,20,20,20,20,20,20,20,20,20},
 {13,20,20,20,20,20,20,20,20,20,20,20,20,20,20,20,20,20,20,20,20,20,20,20,20,20,20,20,20,20,20,20,20,20,20,20,20,20,20,20},
 {13,20,20,20,20,20,20,20,20,20,20,20,20,20,20,20,20,20,20,20,20,20,20,20,20,20,20,20,20,20,20,20,20,20,20,20,20,20,20,20},
 {13,20,20,20,20,20,20,20,20,20,20,20,20,20,20,20,20,20,20,20,20,20,20,20,20,20,20,20,20,20,20,20,20,20,20,20,20,20,20,20},
 {13,20,20,20,20,20,20,20,20,20,20,20,20,20,20,20,20,20,20,20,20,20,20,20,20,20,20,20,20,20,20,20,20,20,20,20,20,20,20,20},
 {15,20,20,20,20,20,20,20,20,20,20,20,20,20,20,20,20,20,20,20,20,20,20,20,20,20,20,20,20,20,20,20,20,20,20,20,20,20,20,20},
 {15,20,20,20,20,20,20,20,20,20,20,20,20,20,20,20,20,20,20,20,20,20,20,20,20,20,20,20,20,20,20,20,20,20,20,20,20,20,20,20},
 {15,20,20,20,20,20,20,20,20,20,20,20,20,20,20,20,20,20,20,20,20,20,20,20,20,20,20,20,20,20,20,20,20,20,20,20,20,20,20,20},
 {16,20,20,20,20,20,20,20,20,20,20,20,20,20,20,20,20,20,20,20,20,20,20,20,20,20,20,20,20,20,20,20,20,20,20,20,20,20,20,20},
 {17,20,20,20,20,20,20,20,20,20,20,20,20,20,20,20,20,20,20,20,20,20,20,20,20,20,20,20,20,20,20,20,20,20,20,20,20,20,20,20},
 {17,20,20,20,20,20,20,20,20,20,20,20,20,20,20,20,20,20,20,20,20,20,20,20,20,20,20,20,20,20,20,20,20,20,20,20,20,20,20,20},
 {17,20,20,20,20,20,20,20,20,20,20,20,20,20,20,20,20,20,20,20,20,20,20,20,20,20,20,20,20,20,20,20,20,20,20,20,20,20,20,20},
};

/* vltblp1 = vltbl10 */ static int vltblp1[32][40] = {
 { 3, 4, 5, 6, 7, 8, 8, 9, 9,11,11,13,13,13,14,14,14,14,15,15,15,15,15,16,16,16,16,16,16,16,16,17,17,17,17,17,17,17,17,17},
 { 5, 7, 9,11,11,13,14,14,16,17,17,20,20,20,20,20,20,20,20,20,20,20,20,20,20,20,20,20,20,20,20,20,20,20,20,20,20,20,20,20},
 { 6, 9,13,13,14,16,17,20,20,20,20,20,20,20,20,20,20,20,20,20,20,20,20,20,20,20,20,20,20,20,20,20,20,20,20,20,20,20,20,20},
 { 7,11,13,14,20,20,20,20,20,20,20,20,20,20,20,20,20,20,20,20,20,20,20,20,20,20,20,20,20,20,20,20,20,20,20,20,20,20,20,20},
```

```
 7,13,13,14,20,20,20,20,20,20,20,20,20,20,20,20,20,20,20,20,20,20,20,20,20,20,20,20,20,20,20,20,20,20,20,20,20,20,20,20],
 8,13,14,20,20,20,20,20,20,20,20,20,20,20,20,20,20,20,20,20,20,20,20,20,20,20,20,20,20,20,20,20,20,20,20,20,20,20,20,20],
 8,13,16,20,20,20,20,20,20,20,20,20,20,20,20,20,20,20,20,20,20,20,20,20,20,20,20,20,20,20,20,20,20,20,20,20,20,20,20,20],
 9,14,17,20,20,20,20,20,20,20,20,20,20,20,20,20,20,20,20,20,20,20,20,20,20,20,20,20,20,20,20,20,20,20,20,20,20,20,20,20],
 9,14,20,20,20,20,20,20,20,20,20,20,20,20,20,20,20,20,20,20,20,20,20,20,20,20,20,20,20,20,20,20,20,20,20,20,20,20,20,20],
 9,14,20,20,20,20,20,20,20,20,20,20,20,20,20,20,20,20,20,20,20,20,20,20,20,20,20,20,20,20,20,20,20,20,20,20,20,20,20,20],
11,17,20,20,20,20,20,20,20,20,20,20,20,20,20,20,20,20,20,20,20,20,20,20,20,20,20,20,20,20,20,20,20,20,20,20,20,20,20,20],
11,17,20,20,20,20,20,20,20,20,20,20,20,20,20,20,20,20,20,20,20,20,20,20,20,20,20,20,20,20,20,20,20,20,20,20,20,20,20,20],
13,17,20,20,20,20,20,20,20,20,20,20,20,20,20,20,20,20,20,20,20,20,20,20,20,20,20,20,20,20,20,20,20,20,20,20,20,20,20,20],
13,17,20,20,20,20,20,20,20,20,20,20,20,20,20,20,20,20,20,20,20,20,20,20,20,20,20,20,20,20,20,20,20,20,20,20,20,20,20,20],
13,17,20,20,20,20,20,20,20,20,20,20,20,20,20,20,20,20,20,20,20,20,20,20,20,20,20,20,20,20,20,20,20,20,20,20,20,20,20,20],
14,20,20,20,20,20,20,20,20,20,20,20,20,20,20,20,20,20,20,20,20,20,20,20,20,20,20,20,20,20,20,20,20,20,20,20,20,20,20,20],
14,20,20,20,20,20,20,20,20,20,20,20,20,20,20,20,20,20,20,20,20,20,20,20,20,20,20,20,20,20,20,20,20,20,20,20,20,20,20,20],
15,20,20,20,20,20,20,20,20,20,20,20,20,20,20,20,20,20,20,20,20,20,20,20,20,20,20,20,20,20,20,20,20,20,20,20,20,20,20,20],
15,20,20,20,20,20,20,20,20,20,20,20,20,20,20,20,20,20,20,20,20,20,20,20,20,20,20,20,20,20,20,20,20,20,20,20,20,20,20,20],
15,20,20,20,20,20,20,20,20,20,20,20,20,20,20,20,20,20,20,20,20,20,20,20,20,20,20,20,20,20,20,20,20,20,20,20,20,20,20,20],
15,20,20,20,20,20,20,20,20,20,20,20,20,20,20,20,20,20,20,20,20,20,20,20,20,20,20,20,20,20,20,20,20,20,20,20,20,20,20,20],
15,20,20,20,20,20,20,20,20,20,20,20,20,20,20,20,20,20,20,20,20,20,20,20,20,20,20,20,20,20,20,20,20,20,20,20,20,20,20,20],
15,20,20,20,20,20,20,20,20,20,20,20,20,20,20,20,20,20,20,20,20,20,20,20,20,20,20,20,20,20,20,20,20,20,20,20,20,20,20,20],
16,20,20,20,20,20,20,20,20,20,20,20,20,20,20,20,20,20,20,20,20,20,20,20,20,20,20,20,20,20,20,20,20,20,20,20,20,20,20,20],
17,20,20,20,20,20,20,20,20,20,20,20,20,20,20,20,20,20,20,20,20,20,20,20,20,20,20,20,20,20,20,20,20,20,20,20,20,20,20,20],
17,20,20,20,20,20,20,20,20,20,20,20,20,20,20,20,20,20,20,20,20,20,20,20,20,20,20,20,20,20,20,20,20,20,20,20,20,20,20,20],
17,20,20,20,20,20,20,20,20,20,20,20,20,20,20,20,20,20,20,20,20,20,20,20,20,20,20,20,20,20,20,20,20,20,20,20,20,20,20,20],
};

/* VLTBLP2: EOB 3-bits */ static int vltblp2[32][40]={
 3, 4, 6, 7, 9,11,13,13,14,14,14,15,15,15,15,16,16,16,17,17,20,20,20,20,20,20,20,20,20,20,20,20,20,20,20,20,20,20,20,20],
 4, 6, 8,11,14,14,16,17,20,20,20,20,20,20,20,20,20,20,20,20,20,20,20,20,20,20,20,20,20,20,20,20,20,20,20,20,20,20,20,20],
 4, 8,11,14,16,17,20,20,20,20,20,20,20,20,20,20,20,20,20,20,20,20,20,20,20,20,20,20,20,20,20,20,20,20,20,20,20,20,20,20],
 6, 9,13,14,20,20,20,20,20,20,20,20,20,20,20,20,20,20,20,20,20,20,20,20,20,20,20,20,20,20,20,20,20,20,20,20,20,20,20,20],
 7,11,13,14,20,20,20,20,20,20,20,20,20,20,20,20,20,20,20,20,20,20,20,20,20,20,20,20,20,20,20,20,20,20,20,20,20,20,20,20],
 7,14,16,20,20,20,20,20,20,20,20,20,20,20,20,20,20,20,20,20,20,20,20,20,20,20,20,20,20,20,20,20,20,20,20,20,20,20,20,20],
 8,14,17,20,20,20,20,20,20,20,20,20,20,20,20,20,20,20,20,20,20,20,20,20,20,20,20,20,20,20,20,20,20,20,20,20,20,20,20,20],
 8,14,20,20,20,20,20,20,20,20,20,20,20,20,20,20,20,20,20,20,20,20,20,20,20,20,20,20,20,20,20,20,20,20,20,20,20,20,20,20],
 9,17,20,20,20,20,20,20,20,20,20,20,20,20,20,20,20,20,20,20,20,20,20,20,20,20,20,20,20,20,20,20,20,20,20,20,20,20,20,20],
 9,17,20,20,20,20,20,20,20,20,20,20,20,20,20,20,20,20,20,20,20,20,20,20,20,20,20,20,20,20,20,20,20,20,20,20,20,20,20,20],
 9,17,20,20,20,20,20,20,20,20,20,20,20,20,20,20,20,20,20,20,20,20,20,20,20,20,20,20,20,20,20,20,20,20,20,20,20,20,20,20],
11,20,20,20,20,20,20,20,20,20,20,20,20,20,20,20,20,20,20,20,20,20,20,20,20,20,20,20,20,20,20,20,20,20,20,20,20,20,20,20],
13,20,20,20,20,20,20,20,20,20,20,20,20,20,20,20,20,20,20,20,20,20,20,20,20,20,20,20,20,20,20,20,20,20,20,20,20,20,20,20],
13,20,20,20,20,20,20,20,20,20,20,20,20,20,20,20,20,20,20,20,20,20,20,20,20,20,20,20,20,20,20,20,20,20,20,20,20,20,20,20],
13,20,20,20,20,20,20,20,20,20,20,20,20,20,20,20,20,20,20,20,20,20,20,20,20,20,20,20,20,20,20,20,20,20,20,20,20,20,20,20],
13,20,20,20,20,20,20,20,20,20,20,20,20,20,20,20,20,20,20,20,20,20,20,20,20,20,20,20,20,20,20,20,20,20,20,20,20,20,20,20],
13,20,20,20,20,20,20,20,20,20,20,20,20,20,20,20,20,20,20,20,20,20,20,20,20,20,20,20,20,20,20,20,20,20,20,20,20,20,20,20],
```

```c
{15,20,20,20,20,20,20,20,20,20,20,20,20,20,20,20,20,20,20,20,20,20,20,20,20,20,20,20,20,20,20,20,20,20,20,20,20,20,20,20},
{15,20,20,20,20,20,20,20,20,20,20,20,20,20,20,20,20,20,20,20,20,20,20,20,20,20,20,20,20,20,20,20,20,20,20,20,20,20,20,20},
{15,20,20,20,20,20,20,20,20,20,20,20,20,20,20,20,20,20,20,20,20,20,20,20,20,20,20,20,20,20,20,20,20,20,20,20,20,20,20,20},
{16,20,20,20,20,20,20,20,20,20,20,20,20,20,20,20,20,20,20,20,20,20,20,20,20,20,20,20,20,20,20,20,20,20,20,20,20,20,20,20},
{17,20,20,20,20,20,20,20,20,20,20,20,20,20,20,20,20,20,20,20,20,20,20,20,20,20,20,20,20,20,20,20,20,20,20,20,20,20,20,20},
{17,20,20,20,20,20,20,20,20,20,20,20,20,20,20,20,20,20,20,20,20,20,20,20,20,20,20,20,20,20,20,20,20,20,20,20,20,20,20,20},
{17,20,20,20,20,20,20,20,20,20,20,20,20,20,20,20,20,20,20,20,20,20,20,20,20,20,20,20,20,20,20,20,20,20,20,20,20,20,20,20}
};

/* VLTBLP3: EOB 4-bits */ static int vltblp3[32][40]={
{ 3,  4,  6,  7,  9,11,11,13,13,13,13,14,14,14,14,15,15,15,15,15,20,20,20,20,20,20,20,20,20,20,20,20,20,20,20,20,20,20,20,20},
{ 3,  6,  9,11,13,14,14,16,16,16,16,17,17,20,20,20,20,20,20,20,20,20,20,20,20,20,20,20,20,20,20,20,20,20,20,20,20,20,20,20},
{ 5,  8,11,14,14,16,17,20,20,20,20,20,20,20,20,20,20,20,20,20,20,20,20,20,20,20,20,20,20,20,20,20,20,20,20,20,20,20,20,20},
{ 6,  9,13,14,16,17,20,20,20,20,20,20,20,20,20,20,20,20,20,20,20,20,20,20,20,20,20,20,20,20,20,20,20,20,20,20,20,20,20,20},
{ 7,11,13,14,20,20,20,20,20,20,20,20,20,20,20,20,20,20,20,20,20,20,20,20,20,20,20,20,20,20,20,20,20,20,20,20,20,20,20,20},
{ 7,11,14,16,20,20,20,20,20,20,20,20,20,20,20,20,20,20,20,20,20,20,20,20,20,20,20,20,20,20,20,20,20,20,20,20,20,20,20,20},
{ 8,14,17,20,20,20,20,20,20,20,20,20,20,20,20,20,20,20,20,20,20,20,20,20,20,20,20,20,20,20,20,20,20,20,20,20,20,20,20,20},
{ 8,14,20,20,20,20,20,20,20,20,20,20,20,20,20,20,20,20,20,20,20,20,20,20,20,20,20,20,20,20,20,20,20,20,20,20,20,20,20,20},
{ 8,17,20,20,20,20,20,20,20,20,20,20,20,20,20,20,20,20,20,20,20,20,20,20,20,20,20,20,20,20,20,20,20,20,20,20,20,20,20,20},
{ 9,17,20,20,20,20,20,20,20,20,20,20,20,20,20,20,20,20,20,20,20,20,20,20,20,20,20,20,20,20,20,20,20,20,20,20,20,20,20,20},
{ 9,17,20,20,20,20,20,20,20,20,20,20,20,20,20,20,20,20,20,20,20,20,20,20,20,20,20,20,20,20,20,20,20,20,20,20,20,20,20,20},
{ 9,17,20,20,20,20,20,20,20,20,20,20,20,20,20,20,20,20,20,20,20,20,20,20,20,20,20,20,20,20,20,20,20,20,20,20,20,20,20,20},
{11,20,20,20,20,20,20,20,20,20,20,20,20,20,20,20,20,20,20,20,20,20,20,20,20,20,20,20,20,20,20,20,20,20,20,20,20,20,20,20},
{11,20,20,20,20,20,20,20,20,20,20,20,20,20,20,20,20,20,20,20,20,20,20,20,20,20,20,20,20,20,20,20,20,20,20,20,20,20,20,20},
{11,20,20,20,20,20,20,20,20,20,20,20,20,20,20,20,20,20,20,20,20,20,20,20,20,20,20,20,20,20,20,20,20,20,20,20,20,20,20,20},
{13,20,20,20,20,20,20,20,20,20,20,20,20,20,20,20,20,20,20,20,20,20,20,20,20,20,20,20,20,20,20,20,20,20,20,20,20,20,20,20},
{13,20,20,20,20,20,20,20,20,20,20,20,20,20,20,20,20,20,20,20,20,20,20,20,20,20,20,20,20,20,20,20,20,20,20,20,20,20,20,20},
{13,20,20,20,20,20,20,20,20,20,20,20,20,20,20,20,20,20,20,20,20,20,20,20,20,20,20,20,20,20,20,20,20,20,20,20,20,20,20,20},
{13,20,20,20,20,20,20,20,20,20,20,20,20,20,20,20,20,20,20,20,20,20,20,20,20,20,20,20,20,20,20,20,20,20,20,20,20,20,20,20},
{13,20,20,20,20,20,20,20,20,20,20,20,20,20,20,20,20,20,20,20,20,20,20,20,20,20,20,20,20,20,20,20,20,20,20,20,20,20,20,20},
{13,20,20,20,20,20,20,20,20,20,20,20,20,20,20,20,20,20,20,20,20,20,20,20,20,20,20,20,20,20,20,20,20,20,20,20,20,20,20,20},
{13,20,20,20,20,20,20,20,20,20,20,20,20,20,20,20,20,20,20,20,20,20,20,20,20,20,20,20,20,20,20,20,20,20,20,20,20,20,20,20},
{15,20,20,20,20,20,20,20,20,20,20,20,20,20,20,20,20,20,20,20,20,20,20,20,20,20,20,20,20,20,20,20,20,20,20,20,20,20,20,20},
{15,20,20,20,20,20,20,20,20,20,20,20,20,20,20,20,20,20,20,20,20,20,20,20,20,20,20,20,20,20,20,20,20,20,20,20,20,20,20,20},
{15,20,20,20,20,20,20,20,20,20,20,20,20,20,20,20,20,20,20,20,20,20,20,20,20,20,20,20,20,20,20,20,20,20,20,20,20,20,20,20},
{15,20,20,20,20,20,20,20,20,20,20,20,20,20,20,20,20,20,20,20,20,20,20,20,20,20,20,20,20,20,20,20,20,20,20,20,20,20,20,20},
{16,20,20,20,20,20,20,20,20,20,20,20,20,20,20,20,20,20,20,20,20,20,20,20,20,20,20,20,20,20,20,20,20,20,20,20,20,20,20,20},
{17,20,20,20,20,20,20,20,20,20,20,20,20,20,20,20,20,20,20,20,20,20,20,20,20,20,20,20,20,20,20,20,20,20,20,20,20,20,20,20},
{17,20,20,20,20,20,20,20,20,20,20,20,20,20,20,20,20,20,20,20,20,20,20,20,20,20,20,20,20,20,20,20,20,20,20,20,20,20,20,20},
{17,20,20,20,20,20,20,20,20,20,20,20,20,20,20,20,20,20,20,20,20,20,20,20,20,20,20,20,20,20,20,20,20,20,20,20,20,20,20,20}
};

static    int      vlc_dcdif_lum[9] = {3, 2, 2, 3, 3, 4, 5, 6, 6};
static    int      vlc_dcdif_chr[9] = {2, 2, 2, 3, 4, 5, 6, 7, 7};
```

```
vlc_2d2_adap(source, step_size, n_points, n_bits, parameter, type_macro, block_index, index, mean_hdr, qntpar, error)
short    *source;
int      *step_size;                /* Pointer to source data to be VLC'd. INPUT */
int      *type_macro;               /* Pointer to step size used by the quantizer routine. INPUT */
int      *type_pnb_macro;
int      n_bits[4];                 /* Number of bits used to code the coefficients. OUTPUT */
int      block_index, index;
int      n_points;                  /* Number of coefficients to be coded in SOURCE. INPUT */
struct   codec *parameter;
struct   q_stat *qntpar;
struct   mean_mac *mean_hdr;
int      *error;
{
         int     qnt_index;
         int     i, cc, jk, level, cnt, run, rr, newl;
         int     sign;              /* Used to store the sign of the current source value if truncation is required */
         int     weight;

float    p_ind;
int      max_coeff_blk;
int      steparr[64];
int      *ptr_type, *ptr_type_pnb;

int      dc_prediction;
int      dc_dif, size;

int      itmp, jtmp;
FILE     *file_pointer;
static   int  first=1;
static   int  hist_amprun[64][32];
int      gof_id, seglen_id, frame_id;
int      search_id, range_id, intp_id, prevmc_id, origmc_id, fracmc_id;
float    avg_predf;
int      avg_predi;
int      tmp_mac_index;
int      u, ulimit;
short    *ptr_source;

max_coeff_blk = 64;

for (u=0; u < 4; u++)
{
    n_bits[u] = 0;
} cnt = 0;
ptr_type     = type_macro     + block_index;
ptr_type_pnb = type_pnb_macro + block_index;

tmp_mac_index = block_index/6;

for(i=0;i<n_points;i++)
{
```

```c
/*---------RESET SIGN----------*/
sign = 0;

/*---------------------LOAD STEP SIZE------------------------*/
if ((*ptr_type == 1) && (i == 0))
    {
    steparr[i] = 8; /* DC COEF of INTRA */
    }
else
    {
    steparr[i] = *step_size;
    }

/*-----------------LOAD WEIGHT OF STEP-----------------*/
if ((parameter->JPEG_QUANT==2) || ((parameter->JPEG_QUANT==1) && (*ptr_type==1)))
    {
    if ((index >= 0) && (index < 4))
        {
        weight = parameter->weight_zig_lum[i];
        }
    else
        {
        weight = parameter->weight_zig_chr[i];
        }
    }
else /* (JPEG_QUANT==0) || (JPEG_QUANT==1 && *ptr_type==0) */
    {
    if (parameter->ENABLE_MATRIX)
        {
        weight = parameter->weight_zig_alt[i];
        }
    else
        {
        weight = 16;
        }
    }

/*---------------PROCESS RECONST'S--------------*/
if ((*ptr_type == 1) && (i == 0))                    /* If Intra Block DC coef */
    {
    qnt_index = *source/steparr[i];
    if ((qnt_index < 0) || (qnt_index > 255))
        {
        exit(-1);
        }
    }
else                                                 /* Non DC coef INTRA, any coef INTER */
    {
    if (*source == 0)                                /* ZERO source */
        {
        qnt_index = 0;
        }
    else                                             /* NonZERO source */
```

```c
            if (*source < 0)
            {
              sign = 1;
              *source = - *source;
            }
        if (*ptr_type == 1)                              /* Non DC coef INTRA */
            {
              if (parameter->JPEG_QUANT==1 || parameter->JPEG_QUANT==2)
                {
                  p_ind = 0.833;
                }
              else                                       /* CCITT */
                {
                  p_ind = 0.0;
                }
            }
        else
            {
              if (parameter->JPEG_QUANT==2)              /* Real JPEG */
                {
                  p_ind = 1.0;
                }
              else                                       /* Pseudo JPEG and CCITT */
                {
                  p_ind = 0.0;
                }
            }
        quant_for(*source, &qnt_index, steparr[1]/2, weight, p_ind, parameter, error);
        }

/* ENSURE LIMITS OF QUANT INDEX */
if(qnt_index < 0 )
    {
      exit(-1);
    }
if (((*ptr_type == 1) && (1 == 0))
    {
      if (parameter->JPEG_QUANT)
        {
          if (((index >= 0) && (index < 4))              /* LUM BLOCK */
            /* reset prediction at start of slice in quant3.c */
            if ((((tmp_mac_index%45) == 0) || (*(ptr_type-6) != 1))  /* first macro of slice, prev macro non-intra*/
              {
                if (((index==0) || (index==-1))
                  {
                    dc_prediction = mean_hdr->dc_pred_ltop;
```

```
            mean_hdr->dc_pred_ltop = qnt_index;
            if (index == 0)
                {
                mean_hdr->dc_pred_lbot = mean_hdr->dc_pred_ltop;
                }
            }
        else
            {
            dc_prediction = mean_hdr->dc_pred_lbot;
            mean_hdr->dc_pred_lbot = qnt_index;
            }
        }
    else
        {
        if ( *ptr_type_pnb == *(ptr_type_pnb-6) )
            {
            if ((index == 0) || (index == 1))
                {
                dc_prediction = mean_hdr->dc_pred_ltop;
                mean_hdr->dc_pred_ltop = qnt_index;
                }
            else
                {
                dc_prediction = mean_hdr->dc_pred_lbot;
                mean_hdr->dc_pred_lbot = qnt_index;
                }
            }
        else
            {
            if ((index == 0) || (index == 1))
                {
                if (index == 0)
                    {
                    avg_predf = ((float)(mean_hdr->dc_pred_ltop + mean_hdr->dc_pred_lbot))/2
                    roundp(avg_predf,&avg_predi);
                    mean_hdr->dc_pred_ltop = avg_predi;
                    }
                dc_prediction = mean_hdr->dc_pred_ltop;
                mean_hdr->dc_pred_ltop = qnt_index;
                if (index == 0)
                    {
                    mean_hdr->dc_pred_lbot = mean_hdr->dc_pred_ltop;
                    }
                }
            else
                {
                dc_prediction = mean_hdr->dc_pred_lbot;
                mean_hdr->dc_pred_lbot = qnt_index;
                }
            }
        }
    }
else
```

```
            {
            if (index == 4)
                {
                dc_prediction = mean_hdr->dc_pred_cb;
                mean_hdr->dc_pred_cb = qnt_index;
                } if (index == 5)                              /* CHR BLOCK */
                {
                dc_prediction = mean_hdr->dc_pred_cr;
                mean_hdr->dc_pred_cr = qnt_index;
                }
            } mean_hdr->dc_predictor[index] = dc_prediction;  /* Note....used in vlc_2d2adap_bits_()....only....*/
        dc_dif = qnt_index - dc_prediction;
        size_dc_dif(dc_dif, &size, parameter, error);

if ((index >= 0) && (index < 4))                 /* LUM BLOCK */
            {
            n_bits[0] = n_bits[1] = n_bits[2] = n_bits[3] = (size + vlc_dcdif_lum[size]);
            }
        else                                             /* CHR BLOCK */
            {
            n_bits[0] = n_bits[1] = n_bits[2] = n_bits[3] = (size + vlc_dcdif_chr[size]);
            }
        }

/* COMPUTE RUN */
    level = qnt_index;
    if ((1 == 0) && (level != 0))
        {
        run = 0;
        }
    else
        {
        if (level == 0)
            cnt++;
        else
            {
            run = cnt;
            cnt = 0;
            }
        }

/* 2D VLC CODE (RUN, LEVEL) using all 4 tables */
    if (qntpar->intra_frm == 1)
        ulimit = 4;
    else if (qntpar->pred_frm == 1)
        ulimit = 4;
    else if (qntpar->intp_frm == 1)
        ulimit = 1;

for (u=0; u < ulimit; u++)
        {
        if (level != 0)
```

```c
{
if (((level >= 1)&&(level <= 40)) && ((run >= 0)&&(run <= 31)))
    {
    switch (u)
        {
        case 0: if (qntpar->intra_frm == 1)
                    n_bits[0] += vltbli0[run][level-1];
                else if (qntpar->pred_frm == 1)
                    n_bits[0] += vltblp0[run][level-1];
                else if (qntpar->intp_frm == 1)
                    n_bits[0] += vltblp0[run][level-1];
                break;
        case 1: if (qntpar->intra_frm == 1)
                    n_bits[1] += vltbli1[run][level-1];
                else if (qntpar->pred_frm == 1)
                    n_bits[1] += vltblp1[run][level-1];
                break;
        case 2: if (qntpar->intra_frm == 1)
                    n_bits[2] += vltbli2[run][level-1];
                else if (qntpar->pred_frm == 1)
                    n_bits[2] += vltblp2[run][level-1];
                break;
        case 3: if (qntpar->intra_frm == 1)
                    n_bits[3] += vltbli3[run][level-1];
                else if (qntpar->pred_frm == 1)
                    n_bits[3] += vltblp3[run][level-1];
                break;
        }
    }
else
    {
    if (((level > 40)&&(level <=128)) || ((run > 31)&&(run <=63)))
        {
        switch (u)
            {
            case 0:     n_bits[0] += 20;
                        break;
            case 1:     n_bits[1] += 20;
                        break;
            case 2:     n_bits[2] += 20;
                        break;
            case 3:     n_bits[3] += 20;
                        break;
            }
```

```
            else
            {
        }
        if (parameter->VLC_EXTEND)
        {
            if ((level > 128)&&(level <=255))
            {
                switch (u)
                {
                    case 0:
                        n_bits[0] += 28;
                        break;
                    case 1:
                        n_bits[1] += 28;
                        break;
                    case 2:
                        n_bits[2] += 28;
                        break;
                    case 3:
                        n_bits[3] += 28;
                        break;
                }
            }
            else
            {
                exit(-1);
            }
        }
        else
        {
            exit(-1);
        }
    }
    source++;
}
}
```

```
/*-----------------------------------------------------------------*/
/*      Atul Puri
        Copyright AT&T Bell Labs
        Sept 1991 load_qmtpar.c

Loads Inter/Intra matrices and MSCALE parameters
*/
/*-----------------------------------------------------------------*/ include <stdio.h>
include "zzz.h"

load_qmtpar(qmtpar, error)
struct q_stat *qmtpar;
int     *error;
{
        register int    i;
        FILE    *fp_qmtpar;

/* open qmt_file to read quant. parameters */
        if ((fp_qmtpar = fopen("qmtpar_file", "r")) == NULL)
        {
                fprintf(stderr, "In LOAD_QMTPAR....unable to open qmtpar_file....quitting..!!\n");
                exit(0);
        }

/* Read jpeg_lum_frm[] and jpeg_lum_fld[], weighting matrix for INTRA, frame and field blocks */
        for (i=0; i < 64; i++)
                fscanf(fp_qmtpar, "%d", &qmtpar->jpeg_lum_frm[i]);
        for (i=0; i < 64; i++)
                fscanf(fp_qmtpar, "%d", &qmtpar->jpeg_lum_fld[i]);

/* copy jpeg_lum_frm[] matrix to jpeg_chr_frm[] and jpeg_lum_fld[] matrix to jpeg_chr_fld[] */
        for (i=0; i < 64; i++)
        {
                qmtpar->jpeg_chr_frm[i] = qmtpar->jpeg_lum_frm[i];
                qmtpar->jpeg_chr_fld[i] = qmtpar->jpeg_lum_fld[i];
        }

/* Read ccit_alt_frm[] and ccit_alt_fld[], weighting matrices for NON-INTRA, frame and field blocks */
        for (i=0; i < 64; i++)
                fscanf(fp_qmtpar, "%d", &qmtpar->ccit_alt_frm[i]);
        for (i=0; i < 64; i++)
                fscanf(fp_qmtpar, "%d", &qmtpar->ccit_alt_fld[i]);

/* Read mscaleb[] and mscalep[], local scale factors for mquant of INTP frames */
        for (i=0; i < 4; i++)
                fscanf(fp_qmtpar, "%f", &qmtpar->mscaleb[i]);
        for (i=0; i < 4; i++)
```

```
    fscanf(fp_qmtpar, "%f", &qmtpar->mscalep[i]);
  }

/* Read scaleb_mac and scalep_mac, global scale factors for mquant of INTP frames */
  fscanf(fp_qmtpar, "%f", &qmtpar->scaleb_mac);
  fscanf(fp_qmtpar, "%f", &qmtpar->scalep_mac);

/* Read step_var1[] and var_lmt1[], step sizes and variance thresholds corresponding to activity classes for INTRA frame */
  for (i=0; i < 8; i++){
    fscanf(fp_qmtpar, "%d", &qmtpar->step_var1[i]);
  }
  for (i=0; i < 8; i++){
    fscanf(fp_qmtpar, "%d", &qmtpar->var_lmt1[i]);
  }

/* Read step_varp[] and var_lmtp[], step sizes and variance thresholds corresponding to activity classes for PRED frame */
  for (i=0; i < 8; i++){
    fscanf(fp_qmtpar, "%d", &qmtpar->step_varp[i]);
  }
  for (i=0; i < 8; i++){
    fscanf(fp_qmtpar, "%d", &qmtpar->var_lmtp[i]);
  }

/* close qmtpar file */
  fclose (fp_qmtpar);
} include <stdio.h>
include "zzz.h"

vlc_mvadap_pred (vel_map_adap, index, type_pnb, parameter, mv_bits)

int     *vel_map_adap;
int     index;
struct codec *parameter;
int     *type_pnb;
int     *mv_bits;

{
  int   mod, quo;
  int   low, high, range, tmp_diff;
  int   i, n_points;
  int   dist ;
  int   *ptr_vec;
  int   *type_type;
  int   curr_vec_px1, curr_vec_py1, curr_vec_px2, curr_vec_py2, diff_vec, macros_in_slice;

int   MV_LMT;

static int first = 1;
  static FILE *p_coufil;

static int reg_16x16frm_px, reg_16x16frm_py;
  static int reg_16x8frm_px1, reg_16x8frm_py1, reg_16x8frm_px2, reg_16x8frm_py2;
  static int reg_16x8fld_px1, reg_16x8fld_py1, reg_16x8fld_px2, reg_16x8fld_py2;
```

```
macros_in_slice = 45;
*mv_bits = 0;

ptr_vec = vel_map_adap + 4*index;
ptr_type = type_pnb + index;

curr_vec_px1 = *ptr_vec;
curr_vec_py1 = *(ptr_vec + 1);

curr_vec_px2 = *(ptr_vec + 2);
curr_vec_py2 = *(ptr_vec + 3);

/* "dist" is now indicated by "forward_f" ..... */
dist = parameter->forward_f;
if (dist < 1)
    {
    fprintf (stderr, "vlc_mv1_pred: dist %d too small. STOP\n", dist) ;
    exit (-1);
    } if( (index % macros_in_slice) == 0)
    {
    reg_16x16frm_px = reg_16x16frm_py = 0;
    reg_16x8frm_px1 = reg_16x8frm_py1 = reg_16x8frm_px2 = reg_16x8frm_py2 = 0;
    reg_16x8fld_px1 = reg_16x8fld_py1 = reg_16x8fld_px2 = reg_16x8fld_py2 = 0;
    }

/* Begin MV processing .... */
switch (*ptr_type)
    {
case 0:
case 1:
    diff_vec = curr_vec_px1 - reg_16x16frm_px;
    mv_send (diff_vec, dist, mv_bits,parameter->symbits_ind);
    diff_vec = curr_vec_py1 - reg_16x16frm_py;
    mv_send (diff_vec, dist, mv_bits, parameter->symbits_ind);
    reg_16x16frm_px = curr_vec_px1;
    reg_16x16frm_py = curr_vec_py1;
    break;
case 2:
case 3:
    diff_vec = curr_vec_px1 - reg_16x8frm_px1;
    mv_send (diff_vec, dist, mv_bits, parameter->symbits_ind);
    diff_vec = curr_vec_py1 - reg_16x8frm_py1;
    mv_send (diff_vec, dist, mv_bits, parameter->symbits_ind);
    diff_vec = curr_vec_px2 - reg_16x8frm_px2;
    mv_send (diff_vec, dist, mv_bits, parameter->symbits_ind);
    diff_vec = curr_vec_py2 - reg_16x8frm_py2;
    mv_send (diff_vec, dist, mv_bits, parameter->symbits_ind);
    reg_16x8frm_px1 = curr_vec_px1;
    reg_16x8frm_py1 = curr_vec_py1;
    reg_16x8frm_px2 = curr_vec_px2;
    reg_16x8frm_py2 = curr_vec_py2;
    break;
case 4:
case 5:
    diff_vec = curr_vec_px1 - reg_16x8fld_px1;
    mv_send (diff_vec, dist, mv_bits, parameter->symbits_ind);
    diff_vec = curr_vec_py1 - reg_16x8fld_py1;
    mv_send (diff_vec, dist, mv_bits, parameter->symbits_ind);
    diff_vec = curr_vec_px2 - reg_16x8fld_px2;
```

```c
            mv_send (diff_vec, dist, mv_bits, parameter->symbits_ind);
            diff_vec = curr_vec_py2 - reg_16x8fld_py2;
            mv_send (diff_vec, dist, mv_bits, parameter->symbits_ind);
            reg_16x8fld_px1 = curr_vec_px1;
            reg_16x8fld_py1 = curr_vec_py1;
            reg_16x8fld_px2 = curr_vec_px2;
            reg_16x8fld_py2 = curr_vec_py2;
            break;
        case 6:
        case 7:
            reg_16x16frm_px = reg_16x16frm_py = 0;
            reg_16x8frm_px1 = reg_16x8frm_py1 = reg_16x8frm_px2 = reg_16x8frm_py2 = 0;
            reg_16x8fld_px1 = reg_16x8fld_py1 = reg_16x8fld_px2 = reg_16x8fld_py2 = 0;
            *mv_bits += 0;
            break;
        default:
            fprintf(stderr, "In VLC_MVADAP...Illegal ptr_type=%d...quitting..\n", *ptr_type);
            exit(0);
        }
    terminate:;
    } include <math.h>
include <stdio.h>
include "zzz.h"
#include "myalloc.h"

mot_pred_adap(prev_frm, curr_frm, pred_frm, vel_map, vel_map_frmsub, vel_map_fldsub, type_mcadap, parameter)
    short       *prev_frm;
    short       *curr_frm;
    short       *pred_frm;
    int         *vel_map;
    int         *vel_map_frmsub;
    int         *vel_map_fldsub;
    int         *type_mcadap;
    struct codec *parameter;
{
    register int i,j,k,m,p;
    int         x_blocks, y_blocks, blocks_in_frm;
    int         mot_bl_size;

int         prev_frm_x, prev_frm_y;
    int         curr_frm_x, curr_frm_y;

int         *ptr_x_vec;
    int         *ptr_y_vec;

short       **curr_array, **prev_array, **prev_fld0, **prev_fld1;

short       **prev_blint, **prev_blint_fld0, **prev_blint_fld1;

int         lum_ind;

short       frameblk[16][16], fld0blk[8][16], fld1blk[8][16];

float       newflt;

int         l, temp_dif, min_ind, sum_sqdif;
    int         count_frmmac_mac, count_frmsub_mac, count_fldsub_mac;
```

```
float    avg_sqdif[3], ref0, ref2, T0, T2;
short    predblk[3][16][16];
count_frmmac_mac = count_frmsub_mac = count_fldsub_mac = 0;
for(i=0;i<y_blocks;i++)                      /* do for all y blocks */
{   for(j=0;j<x_blocks;j++)                  /* do for all x blocks */
    {
/*-----------------------------------   STEP 1.    PREDICT 16x16 FRAME BLOCK
*/
        ptr_x_vec = vel_map;
        ptr_y_vec = vel_map + 1;

curr_frm_x = j*mot_bl_size;
        curr_frm_y = i*mot_bl_size;

if (parameter->MOT_EST_FRAC)
        {
            prev_frm_x = 2*curr_frm_x + (*ptr_x_vec);
            prev_frm_y = 2*curr_frm_y + (*ptr_y_vec);

for(s = 0; s < 2*mot_bl_size; s += 2)
            {
                for(p = 0; p < 2*mot_bl_size; p += 2)
                {
                    predblk[0][s/2][p/2] = prev_blint[s + prev_frm_y][p + prev_frm_x];
                }
            }
        }
        else      /* INTEGER PEL MOT COMP */
        {
            prev_frm_x = curr_frm_x + (*ptr_x_vec);
            prev_frm_y = curr_frm_y + (*ptr_y_vec);

for(s = 0; s < mot_bl_size; s++)
            {
                for(p = 0; p < mot_bl_size; p++)
                {
                    predblk[0][s][p] = prev_blint[s + prev_frm_y][p + prev_frm_x];
                }
            }
        } vel_map++;
        vel_map++;

for (k=0; k < 2; k++)
        {
/*-----------------------------------   STEP 2.    PREDICT 16x8 FRAME BLOCK
*/
            ptr_x_vec = vel_map_frmsub;
            ptr_y_vec = vel_map_frmsub + 1;

curr_frm_x = j*mot_bl_size;
            curr_frm_y = i*mot_bl_size + k*mot_bl_size/2;
```

```
if (parameter->MOT_EST_FRAC)
    {
    prev_frm_x = 2*curr_frm_x + (*ptr_x_vec);
    prev_frm_y = 2*curr_frm_y + (*ptr_y_vec);

for (s = 0; s < 2*mot_bl_size/2; s += 2)
        {
        for (p = 0; p < 2*mot_bl_size/2; p += 2)
            {
            predblk[1][s/2 + k*mot_bl_size/2][p/2] = prev_blint[s + prev_frm_y][p + prev_frm_x];
            }/* end for p */
        }/* end for s */
    }
else
    {
    prev_frm_x = curr_frm_x + (*ptr_x_vec);
    prev_frm_y = curr_frm_y + (*ptr_y_vec);

for (s = 0; s < mot_bl_size/2; ++s)
        {
        for (p = 0; p < mot_bl_size/2; ++p)
            {
            predblk[1][s + k*mot_bl_size/2][p] = prev_array[s + prev_frm_y][p + prev_frm_x];
            }/* end for p */
        }/* end for s */
    } vel_map_frmsub++;
vel_map_frmsub++;

/*-----------------------------------------------------------------
*           STEP 3.        PREDICT 16x8 FIELD BLOCK
*-----------------------------------------------------------------*/ ptr_x_vec = vel_map_fldsub;
ptr_y_vec = vel_map_fldsub + 1;

curr_frm_x = 1*mot_bl_size;
curr_frm_y = 1*mot_bl_size/2;

if (parameter->MOT_EST_FRAC)
    {
    prev_frm_x = 2*curr_frm_x + (*ptr_x_vec);
    prev_frm_y = 4*curr_frm_y + (*ptr_y_vec);

for(s = 0; s < 2*mot_bl_size; s += 4)
        {
        for (p = 0; p < 2*mot_bl_size; p += 2)
            {
            if (k == 0)
                {fld0blk[s/4][p/2] = prev_blint_fld0[s + prev_frm_y][p + prev_frm_x];
                }
            else
                {fld1blk[s/4][p/2] = prev_blint_fld1[s + prev_frm_y][p + prev_frm_x];
                }
            }
        }
    }
```

```
        else
            {
            prev_frm_x = curr_frm_x + (*ptr_x_vec);
            prev_frm_y = 2*curr_frm_y + (*ptr_y_vec);

for (s = 0; s < mot_bl_size; s += 2)
                {
                for (p = 0; p < mot_bl_size; ++p)
                    {
                    if (k == 0)
                        {
                        fld0blk[s/2][p] = prev_fld0[s + prev_frm_y][p + prev_frm_x];
                        }
                    else
                        {
                        fld1blk[s/2][p] = prev_fld1[s + prev_frm_y][p + prev_frm_x];
                        }
                    }
                }
            vel_map_fldsub++;
            vel_map_fldsub++;
/*------------------------------------------------------------------*/
            }/* end for k, two field/frame split*/ for (s=0; s < mot_bl_size; s++)
            {
            for (p=0; p < mot_bl_size; p++)
                {
                if (s%2 == 0)
                    {
                    predblk[2][s][p] = fld0blk[s/2][p];
                    }
                else
                    {
                    predblk[2][s][p] = fld1blk[s/2][p];
                    }
                }
            }

//*-----------------------------------------------------------------*//
//*            STEP 4.    ADAPT BETWEEN THREE PREDICTIONS           *//
//*-----------------------------------------------------------------*//

/* Step 4(a) compute all three differences */
        curr_frm_x = l*mot_bl_size;
        curr_frm_y = l*mot_bl_size;

for (l=0; l < 3; l++)
            {
            avg_sqdif[l] = 0.0;
            sum_sqdif = temp_dif = 0;
            for (s=0; s < mot_bl_size; s++)
                {
                for (p=0; p < mot_bl_size; p++)
                    {
                    temp_dif = curr_array[s+curr_frm_y][p+curr_frm_x] - predblk[l][s][p];
                    sum_sqdif += abs(temp_dif);
                    }
                }
```

```
                    avg_sqdif[1] = sum_sqdif;
                    }

/* Step 4(b) compare differences determine min_ind */
            T0 = 1.0;
            ref0 = ((float)avg_sqdif[0])/T0;

T2 = 1.0;
            ref2 = ((float)avg_sqdif[2])/T2;

if ((avg_sqdif[1] < ref0) || (avg_sqdif[2] < ref0))
                {
                if (avg_sqdif[1] < ref2)
                    {
                    min_ind = 1;
                    count_frmsub_mac++;
                    }
                else
                    {
                    min_ind = 2;
                    count_fldsub_mac++;
                    }
                }
            else
                {
                min_ind = 0;
                count_frmmac_mac++;
                }

/* Step 4(c) Transfere to prediction frame */
            for (s=0; s < mot_bl_size; s++)
                {
                for (p=0; p < mot_bl_size; p++)
                    {
                    *pred_frm = predblk[min_ind][s][p];
                    pred_frm++;
                    }
                }

/* Step 4(d) save mc adaptation info */
            *type_mcadap = min_ind;
            type_mcadap++;
            }/* end for j */
        }/* end for i */
} include <math.h>
include <stdio.h>
include "zzz.h"

find_scanmode(type_pnb, mac_index, scanmode, parameter, qntpar, error)
int     *type_pnb;
int     mac_index;
int     *scanmode;
```

```
struct codec *parameter;
struct q_stat *qntpar;

{
    register int i,j,k,s,p,itmp;
    int    x_blocks, y_blocks, blocks_in_frm,
    int    mot_bl_size;
    int    *ptr_type;

ptr_type = type_pnb + mac_index;

if (qntpar->intra_frm == 1)
    {
        if ((*ptr_type >=0) && (*ptr_type < 2))      /* frame */
        {
            if (((*ptr_type % 2) == 0)
            {
                *scanmode = 2;
            }
            else
            {
                *scanmode = 3;                        /* field */
            }
        }
        else
        {
            fprintf(stderr,"In find_scanmode...illegal..type_pnb=%d for...Intra picture..quitting\n", *ptr_type);
            exit(0);
        }
    }
    else if (qntpar->pred_frm == 1)
    {
        if ((*ptr_type >=0) && (*ptr_type < 8))      /* frame */
        {
            if (((*ptr_type % 2) == 0)
            {
                *scanmode = 2;
            }
            else
            {
                *scanmode = 3;                        /* field */
            }
        }
        else
        {
            fprintf(stderr,"In find_scanmode...illegal..type_pnb=%d for...Pred picture..quitting\n", *ptr_type);
            exit(0);
        }
    }
    else if (qntpar->intp_frm == 1)
    {
```

```
            if ((*ptr_type >=0) && (*ptr_type < 16))
               {
               if ((*ptr_type % 2) == 0)              /* frame */
                  {
                  *scanmode = 2;
                  }
               else
                  {
                  *scanmode = 3;                      /* field */
                  }
               }
            else
               {
               fprintf(stderr,"In find_scanmode...illegal..type_pnb=%d for...Interp picture..quitting\n", *ptr_type);
               exit(0);
               }
            }/* end find_scanmode */ include <stdio.h>
include "zzz.h"

vlc_mvadap_intp(vel_map_adap, index, type_pnb, parameter, mv_bits)

int     *vel_map_adap;
int     index;

struct codec *parameter;
int     *type_pnb;

int     *mv_bits;

{
        int     mod, quo;
        int     low, high, range, tmp_diff;
        int     i, n_points;
        int     dist;
        int     *ptr_vec;
        int     *ptr_type;
        int     curr_vec_x1, curr_vec_y1, curr_vec_x2, curr_vec_y2, diff_vec, macros_in_slice;

int     MV_LMT;

static  int first = 1;
        static  FILE *p_coufil;

static  int reg_16x16frm_px,  reg_16x16frm_py;
        static  int reg_16x16frm_nx,  reg_16x16frm_ny;
        static  int reg_16x8frm_px1,  reg_16x8frm_py1,   reg_16x8frm_px2,  reg_16x8frm_py2;
        static  int reg_16x8frm_nx1,  reg_16x8frm_ny1,   reg_16x8frm_nx2,  reg_16x8frm_ny2;
        static  int reg_16x8fld_px1,  reg_16x8fld_py1,   reg_16x8fld_px2,  reg_16x8fld_py2;
        static  int reg_16x8fld_nx1,  reg_16x8fld_ny1,   reg_16x8fld_nx2,  reg_16x8fld_ny2;

macros_in_slice = 45;
        *mv_bits = 0;
```

```c
    ptr_vec = vel_map_adap + 4*index;
    ptr_type = type_pmb + index;

curr_vec_x1 = *ptr_vec;
    curr_vec_y1 = *(ptr_vec + 1);

curr_vec_x2 = *(ptr_vec + 2);
    curr_vec_y2 = *(ptr_vec + 3);

/* Some checking ... */
    dist = parameter->forward_f;
    if( (dist < 1) || (dist > 6))
    {
        fprintf(stderr, "vlc_mvadap_intp: forward_f %d out of range. STOP\n", dist);
        exit (-1);
    } dist = parameter->backward_f;
    if( (dist < 1) || (dist > 6))
    {
        fprintf(stderr, "vlc_mvadap_intp: backward_f %d out of range. STOP\n", dist);
        exit (-1);
    } if( (index % macros_in_slice) == 0)
    {
        reg_16x16frm_px  = reg_16x16frm_py  = 0;
        reg_16x16frm_nx  = reg_16x16frm_ny  = 0;
        reg_16x8frm_px1  = reg_16x8frm_py1  = reg_16x8frm_px2  = reg_16x8frm_py2 = 0;
        reg_16x8frm_nx1  = reg_16x8frm_ny1  = reg_16x8frm_nx2  = reg_16x8frm_ny2 = 0;
        reg_16x8fld_px1  = reg_16x8fld_py1  = reg_16x8fld_px2  = reg_16x8fld_py2 = 0;
        reg_16x8fld_nx1  = reg_16x8fld_ny1  = reg_16x8fld_nx2  = reg_16x8fld_ny2 = 0;
    }

/* Begin MV processing .... */
    switch (*ptr_type)
    {
    case 0:
    case 1:  /* 16x16 frm p */
        dist = parameter->forward_f;
        diff_vec = curr_vec_x1 - reg_16x16frm_px;
        mv_send (diff_vec, dist, mv_bits,parameter->symbits_ind);
        diff_vec = curr_vec_y1 - reg_16x16frm_py;
        mv_send (diff_vec, dist, mv_bits,parameter->symbits_ind);
        reg_16x16frm_px = curr_vec_x1;
        reg_16x16frm_py = curr_vec_y1;
        break;

case 2:
    case 3:  /* 16x16 frm n */
        dist = parameter->backward_f;
        diff_vec = curr_vec_x1 - reg_16x16frm_nx;
        mv_send (diff_vec, dist, mv_bits,parameter->symbits_ind);
        diff_vec = curr_vec_y1 - reg_16x16frm_ny;
        mv_send (diff_vec, dist, mv_bits,parameter->symbits_ind);
        reg_16x16frm_nx = curr_vec_x1;
        reg_16x16frm_ny = curr_vec_y1;
        break;

case 4:
    case 5:  /* 16x16 frm b */
        dist = parameter->forward_f;
        diff_vec = curr_vec_x1 - reg_16x16frm_px;
```

```
            mv_send (diff_vec, dist, mv_bits,parameter->symbits_ind);
            diff_vec = curr_vec_y1 - reg_16x16frm_py;
            mv_send (diff_vec, dist, mv_bits,parameter->symbits_ind);
            dist = parameter->backward_f;
            diff_vec = curr_vec_x2 - reg_16x16frm_nx;
            mv_send (diff_vec, dist, mv_bits,parameter->symbits_ind);
            diff_vec = curr_vec_y2 - reg_16x16frm_ny;
            mv_send (diff_vec, dist, mv_bits,parameter->symbits_ind);
            reg_16x16frm_px = curr_vec_x1;
            reg_16x16frm_py = curr_vec_y1;
            reg_16x16frm_nx = curr_vec_x2;
            reg_16x16frm_ny = curr_vec_y2;
            break;
    case 6:
    case 7: /* 16x8 frm pn */
            dist = parameter->forward_f;
            diff_vec = curr_vec_x1 - reg_16x8frm_px1;
            mv_send (diff_vec, dist, mv_bits,parameter->symbits_ind);
            diff_vec = curr_vec_y1 - reg_16x8frm_py1;
            mv_send (diff_vec, dist, mv_bits,parameter->symbits_ind);

reg_16x8frm_nx1 = reg_16x8frm_my1 = reg_16x8frm_nx2 = reg_16x8frm_ny2 = 0;
            reg_16x8fld_px1 = reg_16x8fld_py1 = reg_16x8fld_px2 = reg_16x8fld_py2 = 0;
            reg_16x8fld_nx1 = reg_16x8fld_my1 = reg_16x8fld_nx2 = reg_16x8fld_ny2 = 0;
            break;
    default:
            fprintf(stderr, "In vlc_mvadap_intp...illegal ptr_type=%d....quitting..\n", *ptr_type);
            exit(0);
    }
} include <math.h>
include <stdio.h>
include "zzz.h"

frame_field(curr_frm,adap_frm,type_codadap,type_mcadap,type_ifdadap,parameter)
short    *curr_frm;
short    *adap_frm;
int      *type_codadap;
int      *type_mcadap;
int      *type_ifdadap;
struct codec *parameter;
{
    register int i,j,k,s,p;
    int      x_blocks, y_blocks, blocks_in_frm;
    int      mot_bl_size;

int      prev_frm_x, prev_frm_y;
    int      curr_frm_x, curr_frm_y;

short    **curr_array;
    int      lum_ind;

double   sum, sumsq, sumhorsq, sumversq;
    float    npels_frmmac, npels_fldmac;
    double   var, varhor, varver, avg, avgsq;
    double   phor, pverfrm, pverfld;
```

```
double    pverfld_slice[90];
int       count_frmmac, count_fldmac;
int       cnt_16x16frmmc_frmcod, cnt_16x16frmmc_fldcod, cnt_16x8frmmc_frmcod, cnt_16x8frmmc_fldcod;
int       cnt_16x8fldmc_frmcod, cnt_16x8fldmc_fldcod, cnt_intra_frmcod, cnt_intra_fldcod;
static int    first = 1;

FILE      *file_pointer;
int       gof_id, seqlen_id, frame_id;
int       search_id, range_id, intp_id, prevmc_id, origmc_id, fracmc_id;

cnt_16x16frmmc_frmcod = cnt_16x16frmmc_fldcod = cnt_16x8frmmc_frmcod = cnt_16x8frmmc_fldcod = 0;
cnt_16x8fldmc_frmcod = cnt_16x8fldmc_fldcod = cnt_intra_frmcod = cnt_intra_fldcod = 0;

count_frmmac = count_fldmac = 0;
npels_frmmac = 256.0, npels_fldmac = 128.0;
for (i=0; i<y_blocks; i++)               /* do for all y blocks */
    for (j=0; j<x_blocks; j++)           /* do for all x blocks */
    {
        curr_frm_x = j*mot_bl_size;
        curr_frm_y = i*mot_bl_size;

/*===================================================================*/
//                STEP 1.          FIND horiz and vertical frame correlation
/*===================================================================*/ sumsq = sum = 0.0;
        avg = avgsq = var = 0.0;
        for (s = 0; s < mot_bl_size; s++)
            for (p = 0; p < mot_bl_size; p++)
            {
                sum += curr_array[s+curr_frm_y][p+curr_frm_x];
                sumsq += (curr_array[s+curr_frm_y]*curr_array[s+curr_frm_y][p+curr_frm_x]);
            } avg = sum / npels_frmmac;
        avgsq = sumsq / npels_frmmac;
        var = avgsq - (avg*avg);

sumhorsq = 0.0;
        varhor = varver = pbor = pverfrm = 0.0;
        for (s = 0; s < mot_bl_size; s++)
            for (p = 0; p < mot_bl_size; p++)
            {
                if ((p+curr_frm_x+1) >= (x_blocks*mot_bl_size))
                {
                    sumhorsq += ((curr_array[s+curr_frm_y][p+curr_frm_x] - avg)*
                                 (curr_array[s+curr_frm_y][p+curr_frm_x] - avg));
                }
                else
                {
                    sumhorsq += ((curr_array[s+curr_frm_y][p+curr_frm_x] - avg)*
                                 (curr_array[s+curr_frm_y][p+curr_frm_x+1] - avg));
                } if ((s+curr_frm_y+1) >= (y_blocks*mot_bl_size))
```

```
            sumhorsq += ((curr_array[s+curr_frm_y][p+curr_frm_x] - avg) *
                         (curr_array[s+curr_frm_y][p+curr_frm_x] - avg));
        }
        else
        {
            sumversq += ((curr_array[s+curr_frm_y][p+curr_frm_x] - avg) *
                         (curr_array[s+curr_frm_y][p+curr_frm_x] - avg));
        }
    }
}
varhor = sumhorsq/npels_frmmc;
phor = varhor/var;

varver = sumversq/npels_frmmc;
pverfrm = varver/var;

fprintf(file_pointer, "%3.2f/%3.2f ", phor, pverfrm);

/*------------------------------------------------------------------*/
/*              STEP 2.       FIND vertical field correlation       */
/*------------------------------------------------------------------*/ sumsq = 0.0;
avg = avgsq = var = 0.0;
for(s = 0; s < mot_bl_size; s += 2)
{
    for(p = 0; p < mot_bl_size; p++)
    {
        sum += curr_array[s+curr_frm_y][p+curr_frm_x];
        sumsq += (curr_array[s+curr_frm_y][p+curr_frm_x]*curr_array[s+curr_frm_y][p+curr_frm_x]);
    }
}
avg = sum / npels_fldmac;
avgsq = sumsq /npels_fldmac;
var = avgsq - (avg*avg);

sumversq = 0.0;
varver = pverfld = 0.0;
for(s = 0; s < mot_bl_size; s += 2)
{
    for(p = 0; p < mot_bl_size; p++)
    {
        if ((s+curr_frm_y+2) >= (y_blocks*mot_bl_size))
            sumversq += ((curr_array[s+curr_frm_y][p+curr_frm_x] - avg) *
                         (curr_array[s+curr_frm_y][p+curr_frm_x] - avg));
        else
            sumversq += ((curr_array[s+curr_frm_y][p+curr_frm_x] - avg) *
                         (curr_array[s+curr_frm_y+2][p+curr_frm_x] - avg));
    }
}
varver = sumversq/npels_fldmac;
pverfld= varver/var;

pverfld_slice[j] = pverfld;

/*------------------------------------------------------------------*/
/*              STEP. 3   Compare vertical frame and field correlation */
/*------------------------------------------------------------------*/
```

```c
          if (pver_frm >= pver_fld)
            {
            count_frmmac++;
            *type_codadap = 0;
            }
          else
            {
            count_fldmac++;
            *type_codadap = 1;
            }

/*---------------------------------------------------------------*/
/**       STEP. 4   Copy 16x16 frame mac or field macs depending on correlation  */
/*---------------------------------------------------------------*/
          if (*type_codadap == 1)  /* Field Mode */
            {
            for (k=0; k < 2; k++)   /* field0 followed by field 1 */
              {
              for(s = 0; s < mot_bl_size; s += 2)
                {
                for (p = 0; p < mot_bl_size; p++)
                  {
                  *adap_frm = curr_array[s+k+curr_frm_y] [p+curr_frm_x];
                  adap_frm++;
                  }
                }
              }
            }
          else               /* Frame Mode */
            {
            for(s = 0; s < mot_bl_size; s++)
              {
              for (p = 0; p < mot_bl_size; p++)
                {
                *adap_frm = curr_array[s+curr_frm_y] [p+curr_frm_x];
                adap_frm++;
                }
              }
            }
          type_codadap++;
          type_mcadap++;
          type_ifdadap++;
        }/* end for j */
      }/* end frame_field */
```

We claim:

1. An apparatus for encoding digital video signals, comprising:
   a means for receiving a digital video input signal comprising a succession of digital representations related to picture elements making up at least one frame of a video image, the frame comprising a plurality of interlaced fields;
   a means for coding groups of digital representations related to frames of picture elements;
   a means for coding groups of digital representations related to interlaced fields in the frames; and
   a means responsive to the digital video input signal for producing a field frame coding type signal which directs a selected one, but not both, of the frame coding means or the field coding means to code the digital video input signal.

2. The encoding apparatus of claim 1, in which the fields comprise alternating horizontal scan lines of the frames.

3. An apparatus for compressing digital video signals, comprising:
   a means for receiving a digital video input signal comprising a succession of digital signals representing picture elements which make up at least one frame of a video image, the frame comprising a plurality of interlaced fields;
   a means for producing a signal relating to an estimate of the digital video input signal;
   a means responsive to the digital video input signal and the estimate of the digital video input signal for producing an error signal;
   a circuit means responsive to the error signal for determining frequency coefficients of the error signal;
   a means for quantizing the frequency coefficients;
   a means for scanning the quantized frequency coefficients in predetermined order for producing a succession of frequency coefficient signals in the predetermined order;
   a variable word length encoder responsive to the succession of the frequency coefficient signals for producing a compressed video signal bit stream; and
   a means responsive to the digital video input signal prior to compression for producing a coding type signal for controlling compression of the digital video input signals by causing a selected one, but not both, of frame encoding and field encoding to be applied to the digital video input signal.

4. The apparatus of claim 3, in which the means for producing a coding type signal controls the predetermined order of scanning produced by the scanning means.

5. The apparatus of claim 3, in which the means for producing a coding type signal controls the means for producing a signal relating to an estimate of the digital video input signal.

6. The apparatus of claim 3, in which the means for producing a coding type signal controls the quantizing means.

7. The apparatus of claim 6, in which the estimate of the digital input video signal is produced in response to motion vectors determined by a motion estimating means responsive to the digital video input signal and at least one representation of another video input signal.

8. The apparatus of claim 3, in which the estimate of the digital input video signal is a motion compensated estimate of the digital input video signal.

9. The apparatus of claim 8, in which there are at least two modes of performing motion compensation.

10. The apparatus of claim 9, in which there is a frame motion compensation mode.

11. The apparatus of claim 9, in which there is a field motion compensation mode.

12. An apparatus for encoding digital video signals, comprising:
    a means for receiving digital video input signals representing frames of picture elements, the frames comprising fields of non-contiguous picture elements;
    a means for producing motion compensated estimates of the digital video input signals;
    a means for producing motion vectors in response to signals representing frames of picture elements; and
    a means for producing motion vectors in response to signals representing fields of picture elements;
    a means for selecting one of the motion vectors produced in response to signals representing frames of picture elements and the motion vectors produced in response to signals representing field of picture elements for input to the estimate producing means;
    the estimate producing means producing estimates based upon the selection produced by the selection means.

13. An apparatus for decoding a compressed digital video signal, comprising:
    a means for receiving a compressed digital video bit stream; and
    a means responsive to a motion compensation type signal for selectively and adaptively performing motion compensated decoding of frames of the compressed video bit stream.

14. The apparatus of claim 13, in which the decoding means comprises:
    an adaptive inverse scanning means responsive to a coding type signal.

15. The apparatus of claim 13, in which the decoding means comprises:
    a means responsive to a motion compensation type signal and selectively responsive to frame motion vectors and field motion vectors for producing an adaptive motion compensated estimate of a decoded video signal;
    a means responsive to the compressed digital video bit stream for producing a decoded estimate error signal; and
    a means responsive to the adaptive motion compensated estimate and the estimate error signal for producing a decoded video signal.

16. The apparatus of claim 13, in which the decoding means comprises:
    a means responsive to a coding type signal for adaptively dequantizing the compressed digital video bit stream.

17. The apparatus of claim 13, in which the decoding means comprises:
    a means for receiving a compressed digital video signal comprising at least one DC coefficient representation related to the video signal;
    a means for producing an estimated DC coefficient in response to a coding type signal; and
    a means for producing a decoded DC coefficient signal in response to the DC coefficient representation and the estimated DC coefficient.

18. An apparatus for encoding digital video signals, comprising:
- a means responsive to digital input video signals comprising a succession of digital representations of picture elements making up at least one video picture frame having a plurality of fields;
- a means for producing a compressed code relating to the input video signals; and
- an adaptive frame/field coding selector responsive to the digital input video signal prior to compression for producing a coding type signal which controls the production of compressed code by causing a selected one, but not both, of frame encoding and field encoding to be applied to the digital video input signals.

19. The apparatus of claim 18, in which the coding selector comprises:
- a means for adaptively quantizing the digital input video signals in response to the coding type signal.

20. The apparatus of claim 18, further comprising:
- a means selectively responsive to frame motion vectors and field motion vectors for producing an adaptive motion compensated estimate of the digital input video signal; and
- a means for coding a signal related to the difference between the digital input video signal and the adaptive motion compensated estimate.

21. The apparatus of claim 18, further comprising:
a means for adaptively scanning stored values related to the representations in response to the coding type signal.

22. The apparatus of claim 18, further comprising:
- a means for converting a plurality of the digital representations into a DC coefficient and a plurality of AC coefficients;
- a means for adaptively producing a predicted DC coefficient in response to the coding type signal; and
- a means responsive to the DC coefficient produced by the converting means and to the predicted DC coefficient for encoding the DC coefficient.

23. An apparatus for encoding digital video signals, comprising:
- a means for receiving a digital video input signal comprising a succession of digital representations of picture elements making up at least one video frame, the frame comprising a plurality of fields;
- a means for selectively encoding groups of digital representations in the input signal relating to one of frames and fields; and
- a means responsive to the video input signal prior to encoding to ascertain a predetermined characteristic present in the input signal prior to encoding for producing a field/frame encoding type signal which directs the encoding means to encode a selected one, but not both, of the groups of digital representations relating to frames and fields in the input signal.

24. The apparatus of claim 23, in which the means for encoding comprises a means for selectively transforming first groups of digital representations relating to one of frames of picture elements and fields of picture elements into second groups of digital representations relating to one of frames of picture elements and fields of picture elements.

25. The apparatus of claim 24, in which the means for selectively transforming comprises a means for transforming groups of digital representations in the input video signal into groups of frequency coefficients related to the input video signal.

26. The apparatus of claim 24, in which the means for selectively transforming comprises a means for adaptively performing a discrete cosine transform of the input video signal in response to the frame/field encoding type signal.

27. The apparatus of claim 24, in which the predetermined characteristic comprises a correlation between predetermined portions of the digital video input signal.

28. The apparatus of claim 24, in which the encoding means comprises a means for performing motion compensation.

29. The apparatus of claim 24, in which the encoding means comprises a means for quantizing the digital video input signal.

30. The apparatus of claim 24, in which the encoding means comprises a means for performing variable word length encoding.

31. An apparatus for encoding digital video signals, comprising:
- a means for receiving a digital video input signal comprising a succession of digital representations of picture elements making up at least one video frame, the frame comprising a plurality of fields;
- a means for performing adaptive motion compensated encoding of groups of digital representations in the input signal relating to one of frames and fields in the input signal; and
- a means responsive to the video input signal prior to encoding for producing a motion compensation type signal for controlling the adaptive motion compensated encoding means.

32. An apparatus for encoding digital video signals, comprising:
- a means for receiving digital video input signals; and
- a means for performing variable word length encoding adaptively in response to the video input signals.

33. The apparatus of claim 32, further comprising:
- a means of transforming the digital video input signals into transform coefficients;
- the encoding means being responsive to the transform coefficients for performing adaptive variable word length encoding.

* * * * *

UNITED STATES PATENT AND TRADEMARK OFFICE
CERTIFICATE OF CORRECTION

PATENT NO.   : 5,227,878
DATED        : July 13, 1993
INVENTOR(S)  : Atul Puri and Rangarajan Aravind It is certified that error appears in the above-identified patent and that said Letters Patent is hereby corrected as shown below:

Column 90,
Line 38, "compressed video bit stream." should read as -- compressed digital video bit stream and fields of the compressed video bit stream. --.

Signed and Sealed this

Twenty-fifth Day of October, 2005

JON W. DUDAS
*Director of the United States Patent and Trademark Office*